United States Patent
Ying et al.

(10) Patent No.: US 11,120,039 B2
(45) Date of Patent: Sep. 14, 2021

(54) UPDATING A REMOTE TREE FOR A CLIENT SYNCHRONIZATION SERVICE

(71) Applicant: Dropbox, Inc., San Francisco, CA (US)

(72) Inventors: Robert Ying, San Francisco, CA (US); Nipunn Koorapati, San Francisco, CA (US); Gautam Gupta, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/863,748

(22) Filed: Jan. 5, 2018

(65) Prior Publication Data

US 2019/0208012 A1    Jul. 4, 2019

Related U.S. Application Data

(60) Provisional application No. 62/611,473, filed on Dec. 28, 2017.

(51) Int. Cl.
*G06F 15/16* (2006.01)
*G06F 16/27* (2019.01)
(Continued)

(52) U.S. Cl.
CPC ............... *G06F 16/27* (2019.01); *G06F 1/04* (2013.01); *G06F 3/065* (2013.01); *G06F 3/067* (2013.01); *G06F 3/0619* (2013.01); *G06F 3/0623* (2013.01); *G06F 3/0629* (2013.01); *G06F 3/0652* (2013.01); *G06F 9/547* (2013.01); *G06F 11/1469* (2013.01); *G06F 12/1466* (2013.01);
(Continued)

(58) Field of Classification Search
CPC ...... G06F 16/188; G06F 16/27; G06F 16/182; H04L 67/1097
See application file for complete search history.

(56) References Cited

U.S. PATENT DOCUMENTS

| | | |
|---|---|---|
| 5,220,665 A | 6/1993 | Coyle, Jr. et al. |
| 5,335,346 A | 8/1994 | Fabbio |

(Continued)

FOREIGN PATENT DOCUMENTS

| | | |
|---|---|---|
| AU | 2008202290 B2 | 5/2010 |
| CN | 1255748 C | 5/2006 |

(Continued)

OTHER PUBLICATIONS

Kristal T. Pollack and Scott Brandt, "Efficient Access Control for Distributed Hierarchical File Systems." Source: Proceedings—Twenty-second IEEE/Thirteenth NASA Goddard Conference on Mass Storage Systems and Technologies, IEEE/NASA MSST2005, Apr. 11, 2005-Apr. 14, 2005, pp. 253-260.

(Continued)

*Primary Examiner* — Umar Cheema
*Assistant Examiner* — Tesfu N Mekonen
(74) *Attorney, Agent, or Firm* — Polsinelli PC

(57) ABSTRACT

The disclosed technology relates to a system configured to receive, from a content management system, an initial portion of a log of operations for a target namespace, build a subtree for the target namespace based on the initial portion of the log of operations, and mount the subtree for the target namespace at a mount location of a remote tree representing a server state for content items stored on the content management system.

19 Claims, 28 Drawing Sheets

(51) Int. Cl.

| | |
|---|---|
| *G06F 16/11* | (2019.01) |
| *G06F 16/18* | (2019.01) |
| *G06F 16/178* | (2019.01) |
| *G06F 16/176* | (2019.01) |
| *G06F 3/06* | (2006.01) |
| *G06F 21/60* | (2013.01) |
| *G06F 21/62* | (2013.01) |
| *H04L 29/06* | (2006.01) |
| *H04L 29/08* | (2006.01) |
| *G06F 16/958* | (2019.01) |
| *G06F 16/2455* | (2019.01) |
| *G06F 16/951* | (2019.01) |
| *G06F 16/172* | (2019.01) |
| *G06F 1/04* | (2006.01) |
| *G06F 9/54* | (2006.01) |
| *G06F 11/14* | (2006.01) |
| *G06F 12/14* | (2006.01) |
| *G06F 21/10* | (2013.01) |
| *H04L 9/32* | (2006.01) |
| *G06F 16/23* | (2019.01) |
| *G06F 16/22* | (2019.01) |
| *G06F 16/182* | (2019.01) |
| *G06F 16/185* | (2019.01) |
| *G06F 16/16* | (2019.01) |
| *G06F 16/13* | (2019.01) |
| *G06F 16/174* | (2019.01) |
| *G06F 16/14* | (2019.01) |
| *G06F 16/907* | (2019.01) |
| *G06F 16/17* | (2019.01) |
| *G06F 16/901* | (2019.01) |
| *G06F 16/955* | (2019.01) |

(52) U.S. Cl.
CPC ............ *G06F 16/11* (2019.01); *G06F 16/113* (2019.01); *G06F 16/116* (2019.01); *G06F 16/119* (2019.01); *G06F 16/122* (2019.01); *G06F 16/125* (2019.01); *G06F 16/128* (2019.01); *G06F 16/13* (2019.01); *G06F 16/137* (2019.01); *G06F 16/148* (2019.01); *G06F 16/152* (2019.01); *G06F 16/156* (2019.01); *G06F 16/16* (2019.01); *G06F 16/162* (2019.01); *G06F 16/168* (2019.01); *G06F 16/172* (2019.01); *G06F 16/176* (2019.01); *G06F 16/178* (2019.01); *G06F 16/1734* (2019.01); *G06F 16/1744* (2019.01); *G06F 16/1767* (2019.01); *G06F 16/1787* (2019.01); *G06F 16/18* (2019.01); *G06F 16/182* (2019.01); *G06F 16/183* (2019.01); *G06F 16/184* (2019.01); *G06F 16/185* (2019.01); *G06F 16/1827* (2019.01); *G06F 16/1844* (2019.01); *G06F 16/2246* (2019.01); *G06F 16/2255* (2019.01); *G06F 16/2322* (2019.01); *G06F 16/2358* (2019.01); *G06F 16/2365* (2019.01); *G06F 16/2379* (2019.01); *G06F 16/24552* (2019.01); *G06F 16/275* (2019.01); *G06F 16/907* (2019.01); *G06F 16/9027* (2019.01); *G06F 16/951* (2019.01); *G06F 16/955* (2019.01); *G06F 16/958* (2019.01); *G06F 21/10* (2013.01); *G06F 21/604* (2013.01); *G06F 21/6218* (2013.01); *H04L 9/3213* (2013.01); *H04L 9/3247* (2013.01); *H04L 63/08* (2013.01); *H04L 63/0853* (2013.01); *H04L 63/10* (2013.01); *H04L 63/101* (2013.01); *H04L 63/102* (2013.01); *H04L 67/06* (2013.01); *H04L 67/1095* (2013.01); *H04L 67/1097* (2013.01); *G06F 2201/84* (2013.01); *G06F 2212/1052* (2013.01); *G06F 2221/2141* (2013.01); *H04L 67/306* (2013.01); *H04L 67/42* (2013.01)

(56) References Cited

U.S. PATENT DOCUMENTS

| | | | |
|---|---|---|---|
| 5,574,901 A | 11/1996 | Takahashi | |
| 5,665,863 A | 9/1997 | Yeh | |
| 5,745,750 A | 4/1998 | Porcaro | |
| 5,778,389 A | 7/1998 | Pruett et al. | |
| 5,802,253 A | 9/1998 | Gross et al. | |
| 5,802,508 A | 9/1998 | Morgenstern | |
| 5,956,715 A | 9/1999 | Glasser et al. | |
| 6,269,371 B1 * | 7/2001 | Ohnishi | G06F 9/4406 |
| 6,408,298 B1 | 6/2002 | Van et al. | |
| 6,421,684 B1 * | 7/2002 | Cabrera | G06F 3/0607 |
| | | | 707/802 |
| 6,427,123 B1 | 7/2002 | Sedlar | |
| 6,560,655 B1 | 5/2003 | Grambihler et al. | |
| 6,574,665 B1 | 6/2003 | Khotimsky | |
| 6,618,735 B1 | 9/2003 | Krishnaswami et al. | |
| 6,665,863 B1 | 12/2003 | Lord et al. | |
| 6,944,623 B2 | 9/2005 | Kim | |
| 6,978,271 B1 | 12/2005 | Hoffman et al. | |
| 7,024,392 B2 | 4/2006 | Stefik et al. | |
| 7,051,039 B1 | 5/2006 | Murthy et al. | |
| 7,080,041 B2 | 7/2006 | Nagel | |
| 7,263,718 B2 | 8/2007 | O'Brien et al. | |
| 7,275,177 B2 | 9/2007 | Armangau et al. | |
| 7,313,598 B1 | 12/2007 | Sheth | |
| 7,487,228 B1 | 2/2009 | Preslan et al. | |
| 7,526,575 B2 | 4/2009 | Rabbers et al. | |
| 7,529,931 B2 | 5/2009 | Vasishth et al. | |
| 7,567,991 B2 | 7/2009 | Armangau et al. | |
| 7,606,876 B2 | 10/2009 | Graves et al. | |
| 7,631,298 B2 | 12/2009 | Kaler et al. | |
| 7,634,482 B2 | 12/2009 | Mukherjee et al. | |
| 7,634,514 B2 | 12/2009 | Langan et al. | |
| 7,657,769 B2 | 2/2010 | Marcy et al. | |
| 7,660,809 B2 | 2/2010 | Cortright et al. | |
| 7,685,206 B1 | 3/2010 | Mathew et al. | |
| 7,734,690 B2 | 6/2010 | Moromisato et al. | |
| 7,761,497 B1 | 7/2010 | O'Connell, Jr. et al. | |
| 7,805,469 B1 * | 9/2010 | Nagaralu | G06F 16/119 |
| | | | 707/822 |
| 7,809,828 B2 | 10/2010 | Burnett et al. | |
| 7,886,016 B1 | 2/2011 | Tormasov | |
| 7,895,158 B2 * | 2/2011 | Bosloy | G06Q 10/06 |
| | | | 707/633 |
| 7,917,494 B2 | 3/2011 | Muller | |
| 7,925,631 B1 | 4/2011 | Thillai et al. | |
| 7,962,950 B2 | 6/2011 | Choo et al. | |
| 8,015,204 B2 | 9/2011 | Kaler et al. | |
| 8,069,226 B2 | 11/2011 | Momchilov et al. | |
| 8,099,452 B2 | 1/2012 | Chkodrov et al. | |
| 8,117,151 B2 * | 2/2012 | Nakatani | G06F 16/119 |
| | | | 707/602 |
| 8,156,151 B2 | 4/2012 | Sidman | |
| 8,180,747 B2 | 5/2012 | Marinkovic et al. | |
| 8,180,983 B1 | 5/2012 | Jernigan et al. | |
| 8,190,741 B2 * | 5/2012 | Wong | G06F 16/184 |
| | | | 709/226 |
| 8,249,885 B2 | 8/2012 | Berkowitz et al. | |
| 8,250,397 B2 | 8/2012 | Marcy et al. | |
| 8,260,742 B2 | 9/2012 | Cognigni et al. | |
| 8,301,994 B1 * | 10/2012 | Shah | G06F 16/27 |
| | | | 715/229 |
| 8,312,242 B2 | 11/2012 | Casper et al. | |
| 8,326,874 B2 | 12/2012 | Wright et al. | |
| 8,359,467 B2 | 1/2013 | Subramanian et al. | |
| 8,417,676 B2 | 4/2013 | Petri | |
| 8,516,149 B1 | 8/2013 | Edmett Stacey | |
| 8,548,992 B2 | 10/2013 | Abramoff et al. | |
| 8,554,800 B2 | 10/2013 | Goldentouch | |
| 8,589,349 B2 | 11/2013 | Grant et al. | |

(56) References Cited

U.S. PATENT DOCUMENTS

| | | |
|---|---|---|
| 8,661,070 B2 | 2/2014 | Goldsmith et al. |
| 8,661,539 B2 | 2/2014 | Hodges |
| 8,667,034 B1 | 3/2014 | Simon et al. |
| 8,688,734 B1 | 4/2014 | Tidd |
| 8,694,564 B2 | 4/2014 | Guarraci |
| 8,700,670 B2 | 4/2014 | Marathe et al. |
| 8,706,701 B1 | 4/2014 | Stefanov et al. |
| 8,818,951 B1 | 8/2014 | Muntz et al. |
| 8,862,644 B2 | 10/2014 | Lyle et al. |
| 8,880,474 B2 | 11/2014 | Mason et al. |
| 8,904,503 B2 | 12/2014 | Agbabian |
| 8,949,179 B2 | 2/2015 | Besen et al. |
| 8,990,924 B2 | 3/2015 | Chow |
| 8,996,884 B2 | 3/2015 | Hartley |
| 9,002,805 B1 | 4/2015 | Barber et al. |
| 9,087,215 B2 | 7/2015 | LaFever et al. |
| 9,129,088 B1 | 9/2015 | Baschy |
| 9,152,466 B2 | 10/2015 | Dictos et al. |
| 9,183,303 B1 | 11/2015 | Goel et al. |
| 9,210,116 B2 | 12/2015 | Jeng et al. |
| 9,218,429 B2 | 12/2015 | Levy |
| 9,231,988 B2 | 1/2016 | Holt et al. |
| 9,239,841 B2 | 1/2016 | Arnaudov et al. |
| 9,251,235 B1 | 2/2016 | Hurst et al. |
| 9,294,485 B2 | 3/2016 | Allain et al. |
| 9,298,384 B2 | 3/2016 | Kang et al. |
| 9,300,609 B1 | 3/2016 | Beausoleil et al. |
| 9,310,981 B2 | 4/2016 | Lynch et al. |
| 9,311,324 B2 | 4/2016 | Irizarry, Jr. |
| 9,325,571 B2 | 4/2016 | Chen |
| 9,330,106 B2 | 5/2016 | Piasecki et al. |
| 9,336,219 B2 | 5/2016 | Makkar et al. |
| 9,336,227 B2 | 5/2016 | Eberlein et al. |
| 9,361,473 B2 | 6/2016 | Chou Fritz et al. |
| 9,413,708 B1 | 8/2016 | Michael et al. |
| 9,424,437 B1 | 8/2016 | Ancin et al. |
| 9,426,216 B2 | 8/2016 | Subramani et al. |
| 9,430,669 B2 | 8/2016 | Staley et al. |
| 9,432,457 B2 | 8/2016 | Marano et al. |
| 9,444,869 B2 | 9/2016 | Jellison, Jr. et al. |
| 9,448,893 B1 | 9/2016 | Whitehead et al. |
| 9,449,082 B2 | 9/2016 | Leonard |
| 9,449,182 B1 | 9/2016 | Dang et al. |
| 9,454,534 B2 | 9/2016 | Thomas et al. |
| 9,471,807 B1 | 10/2016 | Chakraborty et al. |
| 9,477,673 B2 | 10/2016 | Dwan et al. |
| 9,479,567 B1 | 10/2016 | Koorapati et al. |
| 9,479,578 B1 | 10/2016 | Swanson |
| 9,483,491 B2 | 11/2016 | Wijayaratne et al. |
| 9,495,478 B2 | 11/2016 | Hendrickson et al. |
| 9,501,490 B2 | 11/2016 | Evans et al. |
| 9,507,795 B2 | 11/2016 | Dorman et al. |
| 9,529,804 B1 | 12/2016 | Muddu et al. |
| 9,529,818 B2 | 12/2016 | Catmull et al. |
| 9,542,404 B2 | 1/2017 | Moore et al. |
| 9,547,559 B2 | 1/2017 | Whitehead et al. |
| 9,552,363 B2 * | 1/2017 | Novak ................ G06F 16/1744 |
| 9,558,202 B2 | 1/2017 | Lockhart et al. |
| 9,563,638 B2 | 2/2017 | Newhouse |
| 9,565,227 B1 | 2/2017 | Helter et al. |
| 9,589,131 B2 | 3/2017 | Austin |
| 9,596,246 B2 | 3/2017 | Peddada |
| 9,614,826 B1 | 4/2017 | McCorkendale |
| 9,632,528 B2 | 4/2017 | Miyashita et al. |
| 9,633,037 B2 | 4/2017 | Smith et al. |
| 9,648,088 B1 | 5/2017 | Pande et al. |
| 9,652,490 B2 | 5/2017 | Belanger et al. |
| 9,652,741 B2 * | 5/2017 | Goldberg ............ G06Q 10/101 |
| 9,672,261 B2 | 6/2017 | Holmes-Higgin et al. |
| 9,703,800 B1 | 7/2017 | Korshunov et al. |
| 9,703,801 B2 | 7/2017 | Melahn et al. |
| 9,710,535 B2 | 7/2017 | Aizman et al. |
| 9,716,753 B2 | 7/2017 | Piyush et al. |
| 9,720,926 B2 | 8/2017 | Aron et al. |
| 9,720,947 B2 | 8/2017 | Aron et al. |
| 9,727,394 B2 | 8/2017 | Xun et al. |
| 9,747,164 B1 | 8/2017 | Auchmoody et al. |
| 9,747,297 B2 | 8/2017 | Penangwala et al. |
| 9,754,119 B1 | 9/2017 | Kilday |
| 9,767,106 B1 | 9/2017 | Duggal et al. |
| 9,773,051 B2 | 9/2017 | Smith |
| 9,805,050 B2 | 10/2017 | Smith et al. |
| 9,805,054 B2 | 10/2017 | Davis et al. |
| 9,805,106 B2 | 10/2017 | McErlean et al. |
| 9,817,987 B2 | 11/2017 | Mityagin |
| 9,824,090 B2 | 11/2017 | Hayrapetian et al. |
| 9,830,345 B1 | 11/2017 | Baars |
| 9,838,424 B2 | 12/2017 | Brady et al. |
| 9,852,147 B2 | 12/2017 | Von Muhlen et al. |
| 9,922,201 B2 | 3/2018 | Von Muhlen et al. |
| 9,936,020 B2 | 4/2018 | Leggette et al. |
| 9,953,036 B2 * | 4/2018 | Mackenzie ......... G06F 16/1734 |
| 9,971,822 B1 | 5/2018 | Deardeuff et al. |
| 10,013,440 B1 * | 7/2018 | Gupta ................. G06F 16/2272 |
| 10,037,339 B1 | 7/2018 | Kleinpeter et al. |
| 10,095,879 B2 | 10/2018 | Kleinpeter et al. |
| 10,198,182 B2 | 2/2019 | Adler et al. |
| 10,235,378 B1 | 3/2019 | Mamidi et al. |
| 10,324,903 B1 | 6/2019 | Goldberg et al. |
| 10,380,076 B2 | 8/2019 | Wijayaratne et al. |
| 10,425,477 B2 | 9/2019 | Trandafir et al. |
| 10,558,375 B2 | 2/2020 | Muhlestein et al. |
| 10,671,638 B2 | 6/2020 | Goldberg et al. |
| 2003/0145020 A1 | 7/2003 | Ngo et al. |
| 2003/0159136 A1 | 8/2003 | Huang et al. |
| 2003/0167317 A1 | 9/2003 | Deen et al. |
| 2003/0196119 A1 | 10/2003 | Raley et al. |
| 2003/0212657 A1 | 11/2003 | Kaluskar et al. |
| 2004/0002990 A1 | 1/2004 | Sander et al. |
| 2004/0080549 A1 | 4/2004 | Lord et al. |
| 2004/0098418 A1 | 5/2004 | Hein |
| 2004/0255048 A1 | 12/2004 | Lev et al. |
| 2005/0125411 A1 | 6/2005 | Kilian et al. |
| 2005/0144308 A1 | 6/2005 | Harashima et al. |
| 2005/0149450 A1 | 7/2005 | Stefik et al. |
| 2005/0151738 A1 | 7/2005 | Lord et al. |
| 2005/0198385 A1 | 9/2005 | Aust et al. |
| 2005/0222996 A1 | 10/2005 | Yalamanchi |
| 2005/0256861 A1 | 11/2005 | Wong et al. |
| 2005/0289446 A1 | 12/2005 | Moncsko et al. |
| 2006/0070114 A1 | 3/2006 | Wood et al. |
| 2006/0136513 A1 | 6/2006 | Ngo et al. |
| 2006/0155776 A1 | 7/2006 | Aust |
| 2006/0184720 A1 | 8/2006 | Sinclair et al. |
| 2006/0253501 A1 * | 11/2006 | Langan ................ G06F 16/178 |
| 2006/0271602 A1 | 11/2006 | Davis et al. |
| 2007/0016650 A1 | 1/2007 | Gilbert et al. |
| 2007/0016771 A1 | 1/2007 | Allison et al. |
| 2007/0022091 A1 | 1/2007 | Styles et al. |
| 2007/0067349 A1 | 3/2007 | Jhaveri et al. |
| 2007/0088744 A1 | 4/2007 | Webber et al. |
| 2007/0088764 A1 | 4/2007 | Yoon et al. |
| 2007/0136391 A1 | 6/2007 | Anzai et al. |
| 2007/0156670 A1 | 7/2007 | Lim |
| 2007/0185852 A1 | 8/2007 | Erofeev |
| 2007/0198540 A1 * | 8/2007 | Kohl ....................... G06F 16/10 |
| 2007/0208715 A1 | 9/2007 | Muehlbauer |
| 2007/0208763 A1 | 9/2007 | Muehlbauer |
| 2007/0208948 A1 | 9/2007 | Costa-Requena et al. |
| 2007/0234398 A1 | 10/2007 | Muehlbauer |
| 2007/0250552 A1 | 10/2007 | Lango et al. |
| 2007/0282914 A1 | 12/2007 | Sivapragasam et al. |
| 2007/0283050 A1 | 12/2007 | Savage |
| 2007/0283403 A1 | 12/2007 | Eklund et al. |
| 2007/0288714 A1 | 12/2007 | Nakamura |
| 2008/0059474 A1 | 3/2008 | Lim |
| 2008/0104277 A1 | 5/2008 | Tian |
| 2008/0120129 A1 | 5/2008 | Seubert et al. |
| 2008/0168183 A1 | 7/2008 | Marcy et al. |
| 2008/0307255 A1 | 12/2008 | Chen et al. |
| 2009/0055921 A1 | 2/2009 | Field et al. |
| 2009/0150569 A1 | 6/2009 | Kumar et al. |
| 2009/0182778 A1 * | 7/2009 | Tormasov ............ G06F 16/176 |
| 2009/0183117 A1 | 7/2009 | Chang |

(56) References Cited

U.S. PATENT DOCUMENTS

| | | |
|---|---|---|
| 2009/0198719 A1 | 8/2009 | Dewitt |
| 2009/0228511 A1 | 9/2009 | Atkin et al. |
| 2009/0271412 A1* | 10/2009 | Lacapra ............... H04L 67/104 |
| 2009/0292640 A1 | 11/2009 | Heatherly |
| 2010/0058462 A1 | 3/2010 | Chow |
| 2010/0106687 A1 | 4/2010 | Marcy et al. |
| 2010/0235649 A1 | 9/2010 | Jeffries et al. |
| 2010/0242037 A1 | 9/2010 | Xie et al. |
| 2011/0014985 A1 | 1/2011 | Park et al. |
| 2011/0040793 A1 | 2/2011 | Davidson et al. |
| 2011/0066668 A1 | 3/2011 | Guarraci |
| 2011/0072143 A1 | 3/2011 | Kuo et al. |
| 2011/0082879 A1* | 4/2011 | Hazlewood ......... G06F 16/9027 |
| | | 707/770 |
| 2011/0126296 A1 | 5/2011 | Moore |
| 2011/0137874 A1 | 6/2011 | Grosman et al. |
| 2011/0197196 A1 | 8/2011 | Felton et al. |
| 2011/0218964 A1 | 9/2011 | Hagan et al. |
| 2011/0248821 A1 | 10/2011 | Merten |
| 2011/0271084 A1 | 11/2011 | Moue et al. |
| 2011/0283185 A1 | 11/2011 | Obasanjo et al. |
| 2012/0011098 A1 | 1/2012 | Yamada |
| 2012/0079606 A1 | 3/2012 | Evans et al. |
| 2012/0102539 A1 | 4/2012 | Robb et al. |
| 2012/0254123 A1 | 10/2012 | Ferguson et al. |
| 2012/0254505 A1 | 10/2012 | Chishtie et al. |
| 2012/0278334 A1 | 11/2012 | Abjanic |
| 2013/0013560 A1 | 1/2013 | Goldberg et al. |
| 2013/0014023 A1 | 1/2013 | Lee et al. |
| 2013/0067542 A1 | 3/2013 | Gonsalves et al. |
| 2013/0080785 A1 | 3/2013 | Ruhlen et al. |
| 2013/0086640 A1 | 4/2013 | Hashimoto et al. |
| 2013/0124690 A1 | 5/2013 | Liebman |
| 2013/0133051 A1* | 5/2013 | Riemers .................. H04L 63/08 |
| | | 726/7 |
| 2013/0138608 A1 | 5/2013 | Smith |
| 2013/0144834 A1 | 6/2013 | Lloyd et al. |
| 2013/0179480 A1 | 7/2013 | Agarwal et al. |
| 2013/0191339 A1 | 7/2013 | Haden et al. |
| 2013/0191631 A1 | 7/2013 | Ylonen et al. |
| 2013/0246527 A1 | 9/2013 | Viera |
| 2013/0254777 A1 | 9/2013 | Branson et al. |
| 2013/0258842 A1 | 10/2013 | Mizutani |
| 2013/0262862 A1 | 10/2013 | Hartley et al. |
| 2013/0268480 A1 | 10/2013 | Dorman |
| 2013/0268559 A1 | 10/2013 | Reeves |
| 2013/0282657 A1 | 10/2013 | Besen et al. |
| 2013/0282658 A1* | 10/2013 | Besen ................. G06F 16/1794 |
| | | 707/634 |
| 2013/0282785 A1 | 10/2013 | Besen et al. |
| 2013/0290323 A1 | 10/2013 | Saib |
| 2013/0304694 A1 | 11/2013 | Barreto et al. |
| 2013/0304765 A1 | 11/2013 | Failelson et al. |
| 2013/0318160 A1 | 11/2013 | Beraka et al. |
| 2013/0321306 A1 | 12/2013 | Bauermeister et al. |
| 2013/0346557 A1 | 12/2013 | Chang et al. |
| 2014/0033324 A1 | 1/2014 | Kiang et al. |
| 2014/0047261 A1 | 2/2014 | Patiejunas et al. |
| 2014/0059002 A1 | 2/2014 | Lockhart et al. |
| 2014/0075501 A1 | 3/2014 | Srinivasan et al. |
| 2014/0082145 A1* | 3/2014 | Lacapra ............... H04L 67/1097 |
| | | 709/219 |
| 2014/0136635 A1 | 5/2014 | Jeng et al. |
| 2014/0143543 A1 | 5/2014 | Aikas et al. |
| 2014/0173694 A1 | 6/2014 | Kranz |
| 2014/0181021 A1 | 6/2014 | Montulli et al. |
| 2014/0181033 A1 | 6/2014 | Pawar et al. |
| 2014/0181053 A1 | 6/2014 | Belanger et al. |
| 2014/0181579 A1* | 6/2014 | Whitehead .......... G06F 11/1451 |
| | | 714/15 |
| 2014/0188798 A1 | 7/2014 | MacKenzie et al. |
| 2014/0189051 A1 | 7/2014 | Hunter |
| 2014/0189118 A1 | 7/2014 | Hunter |
| 2014/0189355 A1 | 7/2014 | Hunter |
| 2014/0195485 A1* | 7/2014 | Dorman ............... G06F 16/1734 |
| | | 707/624 |
| 2014/0195638 A1 | 7/2014 | Houston et al. |
| 2014/0201138 A1 | 7/2014 | Dorman et al. |
| 2014/0201145 A1 | 7/2014 | Dorman et al. |
| 2014/0215551 A1 | 7/2014 | Allain et al. |
| 2014/0250066 A1 | 9/2014 | Calkowski et al. |
| 2014/0258350 A1 | 9/2014 | Duval et al. |
| 2014/0258418 A1 | 9/2014 | Subramani et al. |
| 2014/0259005 A1 | 9/2014 | Jeffrey et al. |
| 2014/0282313 A1 | 9/2014 | Alfieri |
| 2014/0282851 A1 | 9/2014 | Miller et al. |
| 2014/0289195 A1 | 9/2014 | Chan et al. |
| 2014/0297734 A1 | 10/2014 | Lacapra |
| 2014/0297759 A1 | 10/2014 | Mody |
| 2014/0310175 A1 | 10/2014 | Coronel |
| 2014/0317128 A1 | 10/2014 | Simeonov et al. |
| 2014/0359085 A1 | 12/2014 | Chen |
| 2014/0372376 A1 | 12/2014 | Smith et al. |
| 2014/0379647 A1 | 12/2014 | Smith et al. |
| 2015/0012616 A1 | 1/2015 | Pearl et al. |
| 2015/0026222 A1 | 1/2015 | Litzenberger |
| 2015/0026597 A1 | 1/2015 | Gadamsetty et al. |
| 2015/0026604 A1 | 1/2015 | Mulukuri et al. |
| 2015/0026751 A1 | 1/2015 | Yokoi |
| 2015/0058932 A1 | 2/2015 | Faitelson et al. |
| 2015/0088817 A1 | 3/2015 | Dwan et al. |
| 2015/0089019 A1 | 3/2015 | Chou |
| 2015/0100546 A1 | 4/2015 | Eberlein et al. |
| 2015/0100547 A1 | 4/2015 | Holmes-Higgin et al. |
| 2015/0100705 A1 | 4/2015 | Abe et al. |
| 2015/0101021 A1 | 4/2015 | McErlean et al. |
| 2015/0120763 A1 | 4/2015 | Grue et al. |
| 2015/0134600 A1 | 5/2015 | Eisner et al. |
| 2015/0154418 A1 | 6/2015 | Redberg |
| 2015/0163206 A1 | 6/2015 | McCarthy et al. |
| 2015/0172283 A1 | 6/2015 | Omnes et al. |
| 2015/0172412 A1 | 6/2015 | Escriva et al. |
| 2015/0178516 A1 | 6/2015 | Mityagin |
| 2015/0186668 A1 | 7/2015 | Whaley et al. |
| 2015/0193347 A1 | 7/2015 | Kluesing et al. |
| 2015/0205977 A1 | 7/2015 | Rundle et al. |
| 2015/0207844 A1 | 7/2015 | Tataroiu et al. |
| 2015/0220917 A1 | 8/2015 | Aabye et al. |
| 2015/0222431 A1 | 8/2015 | Guido Van Rossum |
| 2015/0222580 A1 | 8/2015 | Grue |
| 2015/0222615 A1 | 8/2015 | Allain et al. |
| 2015/0242521 A1 | 8/2015 | Hunter |
| 2015/0244692 A1 | 8/2015 | Liu et al. |
| 2015/0244795 A1 | 8/2015 | Cantwell et al. |
| 2015/0248384 A1 | 9/2015 | Luo et al. |
| 2015/0249647 A1 | 9/2015 | Mityagin et al. |
| 2015/0277802 A1 | 10/2015 | Oikarinen et al. |
| 2015/0277969 A1 | 10/2015 | Strauss et al. |
| 2015/0278024 A1 | 10/2015 | Barman et al. |
| 2015/0278397 A1 | 10/2015 | Hendrickson et al. |
| 2015/0280959 A1 | 10/2015 | Vincent |
| 2015/0281360 A1* | 10/2015 | Lacapra ................. H04L 67/02 |
| | | 709/203 |
| 2015/0286833 A1 | 10/2015 | Resch et al. |
| 2015/0288680 A1 | 10/2015 | Leggette |
| 2015/0296012 A1 | 10/2015 | Piyush et al. |
| 2015/0310035 A1* | 10/2015 | Godman ............... G06F 16/185 |
| | | 707/751 |
| 2015/0318941 A1 | 11/2015 | Zheng et al. |
| 2015/0356111 A1 | 12/2015 | Kalsi et al. |
| 2015/0358408 A1 | 12/2015 | Fukatani et al. |
| 2015/0370483 A1 | 12/2015 | Schoebel-Theuer |
| 2015/0370825 A1 | 12/2015 | Outcalt et al. |
| 2016/0028796 A1 | 1/2016 | Garcia et al. |
| 2016/0034508 A1 | 2/2016 | Aron et al. |
| 2016/0036822 A1 | 2/2016 | Kim et al. |
| 2016/0042087 A1 | 2/2016 | Yang |
| 2016/0050177 A1 | 2/2016 | Cue et al. |
| 2016/0055021 A1 | 2/2016 | Beveridge et al. |
| 2016/0062839 A1 | 3/2016 | Kapoor |
| 2016/0065672 A1 | 3/2016 | Savage et al. |
| 2016/0085769 A1 | 3/2016 | Penangwala et al. |
| 2016/0092312 A1 | 3/2016 | Dornquast et al. |

(56) References Cited

U.S. PATENT DOCUMENTS

| | | |
|---|---|---|
| 2016/0103750 A1 | 4/2016 | Cooper et al. |
| 2016/0110374 A1 | 4/2016 | Wetherall et al. |
| 2016/0112508 A1 | 4/2016 | Sher |
| 2016/0140197 A1 | 5/2016 | Gast et al. |
| 2016/0140201 A1 | 5/2016 | Cowling et al. |
| 2016/0182494 A1 | 6/2016 | Lissounov et al. |
| 2016/0188465 A1 | 6/2016 | Almasi et al. |
| 2016/0188628 A1 | 6/2016 | Hartman et al. |
| 2016/0205100 A1 | 7/2016 | Brannon |
| 2016/0210238 A1 | 7/2016 | Frank et al. |
| 2016/0224989 A1 | 8/2016 | Lissounov et al. |
| 2016/0285890 A1 | 9/2016 | Beausoleil et al. |
| 2016/0291856 A1 | 10/2016 | von Muhlen et al. |
| 2016/0292179 A1 | 10/2016 | Von Muhlen et al. |
| 2016/0292443 A1 | 10/2016 | von Muhlen et al. |
| 2016/0294916 A1 | 10/2016 | Daher et al. |
| 2016/0299917 A1 | 10/2016 | Koos et al. |
| 2016/0301619 A1 | 10/2016 | Bashir et al. |
| 2016/0308950 A1 | 10/2016 | Bouvrette et al. |
| 2016/0308966 A1 | 10/2016 | Zhang et al. |
| 2016/0315941 A1 | 10/2016 | Dang et al. |
| 2016/0321275 A1 | 11/2016 | Yap et al. |
| 2016/0321287 A1 | 11/2016 | Luthra et al. |
| 2016/0321293 A1 | 11/2016 | Auer |
| 2016/0323358 A1 | 11/2016 | Malhotra et al. |
| 2016/0334967 A1 | 11/2016 | Rottler et al. |
| 2016/0335278 A1 | 11/2016 | Tabaaloute et al. |
| 2016/0337356 A1 | 11/2016 | Simon et al. |
| 2016/0342479 A1 | 11/2016 | Chen et al. |
| 2016/0349999 A1 | 12/2016 | Adler et al. |
| 2016/0352752 A1 | 12/2016 | Bush et al. |
| 2016/0353447 A1 | 12/2016 | White |
| 2016/0357720 A1 | 12/2016 | Thimbleby |
| 2016/0366118 A1 | 12/2016 | Wang |
| 2016/0371296 A1 | 12/2016 | Passey et al. |
| 2016/0371358 A1 | 12/2016 | Lee et al. |
| 2017/0005974 A1 | 1/2017 | Wheeler et al. |
| 2017/0006097 A1 | 1/2017 | Johnson |
| 2017/0026379 A1 | 1/2017 | Lu et al. |
| 2017/0039216 A1 | 2/2017 | Fan et al. |
| 2017/0052717 A1 | 2/2017 | Rawat et al. |
| 2017/0075920 A1 | 3/2017 | Mckay |
| 2017/0075921 A1 | 3/2017 | Benton et al. |
| 2017/0078383 A1 | 3/2017 | Murstein et al. |
| 2017/0078384 A1 | 3/2017 | Trandafir et al. |
| 2017/0109370 A1 | 4/2017 | Newhouse |
| 2017/0109385 A1 | 4/2017 | Aronovich et al. |
| 2017/0123931 A1 | 5/2017 | Aizman et al. |
| 2017/0124111 A1 | 5/2017 | Sharma et al. |
| 2017/0131934 A1 | 5/2017 | Kaczmarczyk et al. |
| 2017/0149885 A1 | 5/2017 | Kaplan et al. |
| 2017/0177613 A1 | 6/2017 | Sharma et al. |
| 2017/0185687 A1 | 6/2017 | Pai et al. |
| 2017/0192656 A1 | 7/2017 | Pedrick et al. |
| 2017/0192856 A1 | 7/2017 | Chin et al. |
| 2017/0192998 A1 | 7/2017 | Sergeev et al. |
| 2017/0193002 A1 | 7/2017 | Shvachko et al. |
| 2017/0193040 A1 | 7/2017 | Agrawal et al. |
| 2017/0193448 A1 | 7/2017 | Piyush et al. |
| 2017/0195457 A1 | 7/2017 | Smith, II et al. |
| 2017/0220596 A1 | 8/2017 | Smith et al. |
| 2017/0230702 A1 | 8/2017 | Sarosi et al. |
| 2017/0235759 A1 | 8/2017 | Altaparmakov et al. |
| 2017/0270136 A1 | 9/2017 | Chen et al. |
| 2017/0270306 A1 | 9/2017 | Dorwin |
| 2017/0289210 A1 | 10/2017 | Pai et al. |
| 2017/0300505 A1 | 10/2017 | Belmanu Sadananda et al. |
| 2017/0302737 A1 | 10/2017 | Piyush et al. |
| 2017/0308443 A1 | 10/2017 | Lai et al. |
| 2017/0308565 A1 | 10/2017 | Broll et al. |
| 2017/0308598 A1 | 10/2017 | Goldberg et al. |
| 2017/0308599 A1 | 10/2017 | Newhouse |
| 2017/0308602 A1 | 10/2017 | Raghunathan et al. |
| 2017/0308681 A1 | 10/2017 | Gould et al. |
| 2017/0314898 A1 | 11/2017 | Syverson et al. |
| 2017/0316032 A1 | 11/2017 | Kamalaksha et al. |
| 2017/0316222 A1 | 11/2017 | Muhlestein et al. |
| 2017/0331893 A1 | 11/2017 | Crofton et al. |
| 2017/0351701 A1 | 12/2017 | Aron et al. |
| 2017/0357663 A1 | 12/2017 | Giampaolo |
| 2018/0004442 A1 | 1/2018 | Hnanicek et al. |
| 2018/0039788 A1 | 2/2018 | Leggette |
| 2018/0084045 A1 | 3/2018 | Nichols et al. |
| 2018/0089349 A1 | 3/2018 | Rezgui |
| 2018/0121370 A1 | 5/2018 | Mukkamala et al. |
| 2018/0144263 A1 | 5/2018 | Saxena et al. |
| 2018/0150477 A1 | 5/2018 | Jewell et al. |
| 2018/0157825 A1 | 6/2018 | Eksten et al. |
| 2018/0176082 A1 | 6/2018 | Katz et al. |
| 2018/0176093 A1 | 6/2018 | Katz et al. |
| 2018/0176120 A1 | 6/2018 | Katz et al. |
| 2018/0181549 A1 | 6/2018 | Hileman et al. |
| 2018/0196643 A1 | 7/2018 | Dolby et al. |
| 2018/0246946 A1 | 8/2018 | Sadhwani |
| 2018/0260125 A1 | 9/2018 | Botes et al. |
| 2018/0260411 A1 | 9/2018 | Deardeuff et al. |
| 2018/0270534 A1 | 9/2018 | Badawiyeh |
| 2018/0329969 A1 | 11/2018 | Abrams |
| 2018/0364950 A1 | 12/2018 | Spillane et al. |
| 2018/0365236 A1 | 12/2018 | Wang et al. |
| 2019/0005139 A1 | 1/2019 | Ford et al. |
| 2019/0034507 A1 | 1/2019 | Duttagupta et al. |
| 2019/0050833 A1 | 2/2019 | Hu et al. |
| 2019/0102370 A1 | 4/2019 | Nelson et al. |
| 2019/0114427 A1 | 4/2019 | Suryanarayana et al. |
| 2019/0179714 A1 | 6/2019 | Karthikeyan et al. |
| 2019/0205423 A1 | 7/2019 | Haven et al. |
| 2019/0205424 A1 | 7/2019 | Jubb, IV |
| 2019/0205425 A1 | 7/2019 | Goldberg et al. |
| 2019/0207940 A1 | 7/2019 | Kleinpeter et al. |
| 2019/0208013 A1 | 7/2019 | Lai |
| 2019/0208014 A1 | 7/2019 | Goldberg et al. |
| 2019/0266342 A1 | 8/2019 | Kleinpeter et al. |
| 2019/0332231 A1 | 10/2019 | Rogers et al. |
| 2019/0332688 A1 | 10/2019 | Valentine et al. |
| 2019/0361793 A1 | 11/2019 | Goldberg |
| 2020/0249877 A1 | 8/2020 | McIlroy et al. |

FOREIGN PATENT DOCUMENTS

| | | |
|---|---|---|
| CN | 106897352 A | 6/2017 |
| CN | 106941504 A | 7/2017 |
| EP | 2757491 A1 | 7/2014 |
| EP | 2911068 A1 | 8/2015 |
| GB | 2399663 A | 9/2004 |
| GB | 2494047 A | 2/2013 |
| WO | 2009126941 A1 | 10/2009 |
| WO | 2014080547 A1 | 5/2014 |
| WO | 2015055035 A1 | 4/2015 |

OTHER PUBLICATIONS

"CentreStack", Gladinet, Inc., Boca Raton, FL, May 30, 2015 (Available online at https://webcache.googleusercontent.com/search?q=cache:R3ogLpu7xJYJ:https://www.gladinet.com/library/admin/index.htm+&cd=1&hl=en&ct=clnk&gl=us, last visited Feb. 8, 2018).

Salman Niazi et al., "HopsFS: Scaling Hierarchical File System Metadata Using NewSQL Databases," The 15th USENIX Conference on File and Storage Technologies (FAST 17) (2017), pp. 89-104, Submitted on Jun 6, 2016 (v1), last revised Feb. 22, 2017 (this version, v2)).

Uploaded by Neeraj Singh, Distributed System Answer Key, (Available online at https://www.scribd.com/doc/80052663/Distributed-System-Answer-Key).

Chang Liu, Xin Ye and En Ye, "Source Code Revision History Visualization Tools: Do They Work and What Would It Take to Put Them to Work?", IEEE Access, vol. 2, 2014, published May 6, 2014, pp. 404-426.

V. Swathy et al., "Providing Advanced Security Mechanism for Scalable Data Sharing in Cloud Storage," 2016 International Conference on Inventive Computation Technologies (ICICT), 2016, vol. 3, pp. 1-6.

(56) References Cited

OTHER PUBLICATIONS

Requirement for Restriction/Election from U.S. Appl. No. 15/858,207, dated Sep. 26, 2019, 6 pages.
Requirement for Restriction/Election from U.S. Appl. No. 15/858,410, dated Sep. 19, 2019, 7 pages.
International Search Report and Written Opinion for PCT Application PCT/US2018/064659 dated Mar. 19, 2019,13 pages.
International Search Report and Written Opinion for PCT Application PCT/US2018/064670 dated Mar. 14, 2019, 13 pages.
International Search Report and Written Opinion for PCT Application PCT/US2018/064675 dated Mar. 13, 2019, 12 pages.
International Search Report and Written Opinion for PCT Application PCT/US2018/065091 dated Mar. 21, 2019, 16 pages.
International Search Report and Written Opinion for PCT Application PCT/US2018/065100 dated Mar. 19, 2019, 11 pages.
International Search Report and Written Opinion for PCT Application PCT/US2018/065352 dated Mar. 19, 2019, 13 pages.
International Search Report and Written Opinion for PCT Application PCT/US2018/065940 dated Mar. 14, 2019, 14 pages.
International Search Report and Written Opinion for PCT Application PCT/US2018/066193 dated Mar. 14, 2019, 12 pages.
Cobena G., et al., "Detecting Changes in XML Documents," Proceedings of the 18th International Conference on Data Engineering, Jan. 1, 2002, pp. 41-52.
International Search Report and Written Opinion for PCT Application PCT/US2018/065097 dated Mar. 19, 2019, 14 pages.
International Search Report and Written Opinion for PCT Application PCT/US2018/065347 dated Apr. 2, 2019, 16 pages.
Lindholm T., et al., "A Hybrid Approach To Optimistic File System Directory Tree Synchronization," MobiDE 2005, Proceedings of 4th ACM International Workshop on Data Engineering for Wireless and Mobile Access, Jun. 12, 2005, pp. 49-56.
Lindholm T., "XML Three-way Merge as a Reconciliation Engine for Mobile Data," Proceedings of the 3rd ACM International Workshop on Data Engineering for Wireless and Mobile Access, MobiDE'03, Sep. 19, 2003, pp. 93-97.
Phan R.C.W., et al., "Security Considerations for Incremental Hash Functions Based on Pair Block Chaining," Computers & Security, vol. 25 (2), Jan. 30, 2006, pp. 131-136.
Wang Y., et al., "X-Diff: An Effective Change Detection Algorithm for XML Documents," 2003 IEEE, Proceedings of the 19th International Conference on Data Engineering (ICDE'03), Mar. 5-8, 2003, pp. 519-530.
Uppoor S., et al., "Cloud-based Synchronization of Distributed File System Hierarchies," 2010 IEEE International Conference on Cluster Computing Workshops and Posters (Cluster Workshops), Sep. 20, 2010, pp. 1-4.
Notice of Allowance from U.S. Appl. No. 15/858,357, dated May 26, 2020, 22 pages.
Notice of Allowance from U.S. Appl. No. 15/858,410, dated May 22, 2020, 18 pages.
Notice of Allowance from U.S. Appl. No. 15/867,496, dated May 28, 2020, 10 pages.
Final Office Action from U.S. Appl. No. 15/858,430, dated Jun. 12, 2020, 11 pages.
Non-Final Office Action from U.S. Appl. No. 15/858,192, dated Jun. 12, 2020, 13 pages.
Notice of Allowance from U.S. Appl. No. 15/870,179, dated Jun. 11, 2020, 7 pages.
Final Office Action from U.S. Appl. No. 15/858,125, dated Jun. 26, 2020, 15 pages.
Final Office Action from U.S. Appl. No. 15/858,207, dated Jul. 2, 2020, 16 pages.
Kappes G., et al., "Virtualization-aware Access Control for Multitenant Filesystems," MSST 2014, Jun. 2-6, 2014, pp. 1-6.
Mell P M.,et al., "Linear Time Algorithms to Restrict Insider Access using Multi-Policy Access Control Systems," Apr. 2013, retrieved from https://www.nist.gov/publications/linear-time-algorithms-restrict-insider-access-using-multi-policy-access-control, on Dec. 31, 2019, 2 Pages.

Non-Final Office Action from U.S. Appl. No. 15/857,713, dated Jan. 7, 2020, 16 pages.
Non-Final Office Action from U.S. Appl. No. 15/863,751, dated Jul. 7, 2020, 16 pages.
Wolff D, "A Web-Based Tool for Managing the Submission of Student Work," Journal of Computing Sciences in Colleges, Dec. 2004, vol. 20 (2), pp. 144-153.
Non-Final Office Action from U.S. Appl. No. 15/858,430, dated Nov. 26, 2019, 10 pages.
Non-Final Office Action from U.S. Appl. No. 15/863,751, dated Nov. 6, 2019, 17 pages.
Non-Final Office Action from U.S. Appl. No. 15/867,496, dated Nov. 13, 2019, 12 pages.
Non-Final Office Action from U.S. Appl. No. 15/868,505, dated Nov. 14, 2019, 7 pages.
Non-Final Office Action from U.S. Appl. No. 15/870,179, dated Oct. 7, 2019, 6 pages.
Notice of Allowance from U.S. Appl. No. 15/873,693, dated Oct. 29, 2019, 10 pages.
Non-Final Office Action from U.S. Appl. No. 15/858,125, dated Dec. 31, 2019, 12 pages.
Non-Final Office Action from U.S. Appl. No. 15/858,207, dated Jan. 22, 2020, 15 pages.
Non-Final Office Action from U.S. Appl. No. 15/858,357, dated Jan. 7, 2020, 15 pages.
Non-Final Office Action from U.S. Appl. No. 15/858,410, dated Nov. 29, 2019, 14 pages.
Notice of Allowance from U.S. Appl. No. 15/868,489, dated Dec. 27, 2019, 2 pages.
Notice of Allowance from U.S. Appl. No. 15/868,489, dated Jan. 24, 2020, 2 pages.
Notice of Allowance from U.S. Appl. No. 15/870,221, dated Jan. 17, 2020, 22 pages.
Notice of Allowance from U.S. Appl. No. 15/873,693, dated Dec. 26, 2019, 9 pages.
Notice of Allowance from U.S. Appl. No. 15/873,693, dated Jan. 30, 2020, 5 pages.
Final Office Action from U.S. Appl. No. 15/863,751, dated Mar. 24, 2020, 16 pages.
Non-Final Office Action for U.S. Appl. No. 15/868,511 dated Feb. 5, 2020, 11 pages.
Non-Final Office Action from U.S. Appl. No. 15/858,110, dated Feb. 24, 2020, 13 pages.
Non-Final Office Action from U.S. Appl. No. 15/863,815, dated Mar. 18, 2020, 17 pages.
Non-Final Office Action from U.S. Appl. No. 15/867,571, dated Feb. 26, 2020, 28 pages.
Notice of Allowance from U.S. Appl. No. 15/863,819, dated Mar. 6, 2020, 10 pages.
Notice of Allowance from U.S. Appl. No. 15/868,489, dated Feb. 20, 2020, 2 pages.
Notice of Allowance from U.S. Appl. No. 15/870,221, dated Feb. 25, 2020, 19 pages.
Final Office Action from U.S. Appl. No. 15/867,496, dated Apr. 10, 2020, 14 pages.
Final Office Action from U.S. Appl. No. 15/870,179, dated Apr. 16, 2020, 6 pages.
Non-Final Office Action from U.S. Appl. No. 15/858,146, dated Apr. 1, 2020, 23 pages.
Non-Final Office Action from U.S. Appl. No. 15/867,486, dated Apr. 3, 2020, 36 pages.
Von-Final Office Action from U.S. Appl. No. 15/867,612, dated Apr. 3, 2020, 14 pages.
Non-Final Office Action from U.S. Appl. No. 15/868,505, dated Apr. 13, 2020, 12 pages.
Notice of Allowance from U.S. Appl. No. 15/863,819, dated Apr. 7, 2020, 8 pages.
Notice of Allowance from U.S. Appl. No. 15/870,221, dated Apr. 10, 2020, 19 pages.
Examination Report for Australian Application No. 2018395933 dated Sep. 30, 2020, 4 pages.
Final Office Action from U.S. Appl. No. 15/857,713, dated Jul. 16, 2020, 22 pages.

(56) References Cited

OTHER PUBLICATIONS

Final Office Action from U.S. Appl. No. 15/867,571, dated Sep. 3, 2020, 34 pages.
Final Office Action from U.S. Appl. No. 15/867,612, dated Sep. 28, 2020, 16 pages.
Final Office Action from U.S. Appl. No. 15/868,511, dated Jul. 14, 2020, 10 pages.
Non-Final Office Action from U.S. Appl. No. 15/858,207, dated Sep. 30, 2020, 20 pages.
Non-Final Office Action from U.S. Appl. No. 15/858,430, dated Oct. 6, 2020, 11 pages.
Non-Final Office Action from U.S. Appl. No. 15/867,505, dated Aug. 19, 2020, 21 pages.
Notice of Allowance from U.S. Appl. No. 15/858,110, dated Sep. 3, 2020, 11 pages.
Notice of Allowance from U.S. Appl. No. 15/858,125, dated Sep. 9, 2020, 17 pages.
Notice of Allowance from U.S. Appl. No. 15/858,146, dated Sep. 10, 2020, 9 pages.
Notice of Allowance from U.S. Appl. No. 15/858,357, dated Aug. 18, 2020, 12 pages.
Notice of Allowance from U.S. Appl. No. 15/858,410, dated Jul. 14, 2020, 12 pages.
Notice of Allowance from U.S. Appl. No. 15/863,815, dated Sep. 30, 2020, 13 pages.
Notice of Allowance from U.S. Appl. No. 15/868,505, dated Jul. 15, 2020, 8 pages.
Notice of Allowance from U.S. Appl. No. 15/868,511, dated Sep. 16, 2020, 9 pages.
Notice of Allowance from U.S. Appl. No. 15/870,179, dated Aug. 12, 2020, 7 pages.
Uppoor S. et al., "Cloud Based Synchronization of Distributed File System Hierarchies," Cluster Computing Workshops and Posters, Sep. 20, 2010, 4 pages.
Chiang J.K., et al., "Authentication, Authorization And File Synchronization On Hybrid Cloud—On Case of Google Docs, Hadoop, and Linux Local Hosts", IEEE, Jul. 2-5, 2013, pp. 116-123.
Communication under Rule 94(3) EPC for European Application No. 18839962.0 dated Oct. 26, 2020, 9 pages.
Communication Pursuant to Article 94(3) EPC for European Application No. 18830580.9 dated Jan. 14, 2021, 9 pages.
Communication Pursuant to Article 94(3) EPC for European Application No. 18836962.3 dated Jan. 14, 2020, 5 pages.
Examination Report No. 1, for Australian Application No. 2018395856, dated Dec. 14, 2020, 4 pages.
Examination Report No. 1, for Australian Application No. 2018395857, dated Mar. 9, 2021, 5 pages.
Examination Report No. 1, for Australian Application No. 2018395858, dated Feb. 5, 2021, 4 pages.
Examination Report No. 1, for Australian Application No. 2018397571, dated Mar. 4, 2021, 4 pages.
Examination Report No. 1 for Australian Application No. 2018397572 dated Feb. 8, 2021, 5 pages.
Examination Report No. 1, for Australian Application No. 2018395919, dated Dec. 22, 2020, 5 pages.
Examination Report No. 1 for Australian Application No. 2018395920 dated Oct. 16, 2020, 4 pages.
Examination Report No. 1, for Australian Application No. 2018397604, dated Dec. 22, 2020, 3 pages.
Final Office Action from U.S. Appl. No. 15/863,751, dated Dec. 16, 2020, 19 pages.
Final Office Action from U.S. Appl. No. 15/867,486, dated Nov. 3, 2020, 38 pages.
Final Office Action from U.S. Appl. No. 15/867,505, dated Feb. 8, 2021, 25 pages.
Kher V., et al., "Securing Distributed Storage: Challenges, Techniques, and Systems," ACM, Nov. 2005, pp. 9-25.
Marshall C.C., et al., "Supporting Research Collaboration through Bi-Level File Synchronization," ACM, Oct. 2012, pp. 165-174.
Non-Final Office Action from U.S. Appl. No. 15/857,713, dated Nov. 25, 2020, 28 pages.
Non-Final Office Action from U.S. Appl. No. 15/867,486, dated Feb. 5, 2021, 37 pages.
Non-Final Office Action from U.S. Appl. No. 15/867,612, dated Dec. 8, 2020, 17 pages.
Notice of Allowance from U.S. Appl. No. 15/858,110, dated Dec. 11, 2020, 10 pages.
Notice of Allowance from U.S. Appl. No. 15/858,110, dated Jan. 6, 2021, 2 pages.
Notice of Allowance from U.S. Appl. No. 15/858,125, dated Nov. 3, 2020, 17 pages.
Notice of Allowance from U.S. Appl. No. 15/858,146, dated Nov. 17, 2020, 10 pages.
Notice of Allowance from U.S. Appl. No. 15/858,192, dated Jan. 27, 2021, 9 pages.
Notice of Allowance from U.S. Appl. No. 15/863,815, dated Jan. 21, 2021, 12 pages.
Notice of Allowance from U.S. Appl. No. 15/867,571, dated Dec. 10, 2020, 16 pages.
Notice of Allowance from U.S. Appl. No. 15/867,571, dated Jan. 19, 2021, 1 pages.
Notice of Allowance from U.S. Appl. No. 15/867,612, dated Mar. 11, 2021, 5 pages.
Notice of Allowance from U.S. Appl. No. 15/868,511, dated Jan. 25, 2021, 7 pages.
Wang H., et al., "On the Impact of Virtualization on Dropbox-like Cloud File Storage/Synchronization Services," IEEE, Jun. 4-5, 2012, pp. 1-9.
Non-Final Office Action from U.S. Appl. No. 15/857,779, dated Oct. 15, 2020, 23 pages.
Non-Final Office Action from U.S. Appl. No. 15/857,784, dated Dec. 19, 2019, 18 pages.
Non-Final Office Action from U.S. Appl. No. 15/857,784, dated Jul. 24, 2020, 19 pages.
Non-Final Office Action from U.S. Appl. No. 15/857,789, dated Jan. 22, 2020, 15 pages.
Non-Final Office Action from U.S. Appl. No. 15/857,789, dated Sep. 29, 2020, 19 pages.
Non-Final Office Action from U.S. Appl. No. 16/026,531, dated Jul. 27, 2020, 22 pages.
Non-Final Office Action from U.S. Appl. No. 16/118,514, dated Nov. 27, 2019, 13 pages.
Notice of Allowance from U.S. Appl. No. 15/857,715, dated Aug. 7, 2020, 5 pages.
Notice of Acceptance for Australian Application No. 2018395920 dated Apr. 27, 2021, 3 pages.
Notice of Allowance from U.S. Appl. No. 15/857,588, dated Oct. 7, 2020, 10 pages.
Notice of Allowance from U.S. Appl. No. 15/857,766, dated Apr. 7, 2020, 19 pages.
Notice of Allowance from U.S. Appl. No. 15/857,766, dated Mar. 10, 2020, 20 pages.
Notice of Allowance from U.S. Appl. No. 15/857,784, dated Dec. 30, 2020, 15 pages.
Notice of Allowance from U.S. Appl. No. 15/858,192, dated Apr. 8, 2021, 10 pages.
Notice of Allowance from U.S. Appl. No. 15/858,207, dated Mar. 24, 2021, 17 pages.
Notice of Allowance from U.S. Appl. No. 15/863,751, dated Apr. 15, 2021, 2 pages.
Notice of Allowance from U.S. Appl. No. 15/863,751, dated Mar. 24, 2021, 8 pages.
Notice of Allowance from U.S. Appl. No. 15/867,505, dated Apr. 28, 2021, 14 pages.
Notice of Allowance from U.S. Appl. No. 16/026,531, dated Jan. 29, 2021, 9 pages.
Notice of Allowance from U.S. Appl. No. 16/118,514, dated Apr. 8, 2020, 17 pages.
Notice of Allowance from U.S. Appl. No. 16/118,514, dated May 20, 2020, 11 pages.

(56) References Cited

OTHER PUBLICATIONS

NTFS, "File and Folder Basic NTFS Permissions," Dec. 7, 2016, retrieved from http://www.ntfs.com/ntfs-permissions-file-folder.htm, on Jan. 14, 2020, 9 Pages.

Prusty N., et al., "UNIX File System Permissions Tutorial," retrieved from URL: http://qnimate.com/understanding-unix-filesystem-permissions/, 2014-2015, 8 pages.

Requirement for Restriction/Election from U.S. Appl. No. 15/857,588, dated Jan. 29, 2020, 6 pages.

Rubyrailesguide, "Active Record Callbacks," Nov. 18, 2016, retrieved from https://web.archive.org/web/20161118225731/http://guides.rubyonrails.org/active_record_callbacks.html, on Dec. 13, 2019, 11 Pages.

Search Query Report from IP.com (performed Feb. 25, 2020).

Search Query Report from IP.com (performed Mar. 27, 2020).

Shields I., et al., "Learn Linux, 101: Manage File Permissions and Ownership," https://developer.ibm.com/technologies/linux/tutorials/I-Ipic1-104-5/, Jan. 27, 2016, 21 pages.

Ucar, "Setting file and directory permissions," Sep. 2017, retrieved from https://web.archive.org/web/20170920093821/https://www2.cisl.ucar.edu/user-support/setting-file-and-directory-permissions, on Dec. 8, 2019, 5 Pages.

UNIX & Linux Stack Exchange, "Execute vs Read Bit. How do Directory Permissions in Linux Work?", Dec. 15, 2016, retrieved from https://unix.stackexchange.com/questions/21251/execute-vs-read-bit-how-do-directory-permissions-in-linux-work, on Mar. 20, 2020, 3 pages.

Communication pursuant to Article 94(3) EPC for EP Application No. 18833555.8, dated Jun. 8, 2021, 6 pages.

Communication Pursuant to Article 94(3) EPC for European Application No. 18834121.8 dated Apr. 28, 2021, 10 pages.

Communication Pursuant to Article 94(3) EPC for European Application No. 18836317.0 dated Feb. 23, 2021, 9 pages.

Daudjee K., et al., Article entitled "Inferring a Serialization Order for Distributed Transactions", 2006, 3 pages.

Non-Final Office Action from U.S. Appl. No. 15/858,430, dated Jun. 24, 2021, 11 pages.

Non-Final Office Action from U.S. Appl. No. 16/887,714, dated Jun. 28, 2021, 63 pages.

Notice of Acceptance for Australian Application No. 2018395858 dated Jul. 7, 2021, 3 pages.

Notice of Allowance from U.S. Appl. No. 15/858,207, dated May 25, 2021, 2 pages.

Notice of Allowance from U.S. Appl. No. 15/867,505, dated Jun. 28, 2021, 5 pages.

Notice of Allowance from U.S. Appl. No. 15/867,505, dated May 5, 2021, 10 pages.

Office Action for Canada Application No. 3,081,372 dated Jun. 7, 2021, 4 pages.

Tridgell A.,., et al., "rsync," edited on Nov. 24, 2017, retrieved from https://en.wikipedia.org/wikipedia.org/w/index.php?title=Rsync&oldid=811846440#cite_note-pool-25, on Apr. 20, 2021, 7 pages.

Tridgell A., "rsync(1)," XP055032454, retrieved from http://sunsite.ualberta.ca/Documentation/Misc/rsync-2.6.6/rsync.1.html, Jul. 28, 2005, 33 pages.

"Active Directory Architecture", retrieved from https://technet.microsoft.com/en-us/library/bb727030.aspx, 2017, pp. 1-39.

Advisory Action from U.S. Appl. No. 15/857,772, dated Feb. 9, 2021, 4 pages.

Advisory Action from U.S. Appl. No. 15/867,505, dated Apr. 2, 2021, 4 pages.

Advisory Action from U.S. Appl. No. 15/857,772, dated Jun. 12, 2020, 3 pages.

Biztalkserver, "Optimizing Business Rule Engine (BRE) Performance," Jun. 7, 2017, retrieved from https://docs.microsoft.com/en-us/biztalk/technical-guides/optimizing-business-rule-engine-bre-performance, on Oct. 22, 2019, 5 Pages.

Capra R., et al., "File Synchronization and Sharing: User Practices and Challenges", 77th ASIS&T Annual Meeting, Seattle, WA, Oct. 31-Nov. 5, 2014, 10 pages.

Chris G., "Dropbox for Business 3.0", retrieved from www.chrismgrant.com/product-design/dropbox-for-business, 2018, pp. 1-98.

Clercq J D., "How to Use the Bypass Traverse Checking User Right," Aug. 27, 2008, ITProToday, https://www.itprotoday.com/print/20355, 2 pages.

Examination Report No. 1, for Australian Application No. 2018393933, dated Mar. 9, 2021, 4 pages.

Examination Report No. 2, for Australian Application No. 2018395856, dated Mar. 18, 2021, 4 pages.

Examination Report No. 2, for Australian Application No. 2018397571, dated Mar. 30, 2021, 4 pages.

Examination Report No. 2, for Australian Application No. 2018395919, dated May 3, 2021, 3 pages.

Final Office Action from U.S. Appl. No. 15/857,588, dated Aug. 3, 2020, 16 pages.

Final Office Action from U.S. Appl. No. 15/857,713, dated Apr. 7, 2021, 22 pages.

Final Office Action from U.S. Appl. No. 15/857,725, dated Oct. 26, 2020, 14 pages.

Final Office Action from U.S. Appl. No. 15/857,729, dated Dec. 7, 2020, 15 pages.

Final Office Action from U.S. Appl. No. 15/857,729, dated Mar. 11, 2020, 16 pages.

Final Office Action from U.S. Appl. No. 15/857,732, dated Feb. 26, 2021, 35 pages.

Final Office Action from U.S. Appl. No. 15/857,732, dated May 1, 2020, 26 pages.

Final Office Action from U.S. Appl. No. 15/857,772, dated Mar. 26, 2020, 12 pages.

Final Office Action from U.S. Appl. No. 15/857,772, dated Nov. 12, 2020, 18 pages.

Final Office Action from U.S. Appl. No. 15/857,779, dated Jun. 17, 2020, 25 pages.

Final Office Action from U.S. Appl. No. 15/857,779, dated Mar. 2, 2021, 26 pages.

Final Office Action from U.S. Appl. No. 15/857,784, dated Apr. 3, 2020, 18 pages.

Final Office Action from U.S. Appl. No. 15/857,784, dated Oct. 30, 2020, 20 pages.

Final Office Action from U.S. Appl. No. 15/857,789, dated Feb. 24, 2021, 21 pages.

Final Office Action from U.S. Appl. No. 15/857,789, dated Jun. 5, 2020, 15 pages.

Final Office Action from U.S. Appl. No. 15/858,430, dated Apr. 15, 2021, 12 pages.

"Give Access to a Subdirectory Without Giving Access to Parent Directories," Dec. 17, 2012, superuser, https://superuser.com/questions/520537/give-access-to-a-subdirectory-without-giving-access-to-parent-directories, 5 pages.

Grunbacher., et al., "POSIX Access Control Lists on Linux," Usenix, https://www.usenix.org/legacy/publications/library/proceedings/usenix03/tech/freenix03/full_papers/gruenbacher/gruenbacher_html/main.html, Apr. 4, 2003, pp. 1-23.

"How to Create Home Folders for User Accounts", retrieved from https://www.manageengine.com/products/ad-manager/admanager-kb/create-home-folders-for-user-accounts.html 2015, pp. 1-5.

Karjoth G., et al., "Implementing ACL-based Policies in XACML," 2008, Annual Computer Security Applications Conference, 10 pages.

King E., "Linux Namespaces," https://medium.com/@teddyking/linux-namespaces-850489d3ccf, Dec. 10, 2016, 3 pages.

Klein H., "Puzzle: Delete Directory Content Without Deleting the Directory Itself (on the Command Line)", retrieved from https://helgeklein.com/blog/author/helge/, on Aug. 5, 2009, pp. 1-11.

Kuo Y H., et al., "A Hybrid Cloud Storage Architecture for Service Operational High Availability", COMPSACW, Jul. 2013, pp. 487-492.

LINUX.ORG., "Mount a File System," retrieved from https://www.linux.org/docs/man8/mount.html, Jan. 2012, pp. 1-17.

Microsoft Outlook, "Cannot Copy this Folder because it may Contain Private Items," Feb. 23, 2015, retrieved from http://techy-wire.blogspot.com/2015/02/cannot-copy-this-folder-because-it-may.html, 3 pages.

(56) References Cited

OTHER PUBLICATIONS

Non-Final Office Action from U.S. Appl. No. 15/857,588, dated Apr. 2, 2020, 14 pages.
Non-Final Office Action from U.S. Appl. No. 15/857,715, dated Feb. 20, 2020, 8 pages.
Non-Final Office Action from U.S. Appl. No. 15/857,725, dated Feb. 25, 2021, 14 pages.
Non-Final Office Action from U.S. Appl. No. 15/857,725, dated Jan. 2, 2020, 10 pages.
Non-Final Office Action from U.S. Appl. No. 15/857,725, dated Jun. 18, 2020, 13 pages.
Non-Final Office Action from U.S. Appl. No. 15/857,729, dated Jul. 21, 2020, 15 pages.
Non-Final Office Action from U.S. Appl. No. 15/857,729, dated Nov. 20, 2019, 12 pages.
Non-Final Office Action from U.S. Appl. No. 15/857,732, dated Dec. 27, 2019, 29 pages.
Non-Final Office Action from U.S. Appl. No. 15/857,732, dated Sep. 17, 2020, 29 pages.
Non-Final Office Action from U.S. Appl. No. 15/857,766, dated Oct. 31, 2019, 27 pages.
Non-Final Office Action from U.S. Appl. No. 15/857,772, dated Jul. 23, 2020, 16 pages.
Non-Final Office Action from U.S. Appl. No. 15/857,772, dated Nov. 25, 2019, 11 pages.
Non-Final Office Action from U.S. Appl. No. 15/857,779, dated Jan. 17, 2020, 17 pages.

* cited by examiner

UPDATING A REMOTE TREE FOR A CLIENT SYNCHRONIZATION SERVICE

CROSS-REFERENCE TO RELATED APPLICATIONS

This application claims the benefit of U.S. provisional application No. 62/611,473, filed on Dec. 28, 2017, which is expressly incorporated by reference herein in its entirety.

BACKGROUND

Content management systems allow users to access and manage content items across multiple devices using a network. Some content management systems may allow users to share content items and provide additional features that aid users in collaborating using the content items. Content management systems generally store content items on servers and allow users access to the content items over a network. Some content management systems also allow for local copies to be stored on a client device in order to provide users with faster access to content items in a more natural interface (e.g., a native application or within the file system of the client device). Additionally, this allows the user to have access to the content items when the user is offline. Content management systems attempt to synchronize copies of a content item across a number of client devices and the servers so that each copy is identical. However, synchronization of content items is difficult and is associated with numerous technical obstacles.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
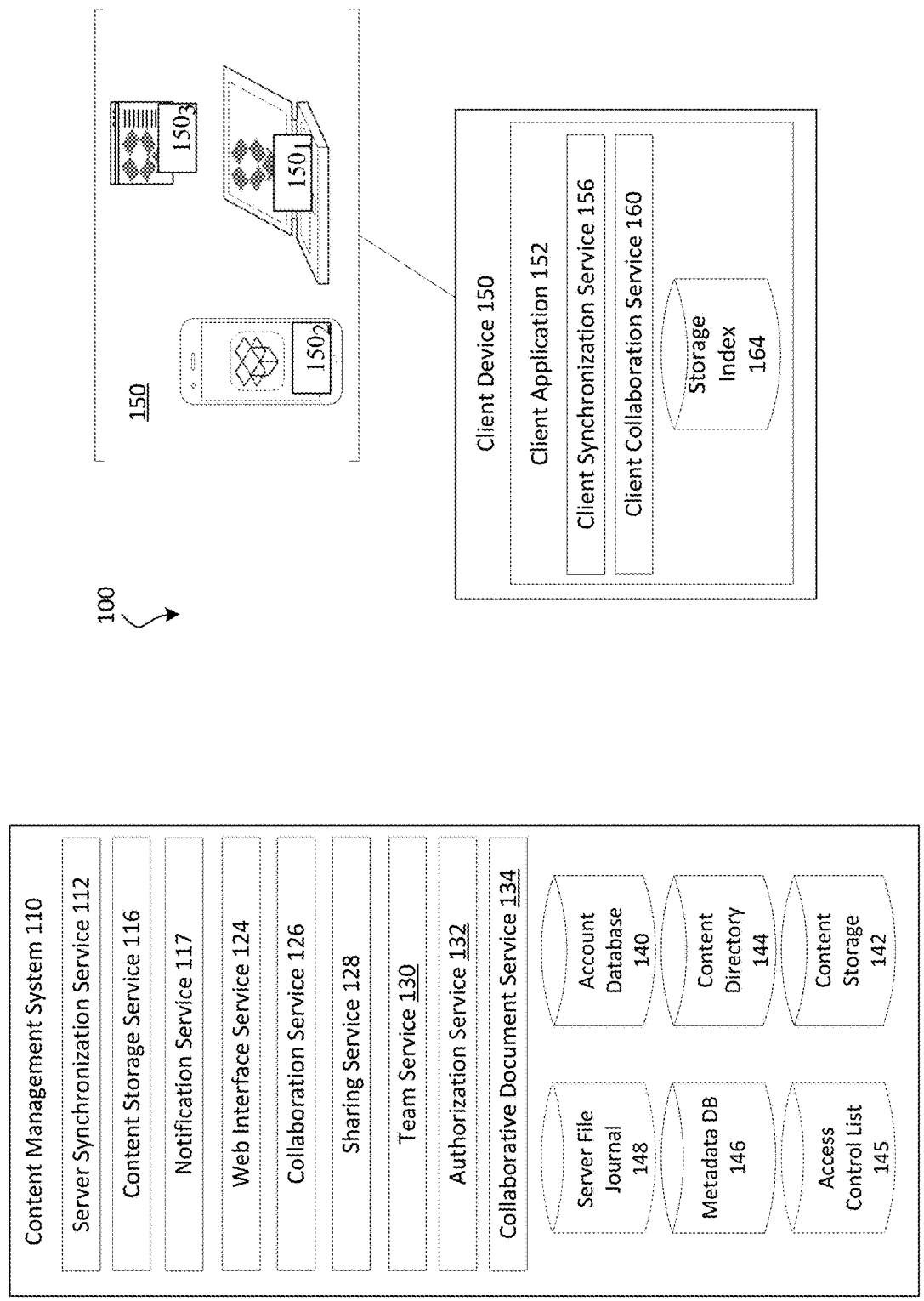
FIG. 1 shows an example of a content management system and client devices, in accordance with some embodiments.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Various advances in computing and networking technologies have enabled content management systems to provide users with access to content items across multiple devices. The content items may include, but are not limited to, files, documents, messages (e.g., email messages or text messages), media files (e.g., photos, videos, and audio files) folders containing multiple files, or any other unit of content. Content items may be shared with multiple users, edited, deleted, added, renamed, or moved. However, synchronizing these content items across several computing devices (e.g., servers and client devices) and across several user accounts has remained flawed and rife with technological obstacles.

To illustrate some of the technical obstacles, a first machine (e.g., a client device or server) may send communications to a second machine that provide information about how a user has modified content items managed by the content management system. These communications may be used by the second machine to synchronize the content items on the second machine such that actions performed on content items on the first machine are reflected in content items the second machine and the content items on the first machine are substantially identical to the content items on the second machine.

However, there may be several communications sent and the communications may be received out of order as a result of various network routing protocols used by the one or more networks used to transmit the communications, the technical operations of the first or second machine, or some other reason. Furthermore, a user may be performing a large number of modifications to a large number of content items, undo previous modifications in a short amount of time, or quickly perform additional modifications to a previously modified content item or set of content items. This increases the likelihood that these communications are received out of order, certain communications are out of date, or that the second machine will perform operations on content items that are not up to date. As a result, many of the operations may not be compatible with the current state of the content items. In fact, it may be difficult to even detect whether some operations are in conflict with other operations or with the current state of the content items.

Additionally, there is an inherent latency with respect to synchronization actions. For example, actions taken on the first machine is first detected by the first machine, and a communication is generated and then transmitted through a network. The communication is received by the second machine which may still be processing previous communications, processed, and actions detailed in the communications may be taken at the second machine. In this illustrative scenario, there are several points where latency is introduced by limited computing resources (e.g., bandwidth, memory, processing time, processing cycles, etc.) of the first machine, the second machine, and the network. As latency increases the likelihood that communications, for some reason, conflict with the current state of the content items are increased. Furthermore, processing these conflicted communications and resolving the conflicts also expends needless computing resources such as processing time, memory, energy, or bandwidth and further increases latency.

To further complicate matters, the same or different user on the second machine and/or additional machines with access to the content items may also be performing modification to the content items. As a result, the issues above may be multiplied and additional technical issues arise as to whether local actions conflict with remote actions and/or whether local actions are operating on up to date content items.

The disclosed technology addresses the need in the art for a client synchronization service for a content management system that provides a technical solution to the technical problems above as well as others. The client synchronization service may be configured to operate on a client device and identify synchronization mismatches between content items on a server of the content management system and corresponding content items on the client device. For each synchronization mismatch, the client synchronization service may identify operations needed to synchronize the content items and initiate those operations.

The client synchronization service may track the status of content items on the server, the status of content items on the client device, and their synchronization state using a set of tree data structures ("trees"). According to some embodiments, a set of 3 trees may be used. The three trees may include a remote tree that represents a server state, a local tree that represents the file system state on the client device, and a sync tree that represents a merge base for the local tree and the remote tree. The merge base may be thought of as a common ancestor of the local tree and the remote tree or a last known synced state between the local tree and the remote tree. Accordingly, the client synchronization service may determine that the server state and the client device state are synchronized when all 3 trees (e.g., the remote tree, the sync tree, and the local tree) are identical.

When a modification to the server state of the content items or the client device file system state ("file system state") of the content items is detected, the client synchronization service updates the appropriate tree and determines whether the server state and the file system state are synchronized based on the triumvirate of trees. Based on the update to one of the trees, the server state and the file system state may become synchronized, become unsynchronized, or become further unsynchronized. If the server state and the file system state are not synchronized, the client synchronization service may identify at least an initial set of operations needed to converge the server state and the file system state and get the server state and the file system state closer to a synchronized state.

By relying on the set of tree data structures to monitor the server state and the file system state provides alternatives and/or solutions rooted in computing technology to various technical problems. For example, the client synchronization service is able to track the server state as well as the file state and store a representation of a merge base of the two states. As a result, the various embodiments of the subject technology avoid the technical problems associated with receiving a number of communications specifying how users are modifying content items remotely and determining which order these modifications should be implemented locally, whether the modifications conflict with other modifications or are out of date, and whether remote modifications conflict with local modifications performed locally by users. Many of these issues arise from other solutions not being able to track the state of the various actors involved (e.g., the server and the client device) and not being able to quickly determine whether the states are in sync. Instead, these other solutions rely on receiving instructions on how to modify content items locally, without the context of whether the server state and file system state are in sync.

Furthermore, since the server state and the file system state are continuously monitored, determining whether they are synced is much more efficient in terms of procedural complexity as well as computing time and resources. As is described in further detail below, the client synchronization service enables the incremental and methodical synchronization of the server state and the file system state in a more deterministic manner. As a result, the scaling and testing of content management system features is also more efficient.

Content Management System

In some embodiments, the disclosed technology is deployed in the context of a content management system having content item synchronization capabilities and collaboration features, among others. An example system configuration 100 is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device 150$_1$ is a computing device having a local file system accessible by multiple applications resident thereon. Client device 150$_2$ is a computing device wherein content items are only accessible to a specific application or by permission given by the specific application, and the content items are typically stored either in an application specific space or in the cloud. Client device 150$_3$ is any client device accessing content management system 110 via a web browser and accessing content items via a web interface. While example client devices 150$_1$, 150$_2$, and 150$_3$ are depicted in form factors such as a laptop, mobile device, or web browser, it should be understood that the descriptions thereof are not limited to devices of these example form factors. For example a mobile device such as client 150$_2$ might have a local file system accessible by multiple applications resident thereon, or client 150$_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Team's service 130 can provide a common shared space for the team, private user account folders, and access limited shared folders. Team's service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Client Synchronization Service

Figure 2:
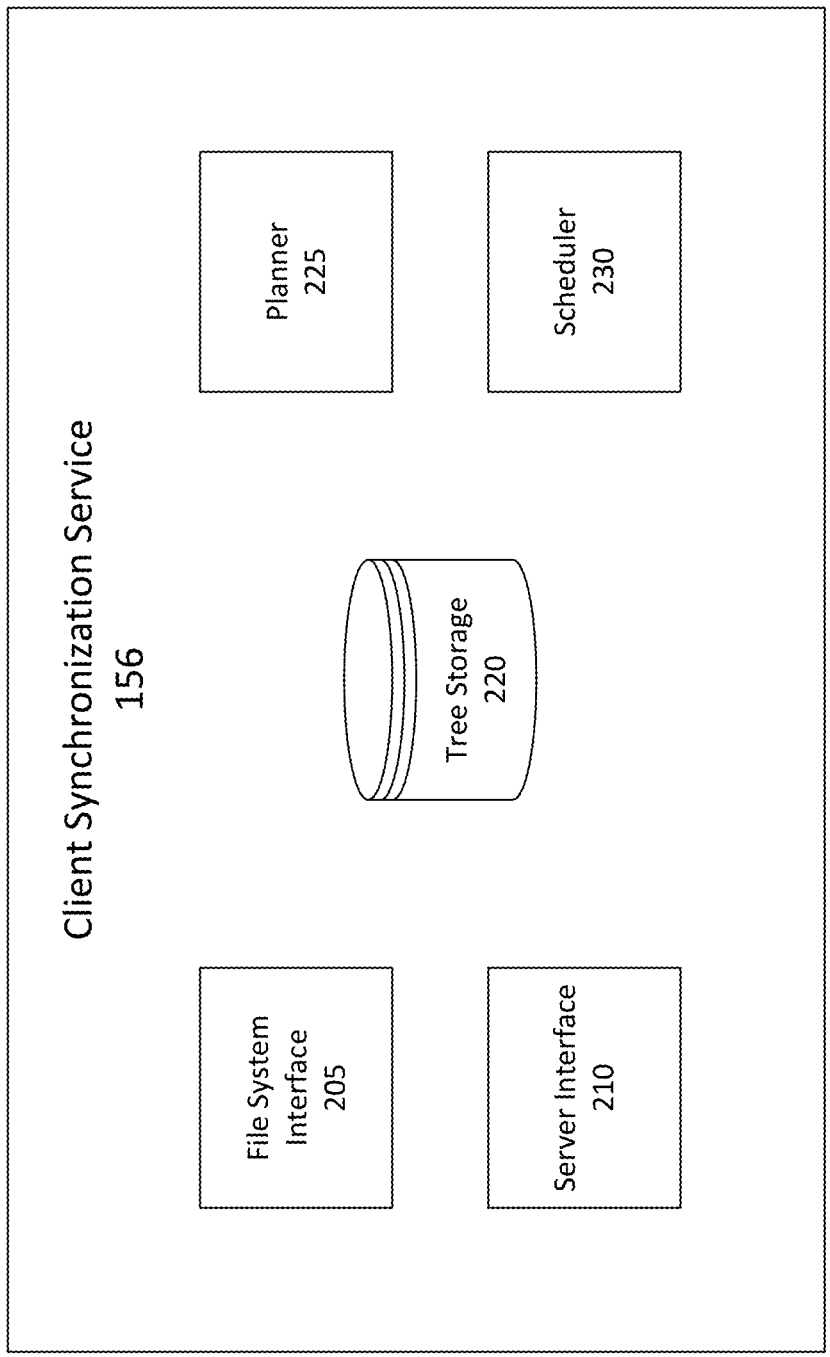
FIG. 2 shows an example of a client synchronization service, in accordance with some embodiments.

FIG. 2 shows an example of a client synchronization service 156, in accordance with some embodiments. According to some embodiments, client synchronization service 156 may be implemented in the client device of FIG. 1. However, in other embodiments, client synchronization service 156 may be implemented on another computing device. Client synchronization service 156 is configured to synchronize changes to content items between a content management system and the client device on which client synchronization service 156 runs.

Client synchronization service 156 may include file system interface 205, server interface 210, tree storage 220, planner 225, and scheduler 230. Additional or alternative components may also be included. High level descriptions of client synchronization service 156 and its components are discussed below with respect to FIG. 2. However, further details and embodiments of client synchronization service 156 and its components are discussed throughout.

File system interface 205 is configured to process changes to content items on the local filesystem of the client device and update the local tree. For example, file system interface 205 can be in communication with client synchronization service 156 of FIG. 1 detect changes to content items on the local filesystem of the client device. Changes may also be made and detected via client application 152 of FIG. 1. File system interface 205 may make updates to the local tree may be made based on the changes (new, deleted, modified, copied, renamed, or moved content items) to content items on the client device.

Server interface 210 is configured to aid in the processing of remote changes to content items at a remote storage of the content management system and updating of the remote tree. For example, server interface 210 can be in communication with server synchronization service 112 of FIG. 1 to synchronize changes to content items between client device 150 and content management system 110. Changes (new, deleted, modified, copied, renamed, or moved content items) to content items at content management system 110 may be detected and updates may be made to the remote tree to reflect the changes at content management system 110.

Tree storage 220 is configured to store and maintain the tree data structures used by client synchronization service 156. For example, tree storage 220 may store the local tree, the sync tree, and the remote tree. According to some embodiments, tree storage 200 may store the tree data structures in persistent memory (e.g., a hard disk or other secondary storage device) as well as in main memory (e.g., RAM or other primary storage device) in order to reduce latency and response time. For example, on start-up of the client device or client synchronization service 156, the tree data structures may be retrieved from persistent memory and loaded into main memory. Tree storage 220 may access and update the tree data structures on main memory and, before the client device or client synchronization service 156 is shut down, tree storage 220 may store the updated tree data structures on persistent memory. Because main memory is expensive in cost and often limited in size on most client devices, additional technological improvements are implemented to decrease the footprint of the tree data structures on main memory. These technological solutions are described further below.

Planner 225 is configured to detect differences between the server state associated with the content management system and the file system state associated with the client device based on the state of the tree data structures. For example, planner 225 may determine if there is a difference between the remote tree and the sync tree. A difference between the remote tree and the sync tree indicates that an action performed remotely on one or more content items stored at the content management system has caused the server state and the file system state to become out of sync. Similarly, planner 225 may also determine if there is a difference between the local tree and the sync tree. A difference between the local tree and the sync tree indicates that an action performed locally on one or more content items stored on the client device has caused the server state and the file system state to become out of sync. If a difference is detected, planner 225 generates a set of operations that synchronize the tree data structures.

In some scenarios, a set of operations generated based on a difference between the remote tree and the sync tree and a set of operations generated based on a difference between the local tree and the sync tree may conflict. Planner 225 is may also be configured to merge the two sets of operations into a single merged plan of operations.

Scheduler 230 is configured to take the generated plan of operations and manage the execution of those operations. According to some embodiments, scheduler 230 converts each operation in the plan of operations into a series of one or more tasks that need to be executed in order to perform the operation. In some scenarios, some tasks may become out dated or no longer relevant. Scheduler 230 is configured to identify those tasks and cancel them.

Tree Data Structures

Figure 3:
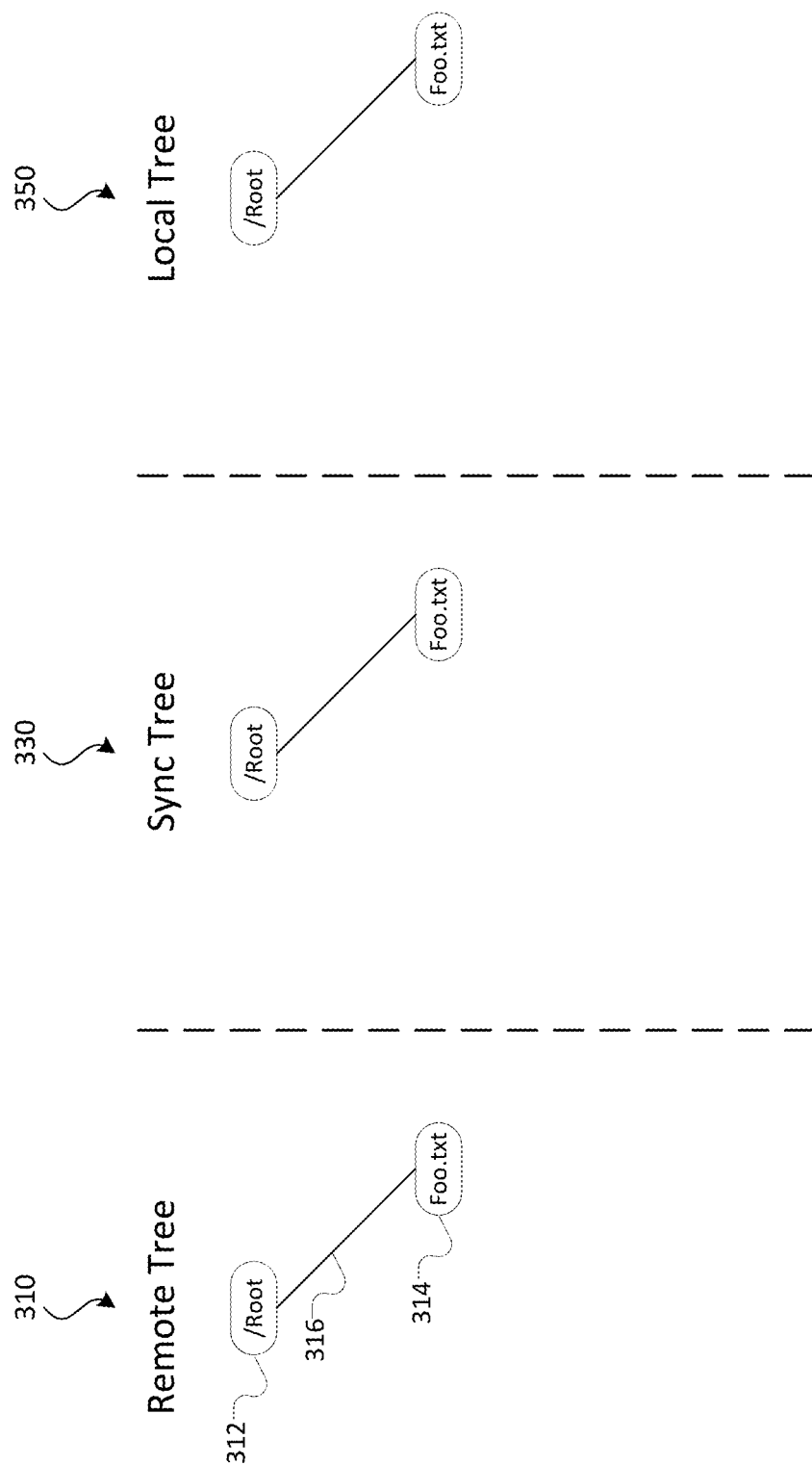
FIG. 3 shows an example of tree data structures, in accordance with various embodiments.

FIG. 3 shows an example of tree data structures, in accordance with various embodiments. The tree data structures may be stored at the client device and managed by a client synchronization service such as client synchronization service 156 in FIG. 2. In FIG. 3, the tree data structures are shown including remote tree 310, sync tree 330, and local tree 350.

Remote tree 310 represents a server state or the state of content items stored remotely from the client device (e.g., on a server of the content management system). Local tree 350 represents a file system state or the state of the corresponding content items stored locally on the client device. Sync tree 330 represents a merge base for the local tree and the remote tree. The merge base may be thought of as a common ancestor of the local tree and the remote tree or a last known synced state between the local tree and the remote tree.

Each tree data structure (e.g., remote tree 310, sync tree 330, or local tree 350) may include one or more nodes. Each node may have one or more child nodes and the parent-child relationship is represented by an edge. For example, remote tree 310 includes nodes 312 and 314. Node 312 is a parent of node 314 and node 314 is a child of node 312. This parent-child relationship is represented by edge 316. A root node, such as root node 312, does not have a parent node. A leaf node, such as node 314, does not have a child node.

Each node in a tree data structure may represent a content item (e.g., a file, document, folder, etc.). For example, root node 312 may represent the root folder associated with the content management system and node 314 may represent a file (e.g., a text file named "Foo.txt") located in that root folder. Each node in a tree data structure may contain data such as, for example, a directory file identifier ("DirFileID") specifying the file identifier of a parent node of the content item, a file name for the content item, a file identifier for the content item, and metadata for the content item. In some embodiments each node in a tree data structure may be keyed or referenced by its file identifier and have a unique path from the root to the node.

As described above, a client synchronization service may determine that the server state and the file system state of the client device are synchronized when all 3 trees (e.g., remote tree 310, sync tree 330, and local tree 350) are identical. In other words, the trees are in sync when their tree structures and the relationships that they express are identical and the data contained in their nodes are identical as well. Conversely, the trees are not in sync if the 3 trees are not identical. In the example scenario illustrated in FIG. 3, remote tree 310, sync tree 330, and local tree 350 are shown as being identical and in sync and, as a result, the server state and the file system state are synchronized.

Tracking Changes Using Tree Data Structures

Figure 4:
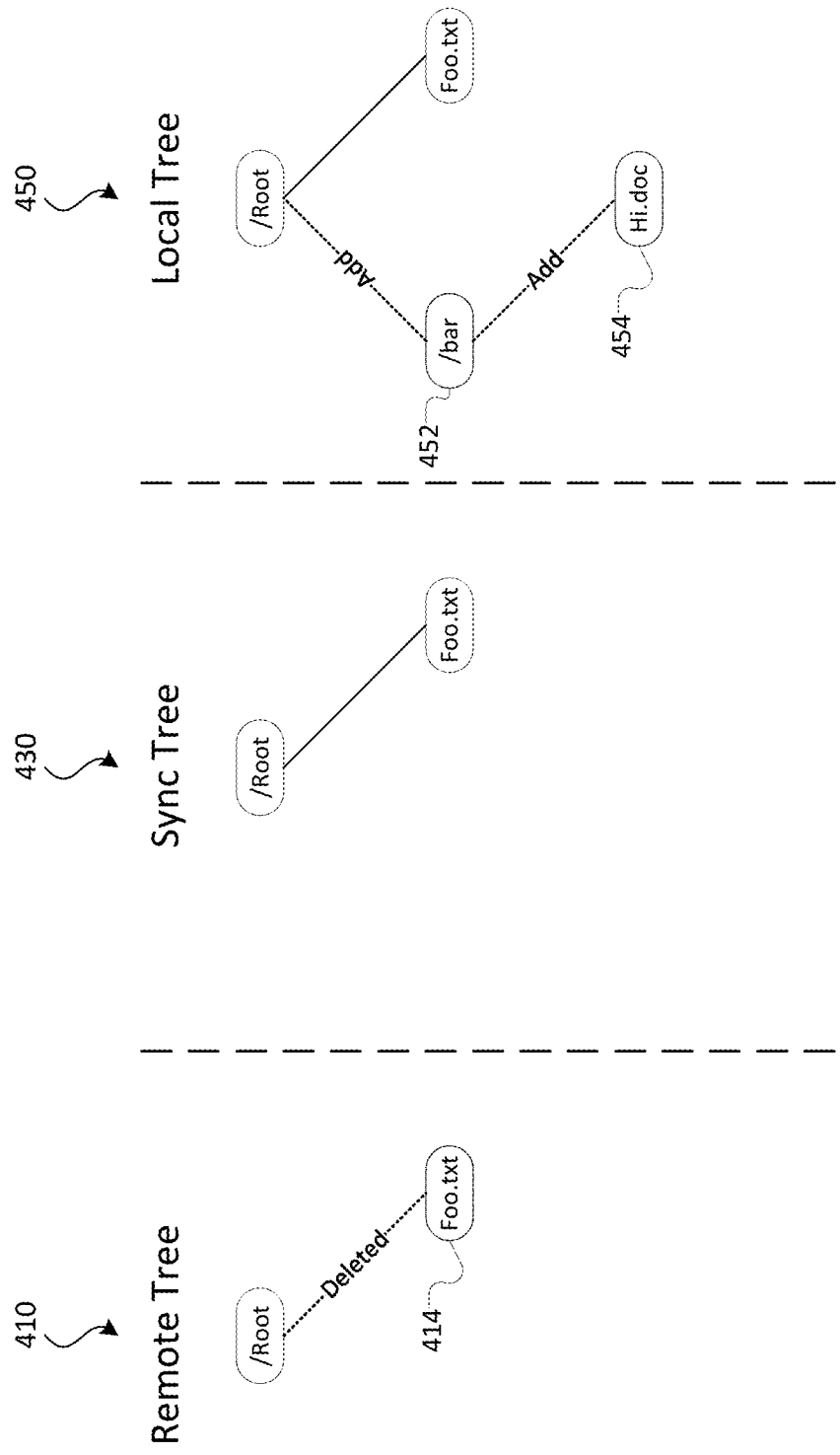
FIG. 4 shows an example of tree data structures, in accordance with various embodiments.

FIG. 4 shows an example of tree data structures, in accordance with various embodiments. As with the tree data structures shown in FIG. 3, the tree data structures shown in FIG. 4 (including remote tree 410, sync tree 430, and local tree 450) may be stored at the client device and managed by a client synchronization service such as client synchronization service 156 in FIG. 2. In FIG. 3, the tree data structures are shown.

FIG. 4 shows a scenario after a previously synchronized state, such as the scenario illustrated in FIG. 3, additional actions are performed on the content items represented in the trees to modify the content items such that the trees are no longer in sync. Sync tree 430 maintains a representation of the previously known synchronized state and may be used by the client synchronization service to identify the differences between the server state and the file system state as well as generate operations for the content management system and/or the client device to perform to converge so that the server state and the file system state are synchronized.

For example, a user (the same user as the user associated with the client device or a different user with access to the content item) may make modifications to the "foo.txt" content item stored by the content management system. This content item is represented by node 414 in remote tree 410. The modification shown in the remote tree 410 is a removal (e.g., a removal of the content item from a space managed by the content management system) or delete of the foo.txt content item. These modifications may be performed, for example, on another client device and the modifications were synced to the content item stored by the content management system or content item stored by the content management system via a web browser.

When the change is made on the content management system, the content management system generates modification data specifying the change made and transmits the modification data to the client synchronization service on the client device. The client synchronization service updates the remote tree representing the server state for the content items stored by the content management system based on the modification data. For example, in remote tree 410, node 414 representing the foo.txt content item is shown as deleted.

The client synchronization service may identify a difference between remote tree 410 and sync tree 430 and, as a result, determine that a modification of the content items at the content management system has caused the server state and the file system state to no longer be in sync. The client synchronization service may further generate and execute a set or sequence of operations for the content items stored on the client device that are configured to converge the server state and the file system state so that they will be in sync.

Additionally or alternatively, a user (the same user as the user associated with modifications at the content management system or a different user with access to the content item) may make modifications to the content items stored locally on the client device that are associated with the content management system. For example, the user may add a folder "/bar" to the "/root" folder and add a "Hi.doc" document to the "/bar" folder.

When the change is made on the client device, the client device (e.g., client synchronization service 156 or client application 152 of FIG. 1) generates modification data specifying the change made and passes the modification data to the client synchronization service on the client device. The client synchronization service updates the local tree representing the file system state for the content items stored on the client device based on the modification data. For example, in local tree 450, node 452 and node 454 are shown as added. Node 452 and node 454 represent the "/bar" folder and the "Hi.doc" document respectively.

The client synchronization service may identify a difference between local tree 450 and sync tree 430 and, as a result, determine that a modification of the content items at the client device has caused the server state and the file system state to no longer be in sync. The client synchronization service may further generate a set or sequence of operations for the content items stored by the content management system that are configured to converge the server state and the file system state so that they will be in sync. These operations may be transmitted to the content management system for execution.

As seen in FIG. 4, modifications to content items stored on the client device and content items stored by the content management system may occur at substantially the same time or within a particular time period. These modifications can be reflected in the tree data structures and used by the client synchronization service to generate operations for the client device and for the content management system in parallel. In other scenarios, however, modifications may not necessarily occur within the same time period and operations may be generated in an as-needed manner. Furthermore, although FIG. 4 illustrates scenarios for adding content items and deleting content items, other types of modifications such as, editing, renaming, copying, or moving content items are also supported.

According to various embodiments, identifying a difference between two tree data structures and generating operations may involve checking each node in both tree data structures and determining whether an action has been performed on the node. The actions may include, for example, the addition of the node, the deletion of the node, the editing of the node, or the moving of the node. These actions may then be used to generate the operations configured to converge the server state and the file system state.

For example, if the two tree data structures are a sync tree and a remote tree, the client synchronization service may identify each node in the sync tree by, for example, requesting the file identifiers of all nodes in the sync tree. For each node or file identifier for the node in the sync tree, the client synchronization service may determine if the node or file identifier is also in the remote tree. A node or file identifier in the sync tree that is not found in the remote tree may indicate that the node has been deleted from the server state that is represented by the remote tree. Accordingly, the client synchronization service may determine that a delete action has occurred on the remote tree. If the node or file identifier for the node is found in the remote tree, the client synchronization service may check whether the node in the remote tree has been edited or moved.

To determine whether the node in the remote tree has been edited with respect to the node in the sync tree, the client synchronization service may compare the metadata for the node in the sync tree with the metadata for the corresponding node (e.g., the node with the same file identifier) in the remote tree. The metadata may include information that may be used to determine whether the content item represented by the node has been edited. For example, the metadata may include one or more hash values that are generated based on the data in the content item or a portion thereof. The metadata may additionally or alternatively include a size value, a last modified value, or other value for the content item. The metadata for the node in the sync tree may be compared with the metadata for the node in the remote tree. If the metadata do not match, an edit of the content item may have been edited in the server state represented by the remote tree. Accordingly, the client synchronization service may determine that an edit action has occurred for the node on the remote tree. If the metadata matches, no edit may have occurred.

To determine whether the node in the remote tree has been moved, the client synchronization service may compare the location for the node in the sync tree with the location for the corresponding node (e.g., the node with the same file identifier) in the remote tree. The location may include, for example, a path where the node is located, a file name, and/or a directory file identifier ("DirFileID") specifying the file identifier of the node's parent. If the locations match, no move may have occurred. On the other hand, if the locations do not match, a move of the content item may have occurred in the server state represented by the remote tree. Accordingly, the client synchronization service may determine that a move action has occurred for the node on the remote tree.

To determine whether a node has been added to the remote tree, the client synchronization service may identify any nodes or file identifiers in the remote tree that are not found in the sync tree. If a node or file identifier is found in the remote tree and not found in the sync tree, the client synchronization service may determine that an add action of this node has occurred on the remote tree representing the server state.

Although the example above is described with respect to the sync tree and the remote tree, in other embodiments, a similar process may occur with the sync tree and a local tree in order to identify a difference between the sync tree and the local tree and determine which actions have occurred on the local tree representing the file system state.

Synchronization Using Tree Data Structures

Figure 5:
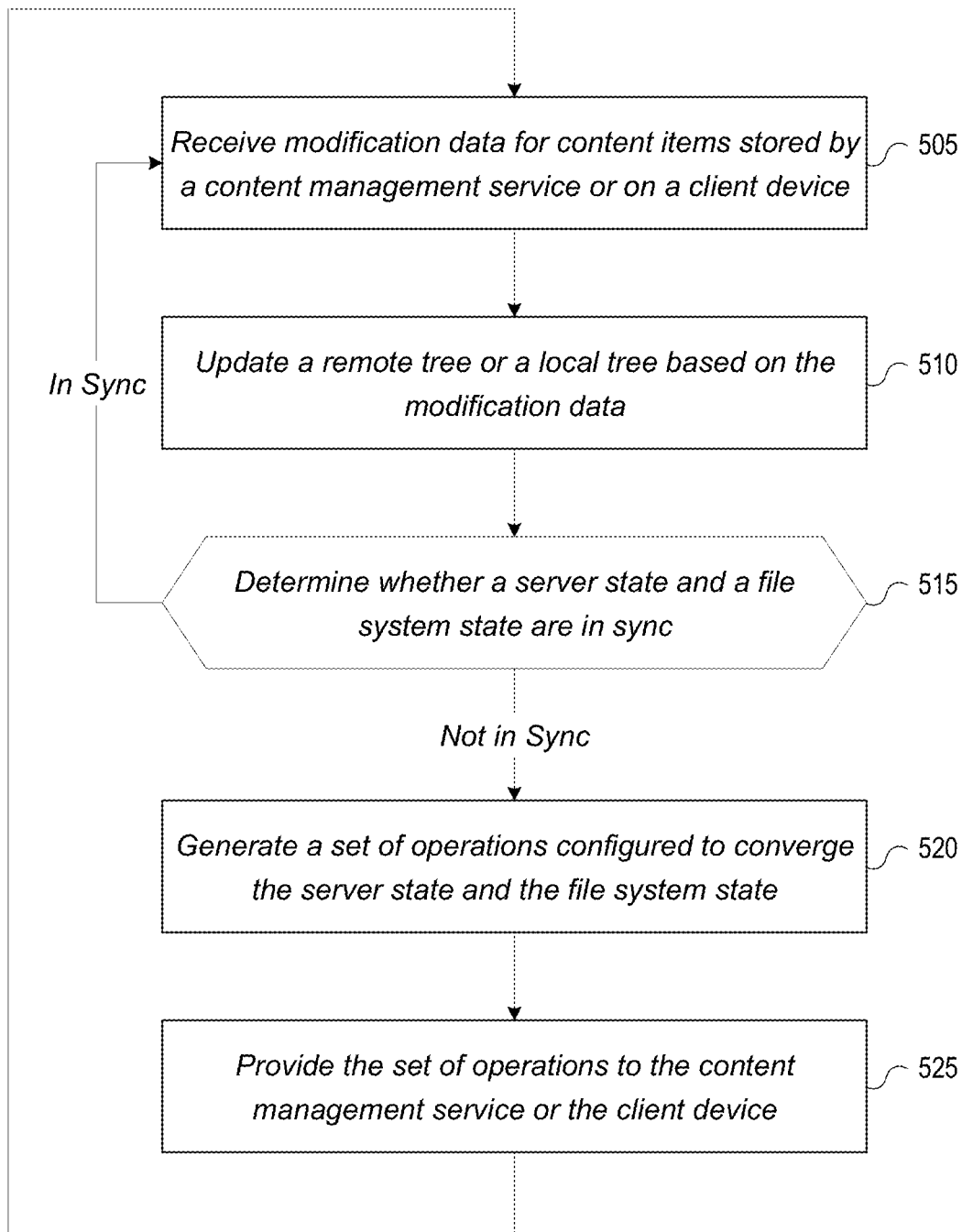
FIG. 5 shows an example method for synchronizing a server state and a file system state using tree data structures, in accordance with various embodiments of the subject technology.

FIG. 5 shows an example method for synchronizing a server state and a file system state using tree data structures, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 500 may be implemented by a system such as, for example, client synchronization service 156 of FIG. 2, running on a client device.

The system is configured to identify a difference between a remote tree representing a server state for content items stored by the content management system, a local tree representing the file system state for the corresponding content items stored on the client device, and a sync tree representing a known synced state between the server state and the file system state. Based on these differences, a set of operations may be generated that, if executed, are configured to converge the server state and the file system state towards a synchronized state where the three tree data structures would be identical.

For example, at operation 505, the system may receive modification data for content items stored by a content management system or on a client device. The modification data may be used to update a remote tree or a local tree at operation 510.

The modification data is specifies what changes are done to one or more content items associated with a content management service. Accordingly, the modification data may be received from the content management system or from the client device (e.g., from client application 152 running on client device 150 in FIG. 1). Modification data received from the content management system may be referred to as server modification data. Server modification data specifies what changes are done to one or more content items by the content management system and may be used to update the remote tree at operation 510. Modification data received from the client device may be referred to as client modification data. Client modification data specifies what changes are done to one or more content items on the client device and may be used to update the local tree at operation 510.

At operation 515, the system may determine whether a server state for content items stored by the content management system and a file system state for the content items stored on the client device are in sync. Because the local tree and the remote tree are representative of the file system state and the server state and are continually being updated to track changes that occur at the content management system and the client device, determining whether the server state and the file system state are in sync may be done by comparing the local tree and/or the remote tree to the sync tree to find differences between the trees. This process of finding differences between the trees is sometimes referred to as "diffing" the trees.

According to some embodiments and scenarios, determining whether the server state and the file system state are in sync may include one or more of identifying differences between the remote tree and the sync tree and/or identifying differences between the local tree and the sync tree. Differences between the remote tree and sync tree may indicate the occurrence of changes to content items stored by the content management system that may not be reflected at the client device. Similarly, differences between the local tree and sync tree may indicate the occurrence of changes to content items stored at the client device that may not be reflected at the content management system.

If there are no differences between the trees, the server state and the file system state are in sync and no synchronization actions are needed. Accordingly, the method may return to operation 505 and await new modification data. On the other hand, if differences are detected, the system may generate a set of operations configured to converge the server state and the file system state at operation 520.

The set of operations generated depends on the one or more differences that are detected. For example, if the difference between two trees is an added content item, the generated set of operations may include retrieving the added content item and adding it. If the difference between two trees is a deletion of a content item, the generated set of operations may include deleting the content item. According to some embodiments, the set of operations may also include a number of checks to ensure tree constraints are maintained. As will be described further below, the set of operations may conflict with the current state of the server state, the file system state, or other operations that are pending execution. Accordingly, the system may also resolve these conflicts before proceeding.

As noted above, if there are differences between the remote tree and sync tree, changes to content items stored by the content management system may have occurred that may not be reflected at the client device. Accordingly, in this scenario, the system may generate a client set of operations configured to operate on the content items stored on the client device to converge the server state and the file system state and this client set of operations may be provided to the client device for execution at operation 525.

On the other hand, if there are differences between the local tree and sync tree, changes to content items stored at the client device may have occurred that may not be reflected at the content management system. Accordingly, in this scenario, the system may generate a server set of operations configured to operate on the content items stored by the content management system to converge the server state and the file system state and this server set of operations may be provided to the content management system for execution at operation 525. In some cases, both cases may be true and a client set of operations and a server set of operations may be generated and provided to their intended recipients at operation 525.

Once the set(s) of operations are provided to the intended recipient(s), the method may return to operation 505 and await new modification data. The set(s) of operations may provide one or more steps towards the convergence of the server state and the file system state or provide all steps needed to sync the server state and the file system state. For example, the content management system may receive the server set of operations and execute the server set of operations on content items stored by the content management system. This execution of the server set of operations causes changes to the content items stored by the content management system, which are detected and specified in server modification data, which is transmitted back to the system. The system may then update the remote tree and determine whether the server state and the file system state are in sync.

The client device may receive the client set of operations and execute the client set of operations on content items stored on the client device. This execution of the client set of operations causes changes to the content items stored on the client device, which are detected and specified in client modification data, which is passed to the system. The system may then update the local tree and determine whether the server state and the file system state are in sync. These operations of method 500 may continue until the server state and the file system state are in sync.

The operations of method 500 are described with respect to a client side and a server side (e.g., a local tree and a remote tree, a file system state and a server state, a client set of operations and a server set of operations, client modification data and server modification data). In various embodiments the operations associated with the two sides may occur in parallel, in sequence, in isolation of the other side, or a combination.

As will be discussed in further detail, in accordance with some embodiments, before the operations are provided for execution, the system may check the operations to determine whether they comply with a set of rules or invariants. If an operation violates a rule, the system executes a resolution process associated with the violation of the rule.

Additionally, in accordance with some embodiments, the system (e.g., scheduler 230 of client synchronization service 156 in FIG. 2) may manage the execution of the set of operations. For example, each operation in the set of operations may be associated with a task, an execution thread, series of steps, or instructions. The system may be configured to execute the task, thread, step, or instructions and interface with the client device and/or the content management system to execute the set of operations and converge the server state and the file system state.

Conflict Handling

As described above with respect to FIG. 5, differences between a sync tree and a remote tree are identified and used to generate a client set of operations configured to converge the server state and the file system state. However, in some cases, the client set of operations may conflict with the current state of a local tree. Similarly, differences between the sync tree and the local tree are identified and used to generate a server set of operations configured to converge the server state and the file system state. However, the server set of operations may conflict with the current state of the remote tree. Additionally or alternatively, the client set of operations and the server set of operations may conflict with one another or violate another rule or invariant maintained by the system. Accordingly, various embodiments of the subject technology provide additional technical improvements by resolving these conflicts.

For example, planner 225 in client synchronization service 156 of FIG. 2 may identify an operation in a set of operations (e.g., the client set of operations or the server set of operations) that conflicts with a rule. Each rule used to identify a conflict may also be associated with a resolution for the conflict. The client synchronization service may update the set of operations based on the resolution for the conflict or perform resolve the conflict by performing operations associated with the resolutions for the conflict before providing the set of operations for execution.

Figure 6:
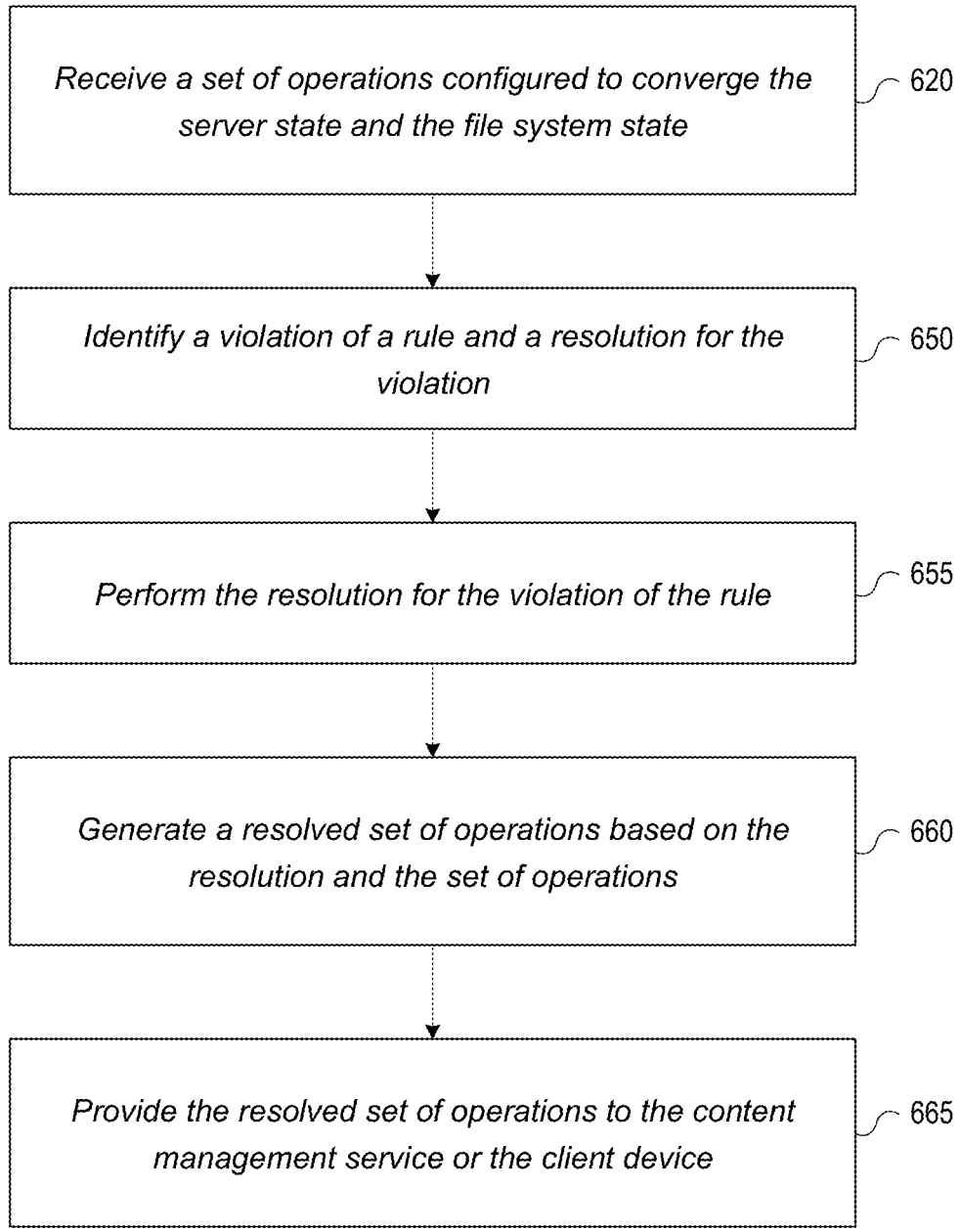
FIG. 6 shows an example method for resolving conflicts when synchronizing a server state and a file system state using tree data structures, in accordance with various embodiments of the subject technology.

FIG. 6 shows an example method 600 for resolving conflicts when synchronizing a server state and a file system state using tree data structures, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 600 may be implemented by a system such as, for example, client synchronization service 156 of FIG. 2, running on a client device.

The system may receive a set of operations configured to converge a server state and a file system state at operation 620. The set of operations may be, for example, the client set of operations, the server set of operations, or a combined set of operations generated and described with respect to the method 500 of FIG. 5.

At operation 650, the system identifies one or more violations in the set of operations based on a set of rules. The set of rules may be stored by client synchronization service 156 in FIG. 2 and specify a number of constraints, invariants, or conflicts for operations that are to be resolved. The set of rules may be applied to the tree data structures and help control sync behavior. Each rule in the set of rules may also be associated or otherwise linked to a resolution to a violation of that rule. For example, the resolution may include an alteration of one or more operations in the set of operations, a removal off one or more operations, an addition of one or more operations, one or more additional actions to the server state or the file state, or a combination of actions.

For each operation in a set of operations, the system may determine whether any rule in the set of rules is violated. If a rule is violated, the system identifies a resolution of the violation and, at operation 655, performs the resolution. The resolution may include actions such as modifying one or more operations in the set of operations, a removing or adding one or more operations, or additional actions on the server state or the file state.

Once the resolution actions are performed, the system may generate a resolved or rebased set of operation based on the resolution and the set of operations at operation 660 and, at operation 665, provide the resolved set of operations to the appropriate entity for execution. For example, the resolved set of operations may be provided to scheduler 230 of client synchronization service 146 in FIG. 2 for managed execution. Alternatively, if the set of operations is a client set of operations, the resolved set of operations may be provided to the client device. If the set of operations is a server set of operations, the resolved set of operations may be provided to the content management service. Additionally, the method 600 of FIG. 6 may be performed on client set of operations and server set of operations in sequence, in parallel, or in various different orders.

According to some embodiments, each type of operation may be associated with the same or a different set of rules. For example, operation types may include, for example, adding a content item, deleting a content item, editing a content item, moving a content item, renaming a content item, etc. The set of operations may consist of operations each belonging to one of the operation types above. Each operation type may be associated with a specific set of rules.

For illustrative purposes, a set of rules for an "Add" operation type may include rules such as file identifiers for content items must be unique in a tree (e.g., no two nodes in a tree may have the same file identifier), a directory file identifier ("DirFileID") specifying the file identifier of a parent node of the content item must exist in the opposite tree data structure, and a DirFileID and file name combination for a content item are not used in the opposite tree.

Opposite tree, as used here, refers to the tree data structure that represents the state of the opposing entity. For example, a client set of operations configured to operate on the client device and the resulting changes to the file system on the client device will be reflected in the local tree. Accordingly, the opposite tree for the client set of operations is the remote tree. Similarly, a server set of operations is configured to be transmitted to the content management system to be executed and the resulting changes to the server state will be reflected in the remote tree. Accordingly, the opposite tree for the server set of operations is the local tree.

Figure 7:
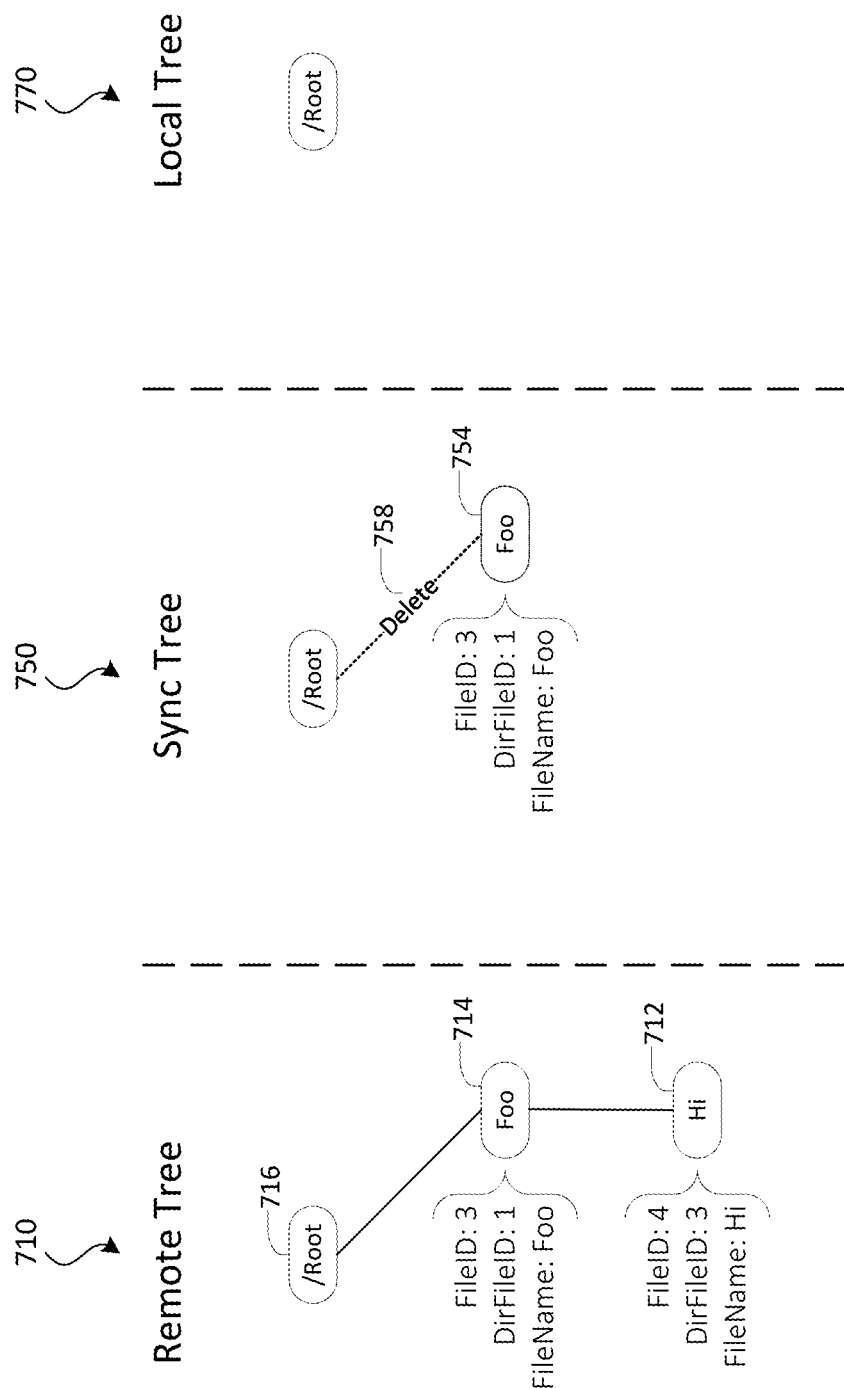
FIG. 7 shows an example of tree data structures illustrating a violation of a rule for an add operation, in accordance with various embodiments.

FIG. 7 shows an example of tree data structures illustrating a violation of a rule for an add operation, in accordance with various embodiments. The tree data structures include remote tree 710, sync tree 750, and local tree 770. When referencing the local tree 770, the remote tree 710 may be considered the opposite tree. On the other hand, when referencing the remote tree 710, the local tree 770 may be considered the opposite tree. FIG. 7 illustrates a set of operations adding the content item represented by node 712 in remote tree 710. For example, a client synchronization service may compare remote tree 710 with sync tree 750, identify the differences, and generate a set of operations that includes the addition of node 712. Node 712 is associated with a FileID of 4, a DirFileID of 3 (which references parent node 714, which is node 712's parent), and a file name of "Hi." Parent node 714 is associated with a FileID of 3, a DirFileID of 1 (which references root node 716, which is node 714's parent), and a file name of "Foo."

The client synchronization service may perform the method 600 of FIG. 6 and determine that the add operation for node 712 violates the "a directory file identifier ("DirFileID") of the content item must exist in the opposite tree data structure" rule for "add" operation types. This is illustrated in FIG. 7 by the local tree 770 not having a node with a file ID of 3, which references parent node 714 of node 712. This may occur when, for example, after differences between remote tree 710 and sync tree 750 are determined and a set of operations is generated, the "Foo" node corresponding to node 714 is removed from the opposite tree.

The resolution associated for this rule may include deleting the node missing from local tree 770 from sync tree 750 to synchronize sync tree 750 and local tree 770 and rediffing (e.g., finding the difference between) remote tree 710 and sync tree 750. In the scenario illustrated in FIG. 7, node 754 in sync tree 750 would be removed 758 and diffing operations would commence to identify differences between remote tree 710 and sync tree 750. This would result in the inclusion of an add operation of node 714 as well as an add operation for node 712 in the set of operations.

Similarly, a violation of the "file identifiers for content items must be unique in a tree" rule for "add" operation types may be resolved by operations including requesting, from the content management system, a new file ID for the node being added and using the new file ID when adding the node. A violation of the "DirFileID and file name combination for a content item are not used in the opposite tree" rule for "add" operation types may be resolved by operations including checking via the metadata associated with the two nodes whether the content items are the same. If the content items are the same, it is likely that the content item being added has already been added in other actions. If the content items are not the same, the file name for the content item being added can be renamed. For example, the file name for the content item being added can be appended with the text "(conflicted version)."

Incremental Planner

Although the various tree data structures shown in FIGS. 3, 4, and 7 contain a relatively small number of nodes and are relatively simple in structure, the tree data structures supported by the system may be much larger and complex with multiple levels and potentially large number of nodes at each level. Accordingly the memory usage required to store the tree data structures during operation may be quite large and the computing time and resources required to operate on the tree data structures may be quite large. For example, finding differences between a remote tree and a sync tree and/or a local tree and the sync tree and generating operations needed to converge the remote tree and the sync tree and/or the local tree and the sync tree may require a large amount of memory, time, and other computing resources.

Unfortunately, these computing resources are limited. For example, a client device may have a limited amount of available memory and the length of time needed to diff trees and generate operations may hinder the usability of the client device, the client application, or the content management service provided by the content management system. Furthermore, the more time needed to converge the server state and the file system state, the more likely that intervening changes to either state may render the set of operations being computed or executed and/or the target sync state out of date. Accordingly, various embodiments of the subject technology provide additional technical improvements by incrementally converging the server state and the file system state along with the tree data structures that represent them.

Figure 8:
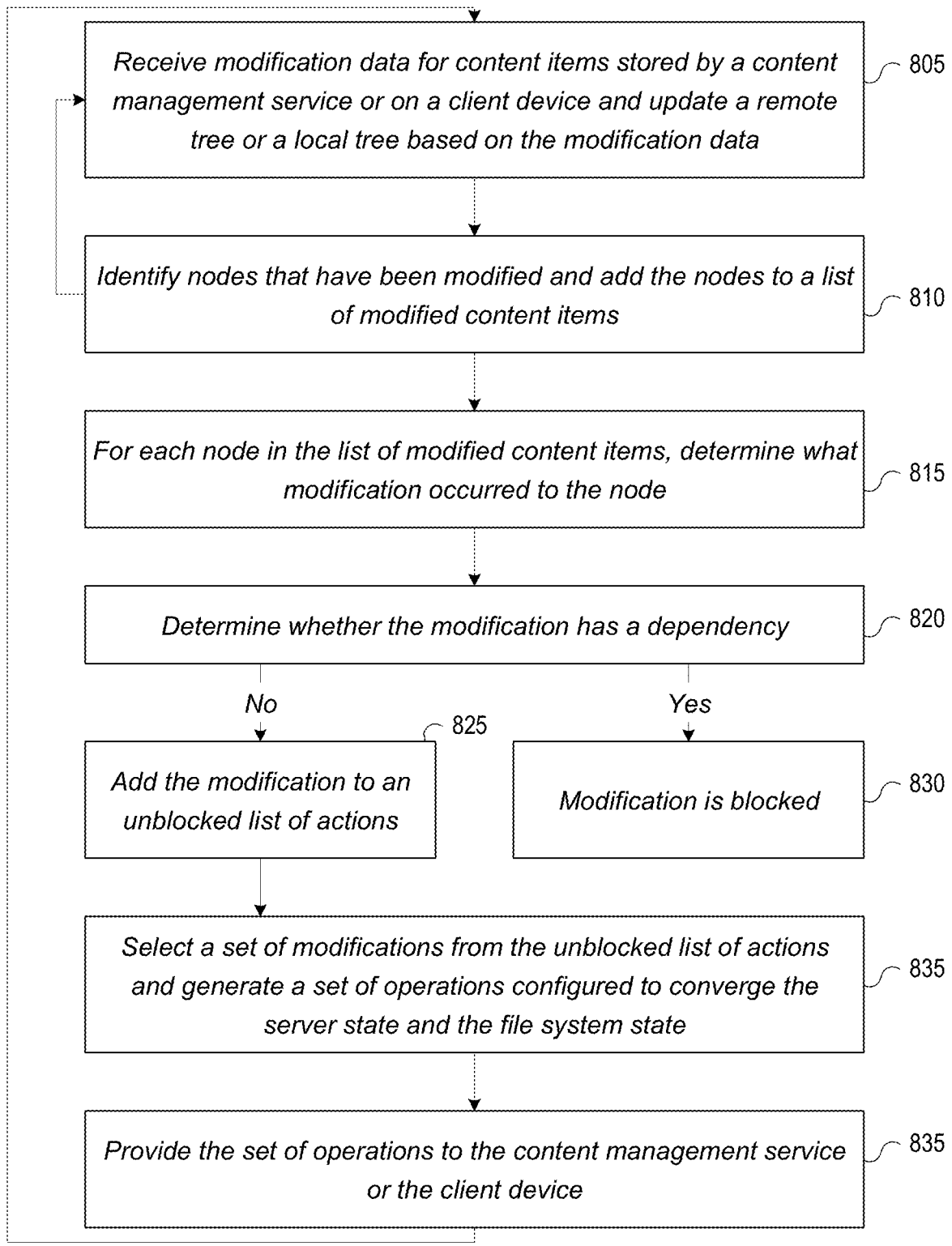
FIG. 8 shows an example method for incrementally converging a server state and a file system state, in accordance with various embodiments of the subject technology.

FIG. 8 shows an example method 800 for incrementally converging a server state and a file system state, in accordance with various embodiments of the subject technology.

Although the methods and processes described herein may be shown with certain steps and operations in a particular order, additional, fewer, or alternative steps and operations performed in similar or alternative orders, or in parallel, are within the scope of various embodiments unless otherwise stated. The method 800 may be implemented by a system such as, for example, client synchronization service 156 of FIG. 2, running on a client device.

At operation 805, the system may receive modification data that may be used to update either a remote tree or a local tree. For example, server modification data may be received from a content management service and specify modifications or other actions (e.g., an edit, add, delete, move, or rename) associated with one or more content items stored by the content management system. The server modification data may be used to update the remote tree, which represents the server state of content items stored by the content management system. Similarly, client modification data may be received from the client device (e.g., a client application) and specify modifications or other actions associated with one or more content items stored on the client device. The client modification data may be used to update the local tree, which represents the file system state of content items stored on the client device.

Based on the received modification data specifying modifications associated with content items, the system may identify nodes that correspond to the modified content items and add the nodes to a list of modified content items (e.g., add the file identifier associated with the nodes to the list of modified content items) at operation 810. Operations 805 and 810 may continuously occur for some time before the system proceeds to the next stage of the method 800. For example additional modification data may be received and used to update the trees managed by the system and add nodes to the list of modified content items.

In order to incrementally converge the server state and the file system state, the system takes each node in the list of modified content items and determines how the node was modified (e.g., which actions are associated with the node) at operation 815. In some embodiments, the modification data may specify the modification to the node. However, in other embodiments, the system may determine the modifications to the node based on a comparison of the remote tree with the sync tree and/or a comparison of the local tree with the sync tree. For example, the modifications may include the addition of the node, the deletion of the node, the editing of the node, or the moving of the node.

For each node or file identifier for the node in the list of modified content items, the system may perform a series of checks to determine what, if any, modifications were performed on the node. For example, the system may determine whether the file identifier is in the sync tree but not in the remote tree. A file identifier in the sync tree that is not found in the remote tree may indicate that the node has been deleted from the server state that is represented by the remote tree. Accordingly, the client synchronization service may determine that a delete modification on the node has occurred on the remote tree. Similarly, the system may also determine whether the file identifier is in the sync tree but not in the local tree. A file identifier in the sync tree that is not found in the local tree may indicate that the node has been deleted from the file system state that is represented by the local tree. Accordingly, the client synchronization service may determine that a delete modification on the node has occurred on the local tree.

To determine whether an edit modification has been performed on the node the system may compare the metadata for the node in the sync tree with the metadata for the corresponding node (e.g., the node with the same file identifier) in the remote tree and/or the local tree. The metadata may include information that may be used to determine whether the content item represented by the node has been edited. For example, the metadata may include one or more hash values that are generated based on the data in the content item or a portion thereof. The metadata may additionally or alternatively include a size value, a last modified value, or other value for the content item. If the metadata do not match, an edit of the content item may have been edited in the server state represented by the remote tree and/or the file system state represented by the local tree. Accordingly, the system may determine that an edit action has occurred for the node on the remote tree and/or the local tree.

To determine whether the node in the remote tree has been moved, the system may compare the location for the node in the sync tree with the location for the corresponding node (e.g., the node with the same file identifier) in the remote tree and/or the local tree. The location may include, for example, a path where the node is located, a file name, and/or a directory file identifier ("DirFileID") specifying the file identifier of the node's parent. If the locations match, no move may have occurred. On the other hand, if the locations do not match, a move of the content item may have occurred in the remote tree or the local tree. Accordingly, the client synchronization service may determine that a move action has occurred for the node on the remote tree and/or the local tree.

To determine whether a node has been added to the remote tree, the system may determine if the file identifier in the list of modified content items is in the remote tree or in the local tree, but not in the sync tree. If the file identifier is found in the remote tree or the local tree and not found in the sync tree, the system may determine that an add modification for this node has occurred.

Once the one or more modifications to the nodes in the list of modified content items are determined, the system may determine whether any of those modifications have dependencies at operation 820. As will be illustrated further with respect to FIG. 9, a modification on a node has a dependency when, for example, the modification cannot execute without another modification occurring first.

If the modification does not have a dependency, the system adds the modification to an unblocked list of actions at operation 825. If the modification has a dependency, the modification is blocked for the time being at operation 830 and cannot be executed without another modification being processed first. After each of the modifications are processed, the system may clear the file identifiers associated with the modifications from the list of modified content items.

Figure 9:
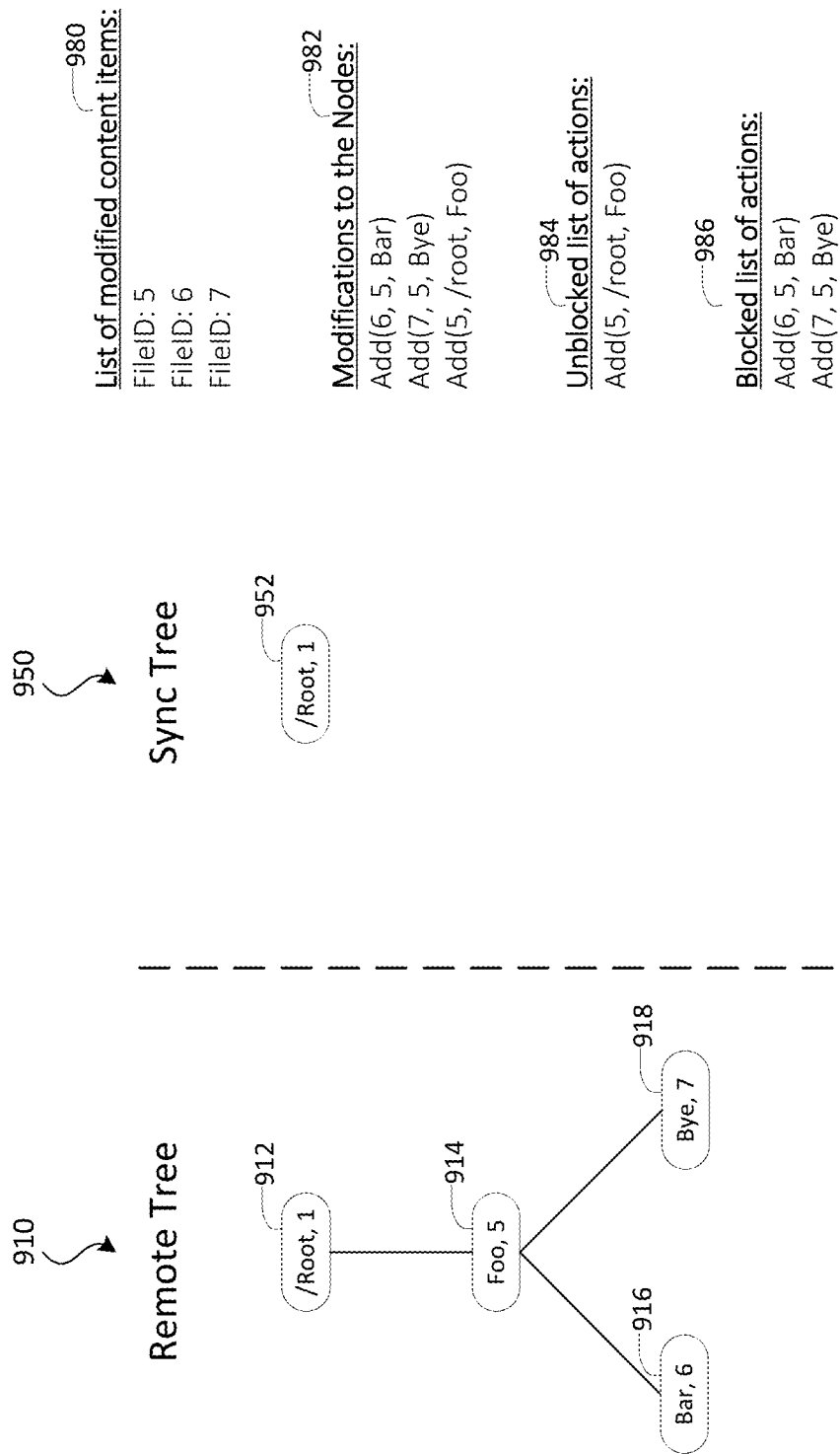
FIG. 9 shows an example of tree data structures, in accordance with various embodiments.

FIG. 9 shows an example of tree data structures, in accordance with various embodiments. The tree data structures shown in FIG. 9 may be stored at the client device and managed by a system such as client synchronization service 156 in FIG. 2. For the purpose of illustration, only remote tree 910 and sync tree 950 are shown in FIG. 9 and described. Similar operations and description may also be applied to a local tree as well.

Remote tree 910 includes root node 912 with a file identifier of 1, node 914 with a file identifier of 5 and file name of "Foo," node 916 with a file identifier of 6 and file name of "Bar," and node 918 with a file identifier of 7 and file name of "Bye." Sync tree includes root node 952 with a file identifier of 1.

Based on the tree data structures shown in FIG. 9, the system may have identified that nodes with file identifiers of 5, 6, and 7 have been modified at operation 810 and added the nodes to the list of modified content items, as illustrated by reference 980 in FIG. 9. At operation 815, the system determines the list of modifications to nodes in the list of modified content items. As is seen by the comparison of remote tree 910 and sync tree 950, nodes 914, 916, and 918 have been added to remote tree 910. More specifically, as illustrated by reference 982 in FIG. 9, node 916 with file identifier 6 and name "Bar" has been added as a child to node 914 with file identifier 5. This is represented by the "Add(6, 5, Bar)" entry in reference 982. Node 918 with file identifier 7 and name "Bye" has been added as a child to node 914 with file identifier 5. This is represented by the "Add(7, 5, Bye)" entry in reference 982. Node 914 with file identifier 5 and name "Foo" has been added as a child to root node 912 with file identifier 1. This is represented by the "Add(5, /root, Foo)" entry in reference 982.

At operation 820, the system determines that the add modification of node 914 does not have a dependency and, as a result, is unblocked. Accordingly, the system adds the modification associated with node 914 (e.g., the modification represented by the "Add(5, /root, Foo)") entry in reference 982) to an unblocked list of actions at operation 825. This is seen in references 984 in FIG. 9. On the other hand, the modifications for nodes 916 and 918 represented by the "Add(6, 5, Bar)" and the "Add(7, 5, Bye)" entries in reference 982 are dependent on the modification represented by the "Add(5, /root, Foo)" occurring first. In other words, node 916 and/or node 918 cannot be added until node 914 is added. Accordingly, these modifications are included in a blocked list of actions illustrated by reference 986 in FIG. 9.

Returning to the method 800 of FIG. 8, at operation 835, the system may select a set of modifications from the unblocked list of actions and generate a set of operations based on the selected set of modifications. The set of operations is configured to converge the server state and the file system state. The set of operations generated depends on the selected set of modifications from the unblocked list. For example, if the selected set of modifications includes the add modification associated with node 914 (e.g., the modification represented by the "Add(5, /root, Foo)") entry in reference 984) in FIG. 9, the generated set of operations may include retrieving the added content item from the content management system and adding it to the local file system of the client device.

According to some embodiments, the system may select all modifications from the unblocked list of actions to generate one or more sets of operations. However, in some scenarios, the number of modifications in the unblocked list may be quite high and the computing resources (e.g., memory and processing time) needed to process all of the modifications is substantial. In order to reduce these technological burdens, the system may select a smaller set of the modifications in the unblocked list of actions in order to process incrementally. For example, the system may select the first or top X number or percent of modifications to generate operations. In further iterations of the process, the remaining modifications in the unblocked lists may be processed.

In some embodiments, the modifications in the unblocked list may be ranked for processing. The modifications may be ranked based on, for example, a modification type (e.g., delete modifications are prioritized over add modifications), metadata associated with the modification (e.g., add modifications of content items of smaller size are prioritized over add modifications of content items of larger size, delete modifications of content items of larger size are prioritized over delete modifications of content items of smaller size, etc.).

These rank rules may be stored by the system and may be designed to achieve various performance goals for content synchronization. For example, delete modifications may be prioritized over add modifications in order to free as much of potentially limited storage space for a user before new content items may be added. Adding of smaller content items may be prioritized over larger content items in order to provide as much progress with respect to the number of content items added as soon as possible.

At operation 835, the system may provide the set of operations to the content management system and/or the client device. As noted above, modifications associated with actions performed by the content management system may not be reflected at the client device. Accordingly, in this scenario, the system may generate a client set of operations configured to operate on the content items stored on the client device to converge the server state and the file system state and this client set of operations may be provided to the client device for execution at operation 835.

On the other hand, modifications associated with actions performed by the client device may not be reflected at the content management system. Accordingly, in this scenario, the system may generate a server set of operations configured to operate on the content items stored by the content management system to converge the server state and the file system state and this server set of operations may be provided to the content management system for execution at operation 835.

In some cases, both cases may be true and a client set of operations and a server set of operations may be generated and provided to their intended recipients at operation 835. The set of operations may also include a number of checks to ensure tree constraints are maintained. For example, the set of operations may resolve various conflicts or constraints as discussed with respect to FIG. 6.

Once the set(s) of operations are provided to the intended recipient(s), the method may return to operation 805 and await new modification data. For example, with respect to the scenario illustrated in FIG. 9, the set of operations may include retrieving the content item associated with node 914 from the content management system and adding it to the local file system of the client device. This would result in the addition of a node corresponding to node 914 in the local tree (not shown in FIG. 9) and sync tree 950. On the next iteration of process 800 of FIG. 8, the add modifications of node 916 and node 918 represented by the "Add(6, 5, Bar)" and the "Add(7, 5, Bye)" entries in reference 982 are no longer blocked because their parent, node 914, has already been added to the sync tree. Accordingly, the add modifications of node 916 and node 918 represented by the "Add(6, 5, Bar)" and the "Add(7, 5, Bye)" entries in reference 982 may be added to the unblocked list of actions and used to generate one or more sets of operations configured to converge the server state and the file system state.

The set(s) of operations may provide one or more steps for the incremental convergence of the server state and the file system state. Although implementing an incremental process may be more complex at times, the incremental process may achieve a reduction in processing time and reduction in the memory required. These and other initial technological improvements naturally lead to additional technological improvements. For example, because processing time is reduced, the likelihood of additional changes from the client device or the content management system making certain modifications obsolete or out of data is reduced as well.

With respect to FIG. 9, various groupings of content items, modifications, actions, or file identifiers are described as lists for the purpose of illustration. Other types of data structures are also compatible. For example, the unblocked list of actions may be implemented as a B-tree data structure in order to keep data sorted and allow searches, sequential access, insertions, and deletions in logarithmic time.

Scheduler

In some embodiments, a client synchronization service may generate a set or sequence of operations configured to converge the server state and the file system state and provide the operations to the content management system or client device for execution. However, in some scenarios, changes on the file system of the client device or on the content management system may cause the generated set of operations to become out of date or obsolete while the set of operations is in the process of executing. Various embodiments are directed to providing a technical solution to these and other technical problems. For example, the client synchronization service may be configured to monitor changes on the file system of the client device or on the content management system and update the client device and/or content management as needed. Furthermore, the client synchronization service may be configured to improve performance and reduce processing times by allowing for concurrent execution of operations.

According to some embodiments, planner 225 of client synchronization service 156 shown in FIG. 2 may generate a plan or plan of operations that consists of an unordered set of operations. All operations within a plan have no dependencies and, as a result, are able to be executed concurrently in separate threads or in any order. The operations in the plan, according to some embodiments, are abstract instructions that may be taken by the content management system and/or the client device in order to converge the states and tree data structures. Example instructions may include a remote or local add of a content item, a remote or local delete of a content item, a remote or local edit of a content item, or a remote or local move of a content item.

Scheduler 230 of client synchronization service 156 shown in FIG. 2 may be configured to receive the plan of operations from planner 225, manage the execution of the operations in the plan, determine if the plan has been updated or changed, and manage the execution of the updated or changed plan. For example, scheduler 230 may coordinate with file system interface 205 and server interface 210 to execute the tasks and steps needed to implement operations in the plan. This may include receiving confirmations from the file system or content management system or error handling activities such as handling retries when there is no network connectivity or when a content item is locked by some other application.

Each operation may be implemented by a script or thread referred to as a task. The task coordinates the application of an associated operation and may include one or more steps needed to implement the operation. For example, a "local add operation" may indicate that a content item has been added to the local file system of the client device and, as a result, the content item should be added at the content management system in order to sync the server state and the file system state. Accordingly, the local add operation may be associated with a "local add task" that includes one or more steps needed to implement the local add operation. The steps may include one or more of notifying the content management system of the new content item, uploading the content item to the content management system in one or more blocks of data, confirming that all blocks of data have been received by the content management system, making sure the content item is not corrupted, uploading metadata for the content item to the content management system, and committing the adding of the content item to the appropriate location at the content management system.

A task may begin execution, suspend at well-defined points while waiting on the completion of other events, resume when the events have occurred, and eventually terminates. According to some embodiments, scheduler 230 is configured to cancel, regenerate, or replace tasks. For example, based on changes to the server state or the file system state, a task may become stale before it is executed and scheduler 230 may cancel the stale task before it is executed.

As described above, planner 225 may generate a plan of operations based on a set of tree data structures (e.g., a remote tree, a sync tree, and a local tree). Over time, planner 225 continues to generate plans of operations based on the status of the tree data structures. If the tree data structures change to reflect the state of the server state and the file system state, planner 225 may also generates a new updated plan that differs from a previous plan. Scheduler 230 executes each plan of operations generated by the planner 225.

Figure 10:
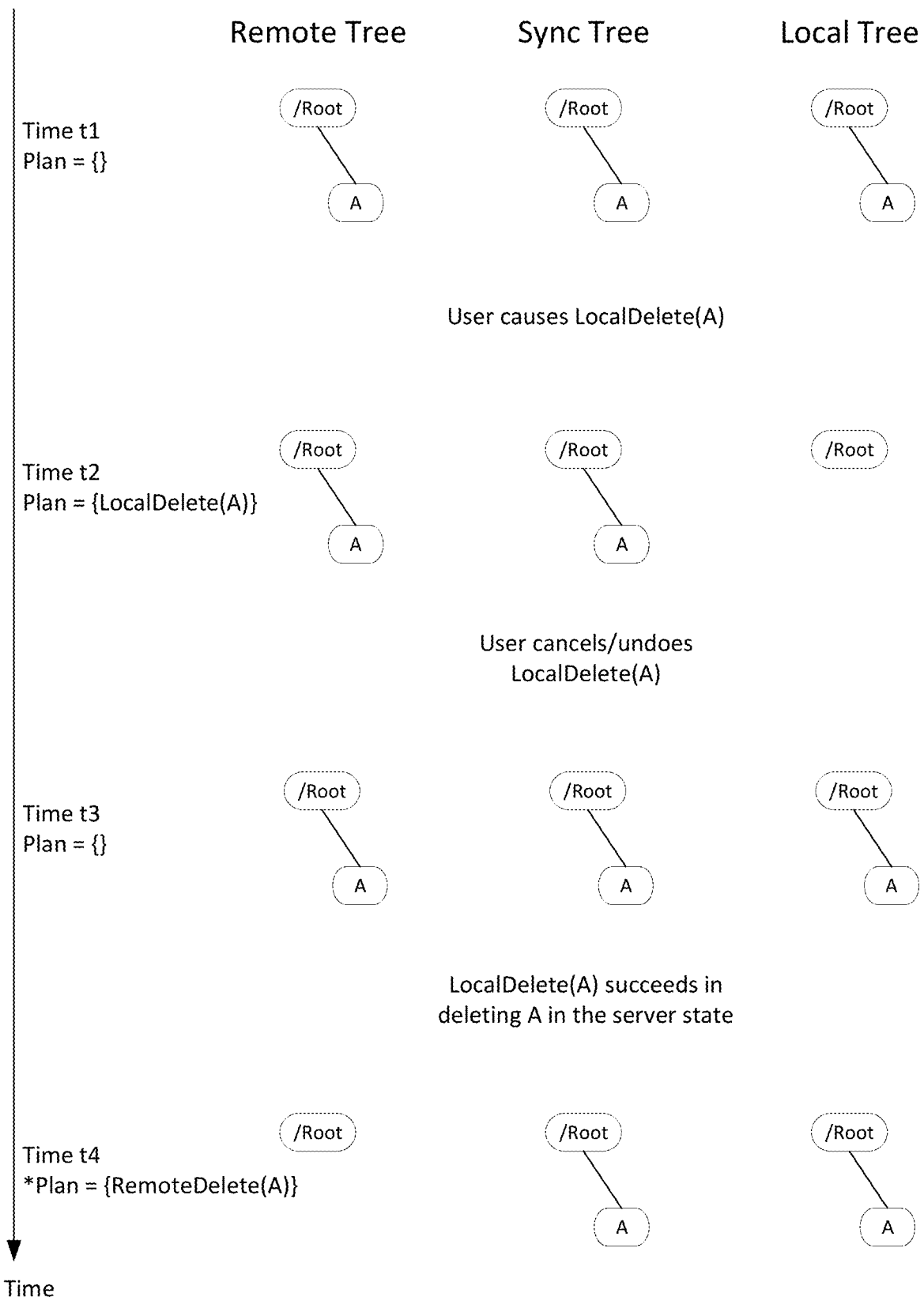
FIG. 10 shows an example scenario.

In some scenarios, changes in the operations of a subsequent plan may cause unintended behaviors conflict with an operation in the previous plan that is in the process of execution. For example, as operations in a first plan are being executed, one or more of the operations are canceled (or are not present) in the second plan. To illustrate, FIG. 10 shows an example scenario in which, at time t1, the server state represented by the remote tree and the file system state represented by the local tree are synchronized as shown by the remote tree, the sync tree, and the local tree all matching. Based on this synchronized state, planner 225 may generate a plan with no operations (e.g., an empty plan) at t1.

A user on the client device may delete content item A from the local file system or move content item A out of a folder managed by client synchronization service 156, which is reflected by the removal of node A from the local tree at time t2. Planner 225 may generate a plan that includes operation LocalDelete(A) based on the state of the tree data structures at time t2. Scheduler 230 may initiate the task or steps required to implement the LocalDelete(A) operation. These steps may include transmitting instructions to the content management system to delete content item A.

After instructions to delete content item A are transmitted to the content management system, the user on the client device may undo the delete of content item A or move content item A back to the previous location. The local tree is updated based on this new action at time t3 and planner may generate a new plan that is empty with no operations. Once again, the tree data structures match and the system is in a synchronized state at time t3.

However, because instructions to delete content item A were transmitted to the content management system, the content management system deletes content item A from the server state. Although scheduler 230 may attempt to cancel the deletion of content item A, the instructions may have already been transmitted and completed by the content management system. This change in the server is communicated to client synchronization server 156, which updates the remote tree by deleting node A at time t4. Planner 225 could notice the change in the remote tree and the difference between the remote tree and the sync tree and determine that content item A was removed at the server state. Accordingly, planner 225 would create a plan with a RemoteDelete(A) operation at time t4. In an effort to synchronize the server state and the file system state, content item A would eventually be deleted from the client device and the local tree.

Problematically, the removal of content item A from the server state, the generation of the RemoteDelete(A) operation, and the eventual removal of content item A from the file system state are all not intended and may cause further problems down the line for the user. Furthermore, in some cases, applications or processes may also access content items and unintentional synchronization behavior may cause a cascade of additional technical issues. Various embodiments are directed to preventing unintended consequences in synchronization of content items between a server state and a file system state.

According to some embodiments, when canceling a task for a stale operation that is no longer in a plan of operations, scheduler 230 may wait for the cancellation to be completed before proceeding to initiate the execution of other tasks. For example, scheduler 230 may wait to receive confirmation of the cancellation from the client device or the content management system before proceeding with other tasks. Scheduler 230 may determine whether the task has been initiated and if the task has not been initiated, scheduler may cancel the task and confirm that the task is no longer awaiting execution. If the task has been initiated, the confirmation may come from the client device or the content management system and notify the scheduler that all of the steps associated with the canceled task have been undone. According to some implementations, scheduler 230 does not allow for cancellation of a task once it has been initiated. This may be the case for all tasks or a certain subset of tasks or task types (e.g., a commit task that sends an update on the file system state to the content management system for synchronization with the server state).

Figure 11:
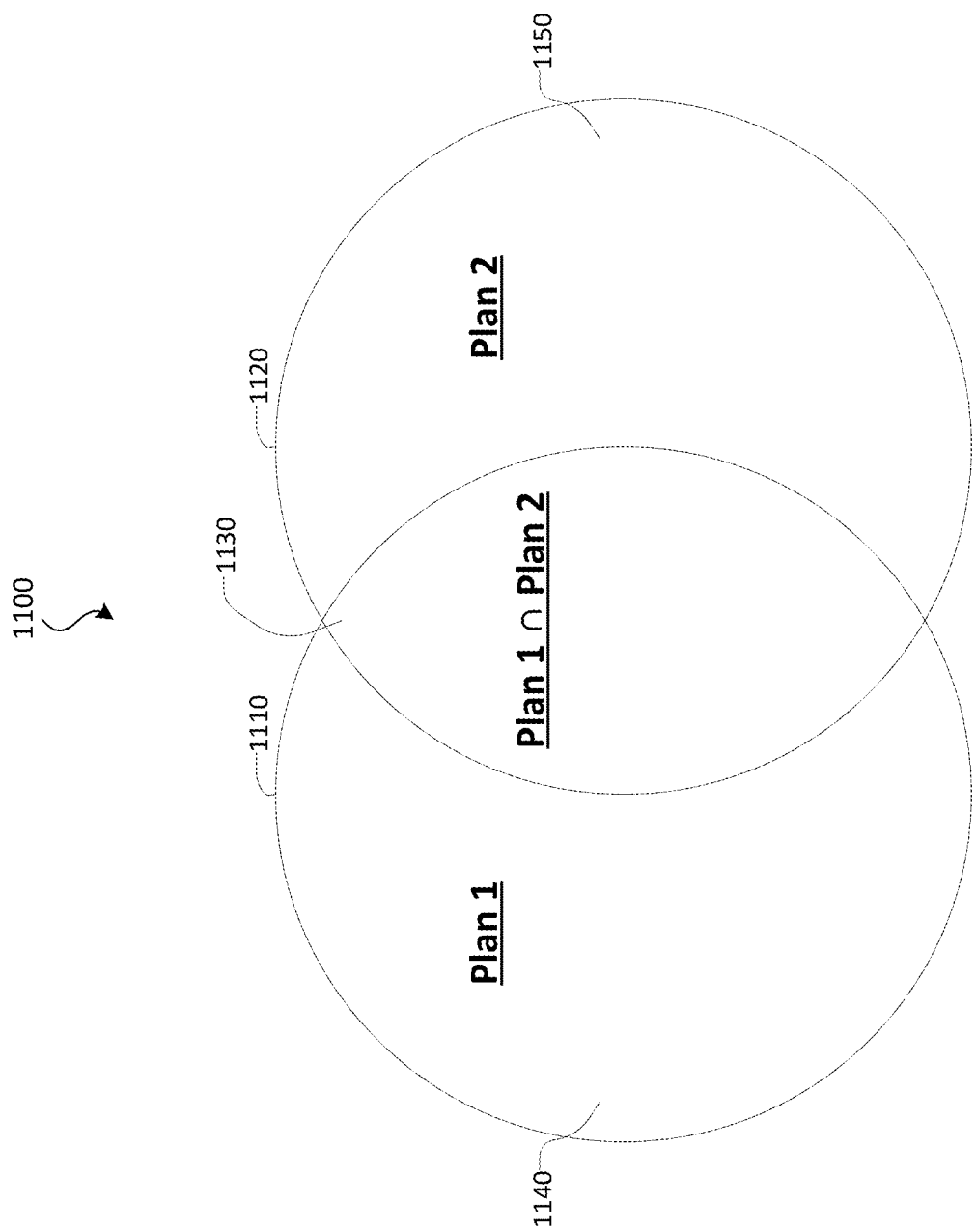
FIG. 11 shows an example Venn diagram representation of two plans of operations, in accordance with various embodiments of the subject technology.

In order to improve performance and allow for concurrent execution of tasks as well as the cancellation of tasks, scheduler 230 may also be configured to manage the execution and cancellation of tasks based on differences between a first plan of operations and an updated second plan of operations. FIG. 11 shows an example Venn diagram 1100 representation of two plans of operations, in accordance with various embodiments of the subject technology. Planner 225 may generate a plan 1 1110 with a first set of operations, receive an update to the tree data structures, and generate an updated plan 2 1120 with a second set of operations.

Plan 1 1110 and plan 2 1120 may share a number of common operations, which is represented by portion 1130 of the Venn diagram 1100. Plan 1 1110 and plan 2 1120 may also share a number of operations that are not in common. For example, operations in plan 1 1110 that are not in plan 2 1120 are stale and no longer current based on the update to the tree structures detected by planner 225. These stale operations of plan 1 1110 are represented by portion 1140 of Venn diagram 1100. New operations in plan 2 1120 that are not in plan 1 1110 are represented by portion 1150. Each of portions 1130, 1140, and 1150 which represent the differences and commonalities between plan 1 1110 and plan 2 1120 may include no operations or many operations depending on the updates to the server state and the file system state that are reflected in the tree data structures.

Because the operations in portion 1140 are no longer in the most recent plan, scheduler 230 may cancel tasks associated with these operations. In order to prevent unintended synchronization behavior, tasks associated with operations in plan 2 that are not in plan 1 (e.g., in portion 1150) are postponed until the cancellation of tasks associated with operation in portion 1140 is completed. However, because operations in each plan are configured to be able to be executed concurrently, tasks associated with operations in the intersection of plan 1 and plan 2 represented by portion 1130 may be executed concurrently with the cancellation of tasks associated with operation in portion 1140 without having to wait for their completion. By allowing for the concurrent cancellation of task associated with portion 1140 and the execution of tasks associated with portion 1130, more efficient use of available computing resources may be achieved as well as a reduction in processing time.

Figure 12:
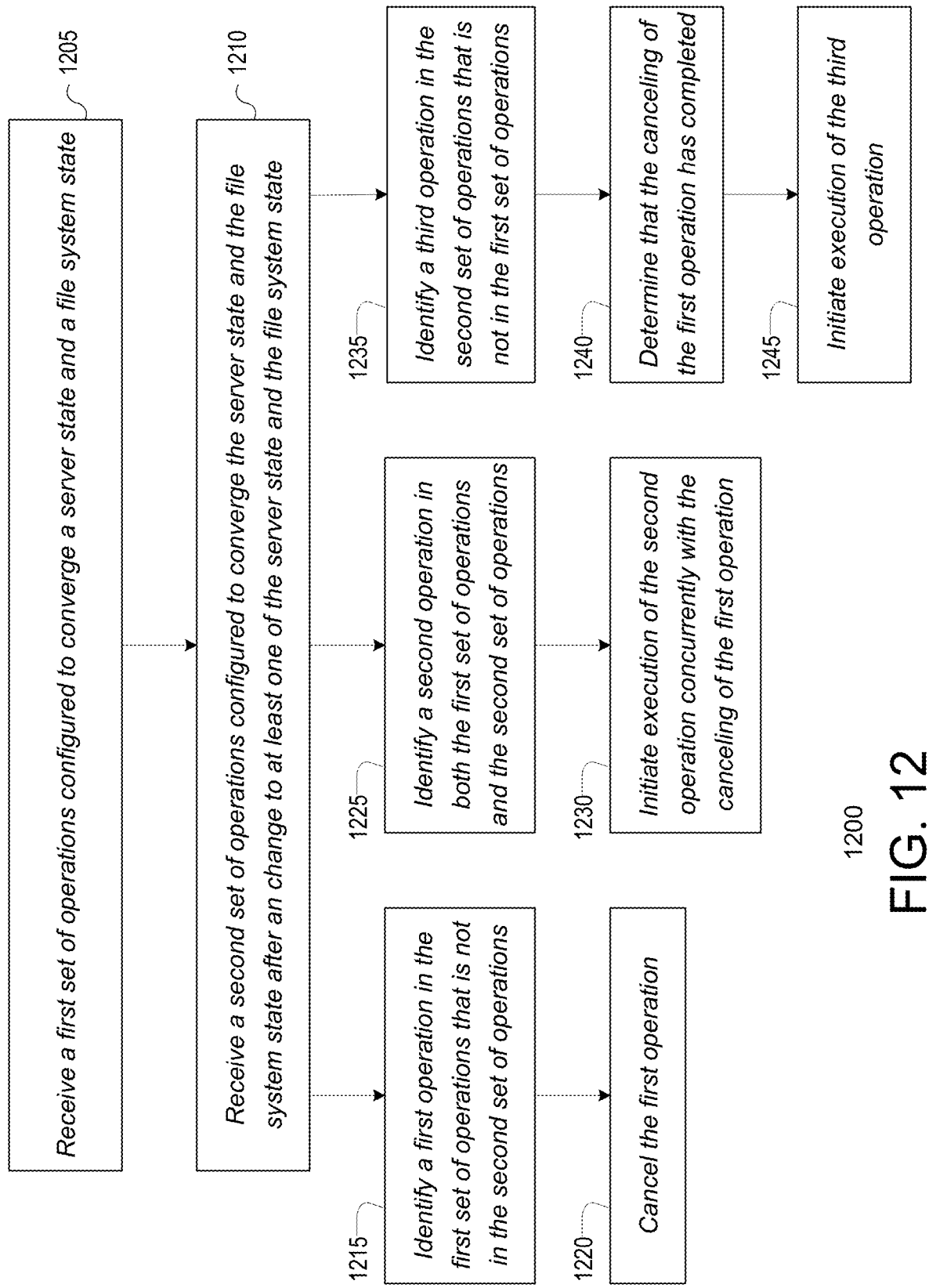
FIG. 12 shows an example method for managing changes in plans of operations, in accordance with various embodiments of the subject technology.

FIG. 12 shows an example method for managing changes in plans of operations, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 1200 may be implemented by a system such as, for example, client synchronization service 156 of FIG. 2, running on a client device.

The system may be configured to receive updates from a content management system and/or the client device with regards to content items associated with a content management service. For example the system may receive server modification data for content items stored by a content management service and update, based on the server modification data, a remote tree. The remote tree represents the server state for content items stored by the content management system. The system may also receive client modification data for content items stored on the client device and update, based on the client modification data, a local tree. The local tree represents the file system state for content items stored on the client device.

At operation 1205, the system may receive a first set of operations configured to converge a server state associated with the content management system and a file system state associated with the client device. For example, the system may identify differences between a sync tree and a remote tree or the sync tree and a local tree and generate the first set of operations based on any differences between the trees. The sync tree represents a known synced state between the server state and the file system state.

The system may begin to implement the first set of operations. For example, in some cases, the operations are in a format ready to be transmitted to the content management system and/or the client device for execution. In other cases, the operations may be translated into one or more tasks, scripts, or execution threads that may be managed by the system. The system may interface with the content management system and/or the client device according to the tasks, scripts, or execution threads in order to converge the server state and the file system state.

During this time, the system may continue to receive modification data from a content management system and/or the client device with regards to content items associated with the content management service. Based on the modification data, the system may update the remote tree or local tree and generate a second set of operations based on the updates to the tree data structures. At operation 1210, the system may receive the second set of operations.

At operation 1215, the system identifies a first operation in the first set of operations that is not in the second set of operations, if any. If the system finds an operation in the first set of operations that is not in the second set of operations, this operation may be stale and out of date as a result of changes specified in the modification data. Accordingly, the system will initiate the cancellation of the first operation at operation 1220. The cancellation of the first operation may include a number of steps, a number of confirmation receipts for the steps, and a non-trivial amount of processing time.

At operation 1225, the system identifies a second operation that is included in both the first set of operations and the second set of operations, if any. If the system finds an operation in both the first set of operations and the second set of operations, this operation may be still be valid notwithstanding changes specified in the modification data. Furthermore, since the operations in both sets of operations are configured to be able to be executed concurrently or in any order with respect to other operations in the set, the second operation can continue execution while the first operation is canceled. Accordingly, the system will initiate the execution of the second operation at operation 1230 without waiting for the first operation to complete cancellation.

At operation 1235, the system identifies a third operation that is in the second set of operations, but not in the first set of operations, if any. If the system finds an operation in the second set of operations that is not in the first set of operations, this operation may be a new operation as a result of changes specified in the modification data. In order to prevent unintended consequences, the system will initiate the wait for the completion of the cancellation of the first operation. At operation 1240, the system may determine that the first operation has completed cancellation and, as a result, initiate the execution of the third operation at operation 1245.

Updating the Local Tree

As described above, the local tree is configured to reflect the file system state for content items stored on the local file system of the client device. For example, file system interface 205 of client synchronization service 156 in FIG. 2 is configured to make changes to the local file system of the client device (e.g., add, delete, move, edit, or rename one or more content items), detect changes to the local file system, and update the local tree based on the changes to the local file system. The changes may be caused by a user action on the file system, a third-party application running on the client device, or by the client synchronization service synchronizing the file system state with the server state.

Various embodiments of the subject technology provide various technical solutions to updating the local tree based on changes to the local file system. The local tree, along with the other tree data structures, is crucial to the synchronization processes between the client device and the content management system in various embodiments. For example, once an update to the local tree is made, the rest the system reacts to the update and, in some cases, the changes to the local tree may be synchronized and applied to the server state at the content management system. Accordingly, it is important to be careful about how the local tree is updated.

For example, if a user renames a file from A.txt to B.txt, in some cases, the system may detect a delete of content item A.txt and an add of content item B.txt. This may cause a node for A.txt to be deleted on the local tree and a node for B.txt to be added. However, this results in a case where, for some time, no node for the renamed content item exists on the local tree. This can cause significant damage to data integrity because the client device, the client application, and/or the client synchronization service may be shut down, fail, or reboot before the node for B.txt is added and, as a result, a user's content item is lost. The loss of the user's content item may then be synchronized to the server state at the content management system. Similar risks are associated with a user moving a content item from one location to another.

Additionally, the changes to the local file system may be detected out of order and may include a large number of changes that are not necessarily all related to a single action by a user or application. The client application may also be turned off or not running while many changes to the local file system are made. On startup, the client application may crawl the local file system, compare it with the local tree, and determine which changes to the local file system have occurred while the client application was off. These changes may not be in proper chronological order. These factors may also result in unintended synchronization behavior if the local tree is not carefully updated.

A set of constraints may be used to ensure tree data structure integrity and protect against unintended synchronization behavior. The constraints may include, for example, that (1) all nodes in a tree are associated with a file identifier (fileID), (2) all nodes in a tree have a unique file identifier, (3) non-empty parent nodes cannot be deleted, (4) deleted nodes are actually deleted (and not merely moved) or removed from a location managed by the client synchronization service, (5) all sibling nodes have unique file names irrespective of case, (6) all nodes must have an existing parent, and/or (7) all sibling nodes agree on their parents file id (DirFileID). In some implementations, a subset of the constraints above may be used, alternative or additional constraints may be used, or a combination. The set of constraints may be applied to all tree data structures or merely a subset of the tree data structures while a different set or sets of constraints may be applied to other tree data structures.

When a change to the local file system is detected, the change may be checked against the set of constraints. If the change is consistent with the set of constraints, the local tree can be updated based on the change to the local file system. If the change violates one of the constraints, the constraint may require additional conditions to be satisfied. For example, a constraint may require additional paths to be observed or file events to occur before the changes can be applied to the local tree, one or more remediation steps to be performed, or a combination. As actions occur to satisfy certain constraints (e.g., remediation steps are taken, additional paths observed, or file events to occur) other constraints may be violated. Accordingly, the set of constraints may be continually checked until all constraints are satisfied. Once the constraints are satisfied, the changes associated with the file events may be applied to the local tree.

File events may be detected by client synchronization service 156 in response to changes detected on the local file system. Each file event may be associated with a content item (e.g., a file identifier for the content item) and an event type (e.g., an add, move, delete, or edit event type). Each file event may also be associated with a path specifying the path or location of the associated content item. The paths associated with the detected file events may populate the set of paths that are observed by the client synchronization service. However, in some cases, paths may be observed that do not correspond to file events due to one or more constraint violations.

Figure 13:
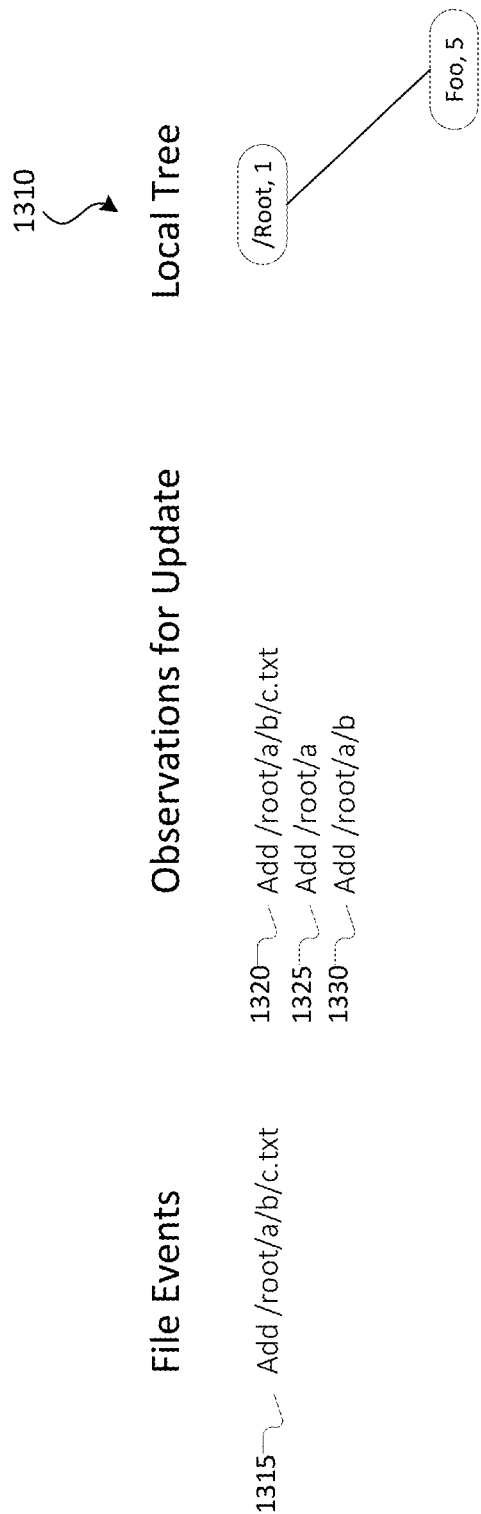
FIG. 13 shows an example scenario, in accordance with various embodiments of the subject technology.

FIG. 13 shows an example scenario, in accordance with various embodiments of the subject technology. In particular, FIG. 13 shows the current state of local tree 1310 when file event 1315 is detected. For example, the client synchronization service may compare the file system with local tree 1310 and discover that a content item exists in the file system at the path/root/a/b/c.txt but a node for a content item at/root/a/b/c.txt does not exist in local tree 1310. Accordingly, a file event 1315 may be generated specifying an add of a node at/root/a/b/c.txt is needed on local tree 1310.

The client synchronization service may add file event 1315 to a set of observed paths for update and determine whether the observed path 1320 is consistent with a set of constraints and discover that observed path 1320 or the file event 1315 violates one of the constraints in the set. In the scenario illustrated in FIG. 13, the observed path 1320 violates the "all nodes must have an existing parent" constraint. More specifically, the parent of the node to be added at/root/a/b/c.txt does not exist nor does the grandparent of the node. Accordingly, additional paths (the parent and grandparent node) must be observed before the change is applied to the local tree.

The client synchronization service may detect additional file events and add them to the set of observed paths for update. For example, the client synchronization service may detect the/root/a file event and the add/root/a/b file event and add the/root/a path and the add/root/a/b path to the set of observed paths. Once these paths are observed, the violated constraint is satisfied (and no other constraints are violated). As a result, all of the observed file events for update may be applied to the local tree. More specifically, a node may be added at/root/a, a node may be added at/root/a/b, and a node may be added at/root/a/b/c.txt. Accordingly, the client synchronization service groups together related file events for an atomic or unitary update. As will be described in further detail, grouping together related file events for an atomic update to the local tree increases tree data structure integrity, protects against unintended synchronization behavior, and prevents intermediate states in the local tree.

Figure 14:
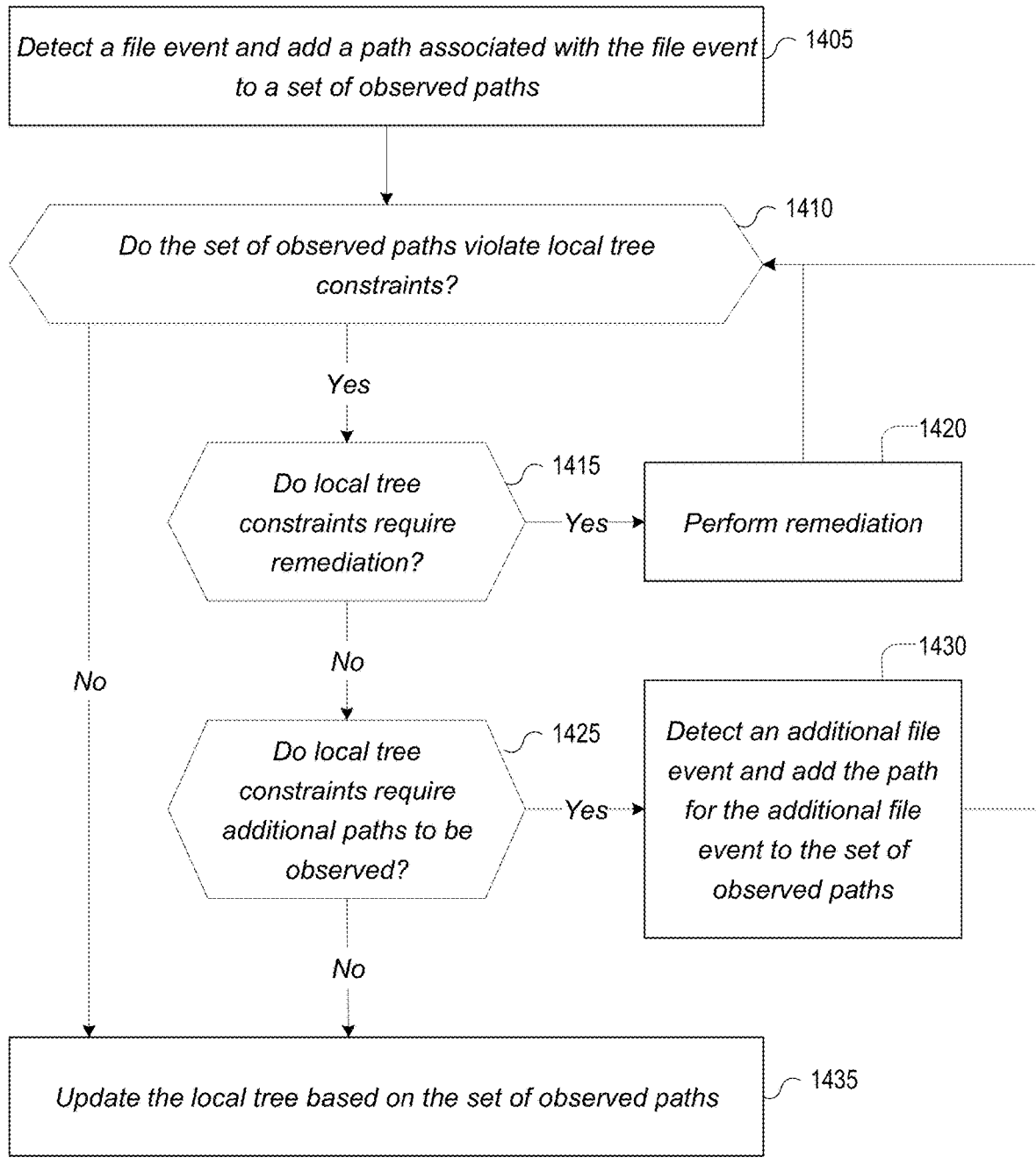
FIG. 14 shows an example method for updating a local tree, in accordance with various embodiments of the subject technology.

FIG. 14 shows an example method for updating a local tree, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 1400 may be implemented by a system such as, for example, client synchronization service 156 of FIG. 2 running on a client device.

At operation 1405, the system detects a file event and adds the path associated with the file event to a set of observed paths. For example, on startup, the system may crawl the file system of the client device, collect information on the file system, and compare the collected information with the local tree which represents the last known state of the file system. The system may identify differences between the local tree and the file system of the client device and generate a number of file events based on the identified differences. Alternatively, or additionally, the system may monitor the file system during runtime, detect changes made to the file system that are not reflected in the local tree, and generate file events based on the detected changes to the file system. The generated file events may be thought of as observations about the file system that are made by the system.

At operation 1410, the system will check the set of observed paths against a set of local tree constraints to determine whether any of the observed paths violates a local tree constraint. If none of the observed paths violate any of the constraints in the set of local tree constraints are violated, the set of observed paths may be used to update the local tree at operation 1435.

Each violation of a constraint may be associated with a remediation configured to satisfy the constraint. For example, a violation of the "all nodes must have an existing parent" constraint may be associated with a requirement that the addition of the parent node be observed, as illustrated in FIG. 13.

In other cases, a violation of a constraint may require actions to be taken to resolve the violation and satisfy the constraint. For example, when a user copies a content item in the file system and creates a new copy of an existing content item, the new content item may have the same file identifier as the original content item. The system may observe the addition of the new copy, but this new copy violates the constraint that "all nodes in a tree have a unique file identifier." The violation of this constraint may be associated with the remediation steps of requesting a new file identifier for the content item and assigning the new content identifier to the content item, thus resolving the violation and satisfying the constraint, before the local tree is updated. Accordingly, the local tree will at no point be in a state that violates any constraint.

In another example, a user may create a new content item in a location of the file system where the file name already exists, albeit with differing letter case. To illustrate, a user may create a file named "A.txt" when the file "a.txt" already exists with the same file system path. The operating system of the client device may allow for this while the client synchronization service may not. The system may observe the addition of the new content item, but this new content item violates the constraint that "all sibling nodes have unique file names irrespective of case." The violation of this constraint may be associated with the remediation steps of editing the name of the new content item to denote that a case conflict exists. For example, the "A.txt" file may be renamed "A(case conflict).txt," thus resolving the violation and satisfying the constraint. The file event and path may be removed from the set of observed paths and the process restarted such that a new file event for the addition of the "A(case conflict).txt" content item is detected or the file event for "A.txt" may be updated to reflect the new name "A(case conflict).txt."

If one or more observed paths violate one or more constraints, the system may determine whether the violated constraint requires remediation actions to be taken at operation 1415 or whether the violated constraint requires additional paths to be observed at operation 1425. If additional remediation actions are required, at operation 1420, the system may execute the additional remediation actions. If additional paths are to be observed, at operation 1430, the system may detect additional file events and add the paths associated with the file events to the set of observed paths at operation 1430.

The process then returns to operation 1410 to determine whether the set of observed paths violate the local tree constraints. In some cases, the execution of the remediation actions, the new file events detected, or the paths added to the set of observed paths may cause new violations of one or more constraints that must be resolved before an update to the local tree can be performed. Accordingly, the process may iterate until no more violations of the local tree constraints exist. The process may then proceed to operation 1435, where the system may update the local tree based on the observed set of paths.

Updating the Local Tree with Move or Rename Changes

According to some implementations, move or rename operations on content items on the local file system may introduce additional technical problems. For example, in some cases when content items such as files or folders are moved from an old location to a new location by the user or application, the operation may appear to the file system or client application as a delete of the content items from the old location and an add of new content items at the new location. Similarly, a rename of a content item from an old filename to a new file name may appear as a delete of the content item with the old filename and an add of a new content item with the new file name. Furthermore, if the content item is a folder that is the parent of many other content items, with a potentially deep and complex tree structure, a move or rename of the content item may also appear as a delete of all descendent content items from their old location or path to a new location or path.

As described above, intermediate states where content items are deleted or removed from the local tree before they are re-added in the new location or with the new name is undesirable and increases data vulnerability where a user's data may be lost. Additionally, move or rename operations appear as delete operations to the client synchronization service until a corresponding add operation is detected. However, the add operation may not be detected for a long time after the delete operation is detected based on the size and complexity of the local file system. For example, the client synchronization service may crawl one portion of the local file system and discover the delete of the content item and not discover that the content item has been added to another portion of the local file system, thereby completing the move operation, until the client synchronization service crawls that portion of the local file system.

Various embodiments of the subject technology address are directed to providing technical solutions to these and other technical problems by providing a more efficient and faster method of determining whether a delete operation is part of a move or rename operation or simply a delete operation.

Figure 15:
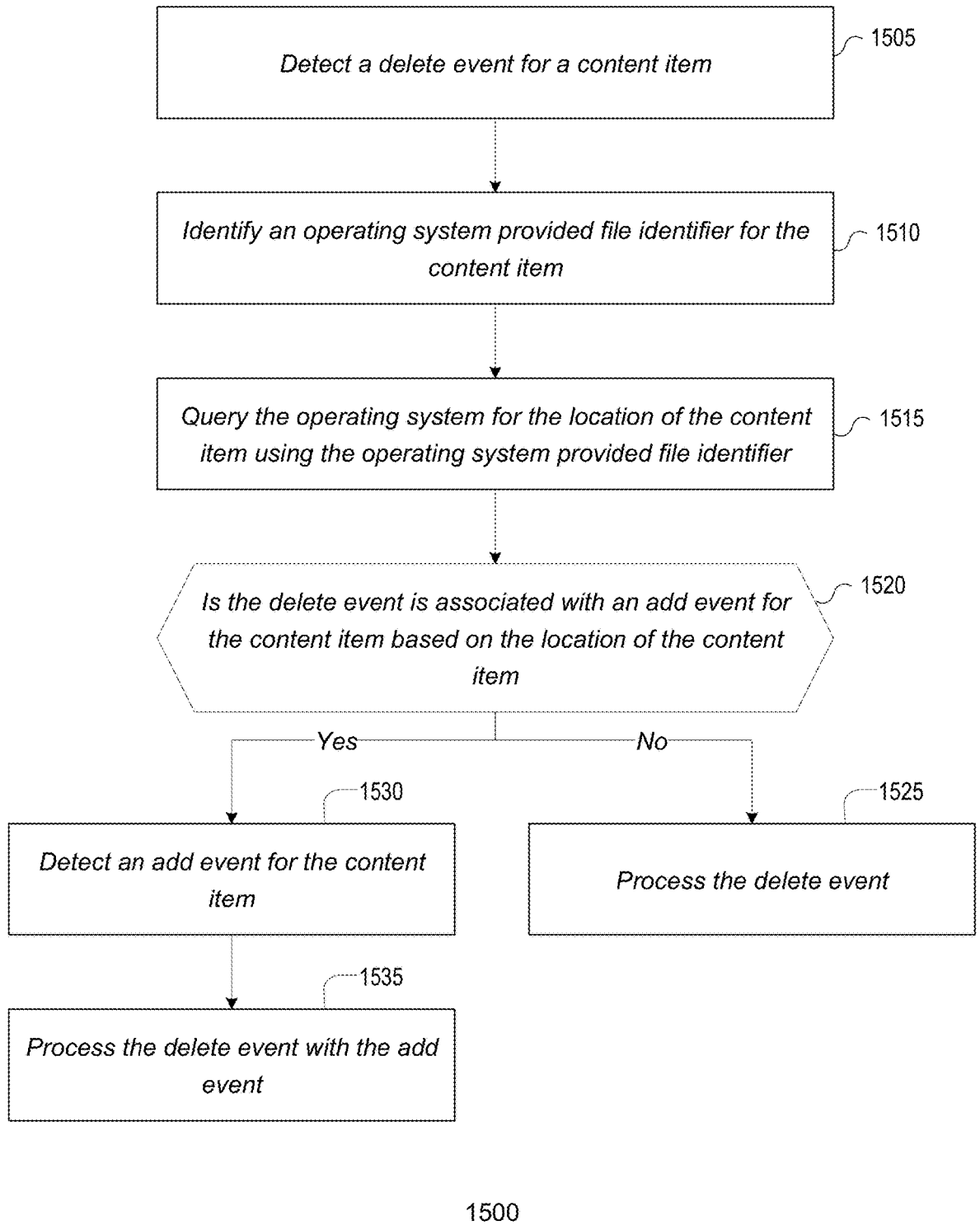
FIG. 15 shows an example method for updating a local tree in response to a move or rename operation, in accordance with various embodiments of the subject technology.

FIG. 15 shows an example method for updating a local tree in response to a move or rename operation, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 1500 may be implemented by a system such as, for example, client synchronization service 156 of FIG. 2 running on a client device.

At operation 1505, the system detects a delete event for a content item. The system may crawl or monitor changes to the local file system of the client device or a portion of the local file system that the system is configured to manage (e.g., a content management folder). The system may compare the local file system with the local tree in order to identify differences between the local file system and the local tree. The delete event may be detected based on one or more identified differences. For example, a node for a content item exists in the local tree at a particular location but does not exist at that location on the local file system. This may indicate that a user or application has performed an action that caused the content item to be removed from that location, which causes the system to detect the delete event.

The action that caused the delete event to be detected may be caused by a user or application moving the content item to another location monitored by the system, moving the content item to another location not monitored by the system, renaming the content item (which may be treated as a move by some file systems), or actually deleting the content item. In order to determine what user action caused the delete event and/or whether or not an add event associated with the delete event will be or has already been detected, the system may identify an operating system provided identifier for the content item at operation 1510.

In some embodiments, the operating system provided identifier may be an inode identifier and is different from the file identifier provided by the content management system and/or client synchronization service. In many cases, the operating system may provide the inode identifier in order to, among other things, allow for quick querying of the location of a content item based on the inode identifier. For example, some operating systems may provide an interface where the system may query for a current path or location of a content item using the inode identifier as a key. At operation 1515, the system may determine the location of the content item by querying the operating system for the location of the content item. In response to the query, the operating system may return with the current location or path in the local file system of the content item referenced by the inode identifier.

Using the current location of the content item, the system may determine what action caused the delete event. For example, if the current location is a null location or otherwise indicates that the content item is no longer on the local file system, the action that caused the delete event is an actual delete. Accordingly, the system can appropriately delete the node for the content item from the local tree. If the current location is a location not managed by the system (e.g., the client synchronization service), the action that caused the delete event is likely a move of the content item from its previous location to its current location. However, because the content item is moved outside the territory managed by the system, the system no longer needs to track the content item and can delete the node for the content item from the local tree.

If the current location is a new location that is still managed by the system, the action that caused the delete event is also a move of the content item from its previous location to its current location. However, because the content item still within a territory managed by the system, the system should await the detection of a corresponding add event and treat the delete event and the add event together as a move action and update the local tree atomically, mirroring the actual action that caused the delete event.

Similarly, if the current location is the same location as the old location, which is managed by the system, the action that caused the delete event is also a rename of the content item from its previous location to its current location. In some file systems, rename operations and move operations are related in that a rename operation is treated as a move operation from one location with one name to the same location with a new name. Accordingly, the system should await the detection of a corresponding add event (with the new name) and treat the delete event and the add event together as a move or rename action and update the local tree atomically, mirroring the actual action that caused the delete event.

Accordingly, at operation 1520, the system determines whether the delete event is associated with an add event for the content item based on the location of the content item. If the delete event is not associated with an add event, the delete event may be processed at operation 1525. If the delete event is associated with an add event, system may wait for the add event, detect the add event for the content item at operation 1530, and process the delete event with the add event in a unitary update to the local tree at operation 1535. According to some implementations, waiting for the add event is unnecessary as the mode query has already provided the current location or path for the content item. Accordingly, the system may observe that path for the content item and add the path to the set of observed paths.

Although method 1400 of FIG. 14 and method 1500 of FIG. 15 are described separately, the two methods may work in conjunction with one another in order to update the local tree. For example, if the delete event is not associated with an add event, the delete event may be processed without combining the delete event with a corresponding add event at operation 1525 of FIG. 15. According to some embodiments, processing the delete event may include operations illustrated in FIG. 14 where, for example, the delete event may be added to a set of observed paths and checked to determine whether a local tree constraint is violated.

For example, if the content item associated with the delete event has one or more descendant nodes in the local tree, the "non-empty parent nodes cannot be deleted" constraint may be violated. The remediation for this violation may include waiting to observe additional paths (e.g., delete events for every descendant node of the content item). Once the additional file events are detected and constraints for these additional file events or paths may be checked, including a check to determine if additional delete file events are associated with additional corresponding add events. Once all of the observed file events are validated, the file events may be batched together and used to update the local tree.

Similarly, if the delete event is associated with an add event, system may wait for the add event, processing the delete event with the add event in a unitary update to the local tree at operation 1535 may include adding both events to the set of observed file events, determining whether the violate any local tree constraints, performing appropriate remediations if they do, and updating the local tree based on the entire set of observed file events.

Updating the Remote Tree

As described above, the remote tree represents a server state for content items stored by the content management system. For example, server synchronization service 112 in FIG. 1 is configured to communicate with client synchronization service 156 to synchronize changes to content items between client device 150 and content management system 110.

Various embodiments of the subject technology provide various technical solutions to updating the remote tree based on changes at the content management system. The remote tree, along with the other tree data structures, is crucial to the synchronization processes between the client device and the content management system in various embodiments. For example, once an update to the remote tree is made, the rest the system reacts to the update and, in some cases, the changes to the remote tree may be synchronized and applied to the file system state at the client device. Accordingly, it is important to be careful about how the remote tree is updated.

As is described in further detail throughout, in certain embodiments, content management system 110 can also store a log of data regarding changes, access, etc. in server file journal 148. Server file journal 148 can maintain one or more journals of revisions to content items in content storage 142. The one or more journals can track revisions of each content item on each namespace. A row of values in a journal on server file journal 148 can identify a content item in a namespace and reflect a state of the content item in the namespace. A subsequent row in the journal corresponding to the same content item in the namespace can reflect a subsequent revision to the content item in the namespace.

Thus, rows in server file journal 148 associated with a content item can identify the current state of the content item and any revisions to the content item from creation to the current state. To synchronize content item information with server file journal 148, content management system 110 may translate the information contained in the server file journal 148 into operations data that can be provided to client device 150 and provide client device 150 with the latest server state of content items from server file journal 148.

Various embodiments of the subject technology relate to client device 150 receiving operations data from content management system 110 and updating a remote tree representing the server state for content items stored on the content management system based on the operations data. However, the operations data provided to client device 150 may not be in a tree data structure like the remote tree. Instead, the operations data represent a log of operations. Accordingly, client synchronization service 156 running on the client device 150 is configured to receive the operations data that includes the log of operations and execute the log of operations on the remote tree, thereby updating the remote tree.

According to some embodiments content management system 110 may generate and provide the operations data configured to rebuild the entire remote tree. This may include the entire log of operations for one or more namespaces. In some cases, content management system 110 may remove operations from the log that are no longer current or are unneeded to build the remote tree. For example, operations for content items that are subsequently deleted may be removed from the operations data. Client synchronization service 156 may receive the log of operations and incrementally step through each operation in the log to build a complete remote tree. Alternatively, client synchronization service may compare an existing remote tree with the log of operations to determine which operations in the log need to be applied to the existing remote tree in order to bring the remote tree up to date.

In other embodiments, content management system 110 may generate and provide the operations data configured to incrementally update the remote tree stored by the client device. In order to determine what portion of the log should be used to generate the operations data, content management system 110 uses a cursor that represents a point in a timeline for a namespace. The cursor may include, for example, an entry identifier in a log of operations in server file journal 148 corresponding to a particular namespace. In one embodiment, the entry identifier may be an SJ_ID which increases per entry in the log of operations for a namespace. However, the cursor may also be implemented as a logical clock value, a counter, a timestamp, or any other value able to mark a point in the life cycle of a server state.

For example, content management system 110 may determine that there have been changes to a namespace and send a notification to client synchronization service 156. In response to receiving the notification of the change, client synchronization service 156 may transmit a request for the log of operations since the last time the remote tree was updated. The request may include the cursor signifying the last time the remote tree was updated or the last update that was received from content management system 110. Alternatively, client synchronization service 156 may transmit a request that includes the cursor without the need for the notification from content management system 110. In still another implementation, content management system 110 may keep track of the cursor each time operations data is sent to client synchronization service 156 and the client synchronization service 156 is not required to transmit the cursor to content management system.

Using this cursor, content management system 110 may determine what portion of the log of operations to send to client synchronization service 156 and send that portion as operations data. Client synchronization service 156 may receive the portion of the log of operations as operations data and incrementally step through each operation in the log in order to update the remote tree.

Figure 16:
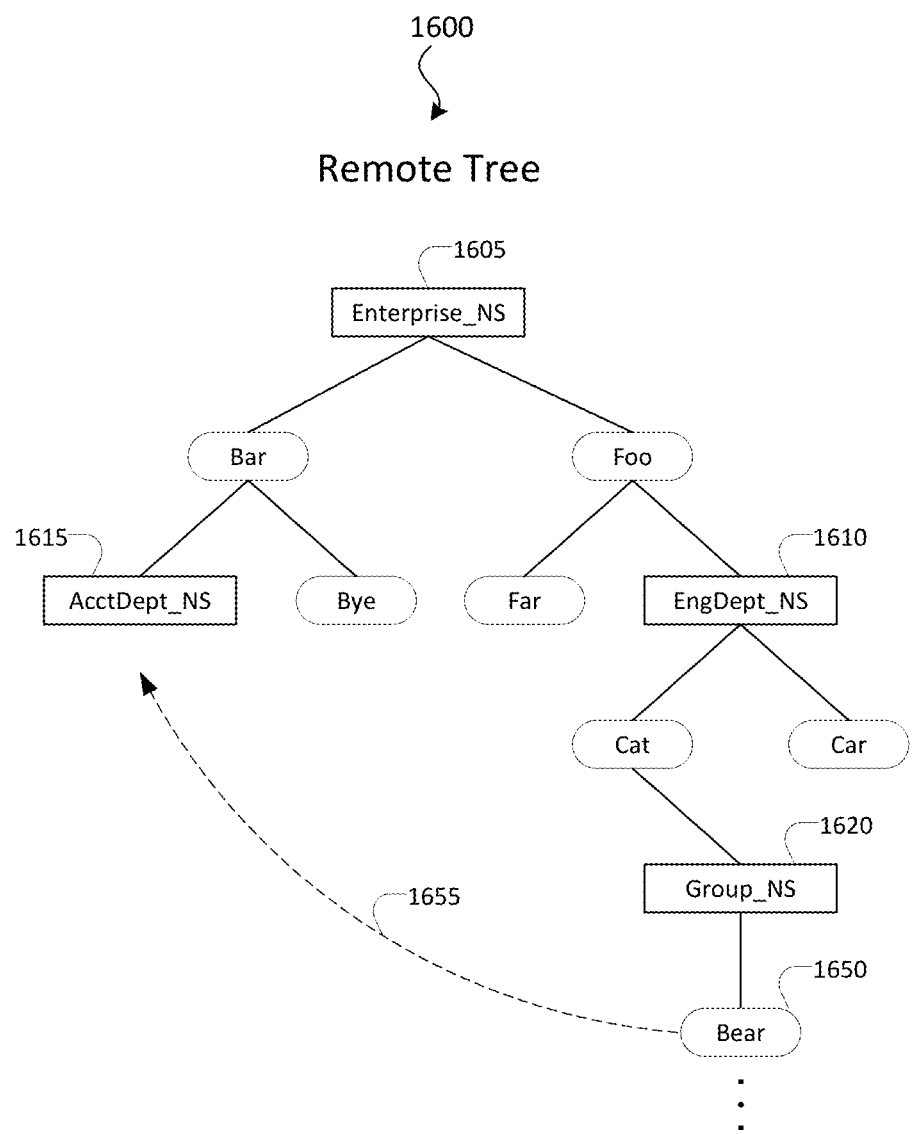
FIG. 16 shows an example of tree data structure, in accordance with various embodiments.

In order to enable certain features, however, the server state and the remote tree that represents it may include more than one namespace. For example, having multiple namespaces may enable a more organization centric storage model and/or sharing amongst individuals and groups. FIG. 16 shows an example of a tree data structure, in accordance with various embodiments. Although remote tree 1600 is shown in FIG. 16, other tree data structures (e.g., the sync tree and the local tree) may have similar structures and characteristics. Remote tree may include four namespaces 1605, 1610, 1615, and 1620. Namespace 1605 may represent the root namespace while namespaces 1610 and 1615 are mounted within namespace 1605. Nested namespaces are also possible, as illustrated by the mounting of namespace 1620 within namespace 1610.

Each namespace may be associated with one or more individual users and different permissions. For example, enterprise namespace 1605 may be associated with a company or organization as a whole while namespace 1615 may be associated with an accounting department in the organization and namespace 1610 may be associated with an engineering department within the organization. Namespace 1620 may be associated with a group within the engineering department and may include further namespaces including namespaces for individual users. The different namespaces allow for better cooperation and control of the sharing and access of content items amongst users.

Each namespace may be associated with a separate log of operations identified by a namespace identifier (e.g., an NS_ID) and a cursor (e.g., the SJ_ID) that represents a point in a timeline for that namespace. However, tracking progress and synchronizing timelines across multiple namespaces is difficult using the SJ_IDs for multiple namespaces. For example, a first SJ_ID for first namespace being equal to a second SJ_ID for second namespace is not able to guarantee that the first and the second namespaces correspond to the same state or point in time.

This presents a serious technical problem when there are operations across namespaces. For example, a mount operation of one namespace into another namespace that introduces a dependency between the operation logs of the two namespaces. Operations across namespaces such as a move operation may violate constraints put on the tree data structures. For example, move operation 1655 illustrated in FIG. 16, where content item 1650 in namespace 1620 is moved to namespace 1615 would appear as an operation (e.g., a delete operation) in the log of operations for namespace 1620 and a corresponding operation (e.g., an add operation) in the log of operations for namespace 1615. In order to preserve the constraint that no file identifier can exist in more than one location in the tree, the delete operation in namespace 1620 should occur before the add operation in namespace 1615. However, it is difficult to guarantee this only using SJ_IDs for the logs of each namespace.

As will be discussed in further detail in the sections below, various embodiments of the subject technology provide a technical solution using a content management system configured to synchronize the multiple log entry identifiers (e.g., SJ_IDs) of multiple namespaces using a Lamport clock to encode an ordering constraint between SJ_IDs of the multiple namespaces and, as a result, a total ordering across namespaces. The content management system may further be configured to linearize the log of operations for each of the namespaces into a set of linearized operations, which is included in operations data and provided to the client device.

With respect to the client device, the client synchronization service may receive the operations data that includes a set of operations linearized across multiple namespaces and ordered in correct sequence. The client synchronization service may incrementally step through, using the cursor, each operation in the set of linearized operations in order to update the remote tree.

Mounting a Namespace in a Remote Tree

As described above, the client synchronization service may update a remote tree on the client device based on the operations data received from the content management system. Additional technical problems arise when the client synchronization service encounters a mount operation for a previously unknown namespace target in the operations data. The client synchronization service is prevented from mounting the namespace target before determining the contents of the mount target and potentially validating it against various constraints or rules in order to preserve the integrity of the remote tree. However, because the mount target was previously unknown, the client synchronization service is not aware of the contents of the mount target. Various embodiments of the subject technology address these and other technical issues.

Figure 17:
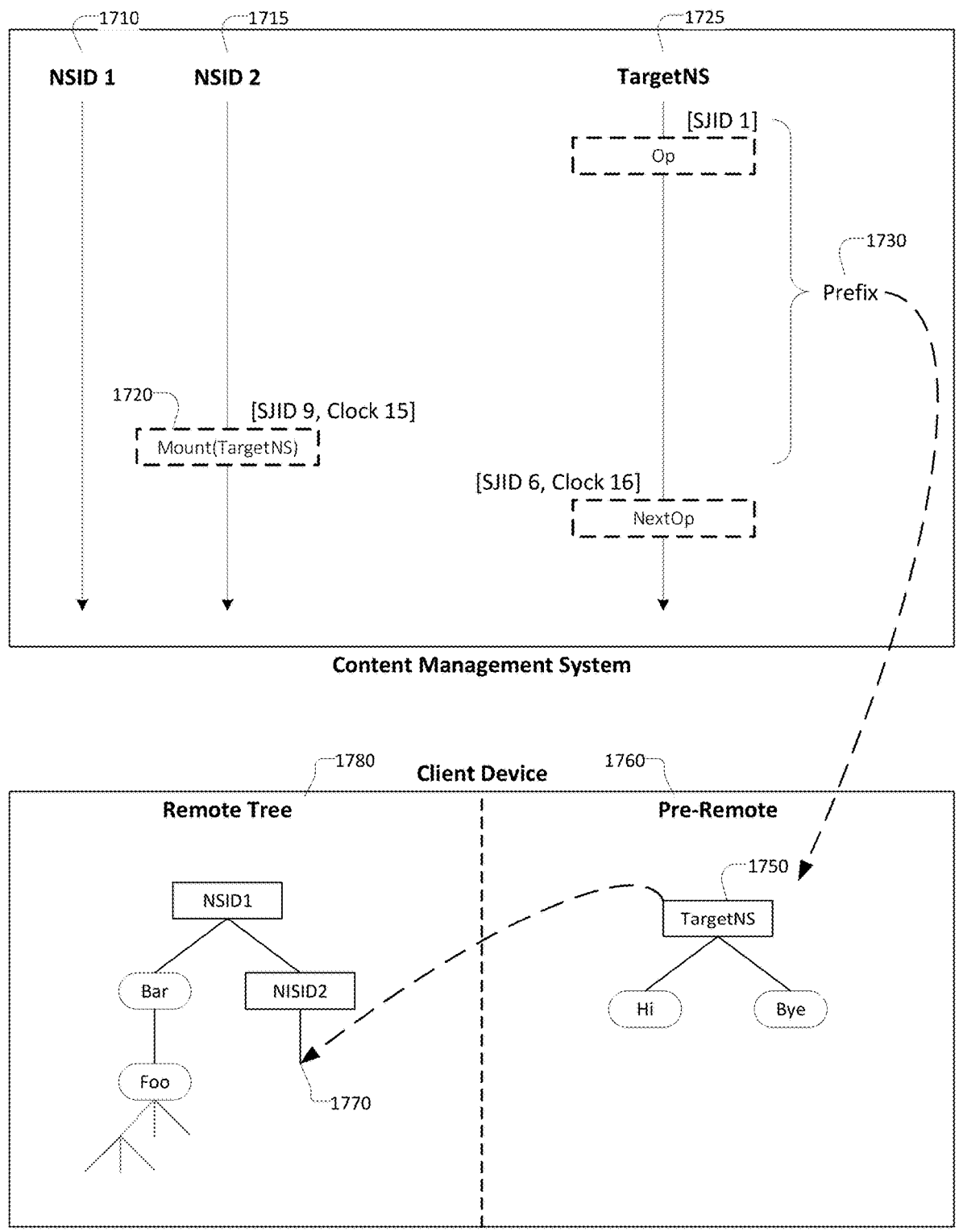
FIG. 17 shows a conceptual illustration of mounting a namespace, in accordance with various embodiments.

FIG. 17 shows a conceptual illustration of mounting a namespace, in accordance with various embodiments. The content management system is configured to linearize the log of operations for each namespace into a set of linearized operations, which are provided to the client device. FIG. 17 includes a representation of a log of operations for namespace NSID1 1710 and a log of operations for namespace NSID2 1715. A cross-namespace ordering between the two namespaces is established with the use of entry log identifiers (e.g., SJ_IDs) and Lamport clock values.

During an initial period of time, the content management system is linearizing two namespaces associated with a user account. At event 1720, the log of operations for namespace NSID2 1715 is processed at SJ_ID 9, clock 15 that indicates that a new namespace is to be mounted within namespace NSID2 1715. Up until this point, the client device may not have any information associated with the new namespace and, as such, there is no guarantee that a tree constraint is not violated if the namespace were immediately mounted.

The content management system detects the mount operation 1720 for mounting the target namespace 1725. In response to detecting the mount operation 1720, the content management system transmits to the client device a mount notification that includes a namespace identifier for the target namespace. The content management system further adds the target namespace 1725 to the linearization process along with namespace NSID1 1710 and namespace NSID2 1715 and transmits the prefix of the log of operations for the target namespace 1725 to the client device. The prefix may be an initial portion of a log of operations for the target namespace 1725 to be added up until the mount operation 1720 and may be used by the client device to build a subtree for the target namespace 1725 before mounting the namespace to the remote tree.

Figure 18:
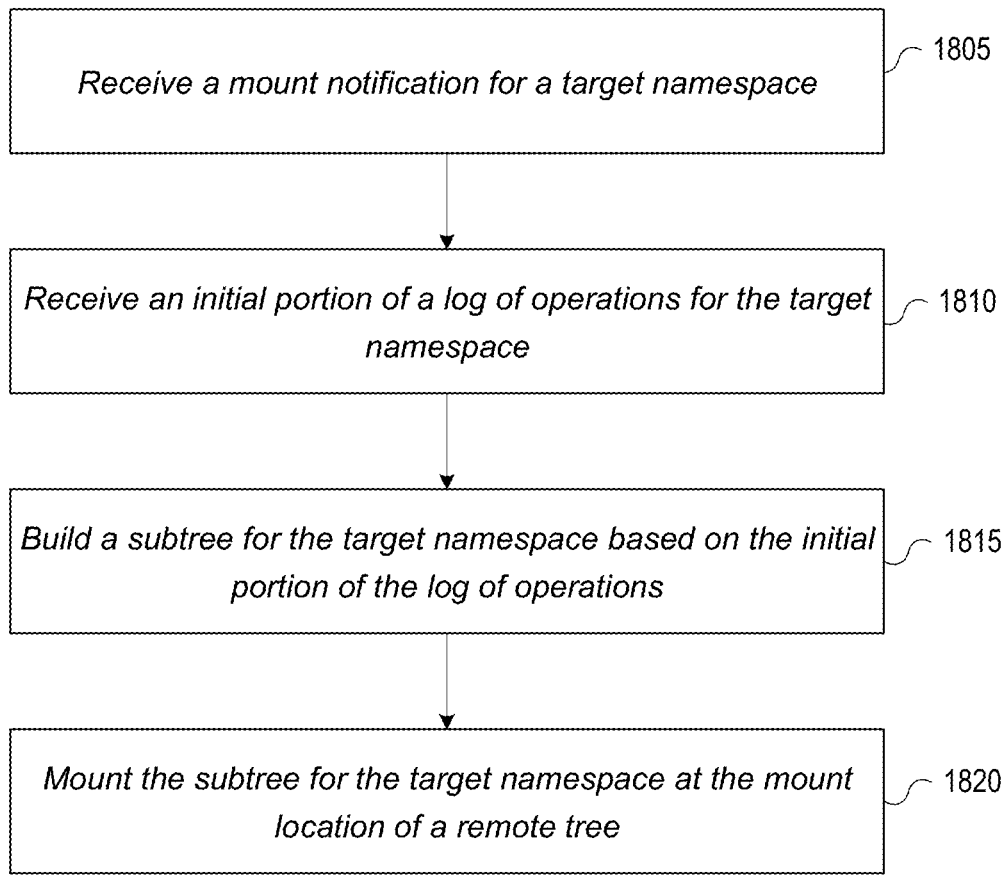
FIG. 18 shows an example method for mounting a namespace in a remote tree, in accordance with various embodiments of the subject technology.

FIG. 18 shows an example method for mounting a namespace in a remote tree, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 1800 may be implemented by a system such as, for example, client synchronization service 156 of FIG. 2 running on a client device.

At operation 1805, the system may receive a mount notification for a target namespace. The mount notification may be transmitted by the content management system to the system to notify the system that a subtree is to be created based on an incoming prefix or initial portion of a log of operations for the target namespace. At operation 1810, the system may receive the initial portion of a log of operations for the target namespace.

As seen in FIG. 17, prefix or initial portion 1730 of the log of operations for the target namespace is transmitted to the system (e.g., the client device) from the content management system. At operation 1815, the system may begin building a subtree for the target namespace based on the initial portion of the log of operations. As illustrated in FIG. 17, the subtree for the target namespace 1750 may be generated in a pre-remote holding area 1760 until the system is done building the subtree.

The pre-remote holding area is a location for the client device to store and generate one or more subtrees associated with mount targets (e.g., namespaces to be mounted). The subtrees for these mount targets may be stored and updated in the pre-remote holding area until the subtrees have caught up to the current state (e.g., the cursor) of the remote tree. Once the subtrees for the mount targets have caught up to the current state of the remote tree, the subtrees for the mount targets may be mounted in the remote tree.

As noted above, additional namespaces may be nested within a target namespace and be previously unknown to the client device. As the initial portion 1730 of the log of operations is being processed and transmitted to the client device, additional mounts may be discovered and the method 1800 may be recursively repeated. For example, as the initial portion 1730 of the log of operations for the target namespace is transmitted to the system, additional mount operations may be detected by the content management system causing the content management system to transmit another mount notification for another target namespace, thereby initiating a recursive iteration of method 1800 within the first iteration of method 1800. Once the recursive iteration of method 1800 is completed (along with any further iterations for further nested namespaces that are discovered), the process may return to the first iteration of method 1800.

When the initial portion 1730 of the log of operations for the target namespace has been transmitted to the client device, the content management system may transmit the mount operation 1720 of FIG. 17 whose detection initiated the process in the beginning. The client device receives the mount operation and, at operation 1820, mounts the subtree for the target namespace at the mount location of the remote tree. According to some embodiments, the mount location may be provided by the mount operation, the mount notification, or both. As illustrated in FIG. 17, the subtree for the target namespace 1750 is mounted at the mount location 1770 of the remote tree 1780. According to some embodiments, additional validation checks may be performed to make sure that the remote tree containing the mounted subtree is consistent with all the tree constraints applied to the remote tree.

According to some embodiments, the prefix or initial portion of the log of operations for the target namespace may be processed in order to remove operations that are no longer valid, up-to-date, or will not be reflected in the final subtree. For example, the initial portion may include a delete operation for a content item that will not be reflected in the final subtree, an add and a corresponding delete operation for a content item that will not be reflected in the final subtree, or move operations that move a content item outside the target namespace. These types of operations that will not be reflected in the final subtree for the target namespace and may be removed from the initial portion of the log of operations in order to reduce space, bandwidth, processing time, and other computing resources.

Content Management System File Journal and Storage Systems

Figure 19A:
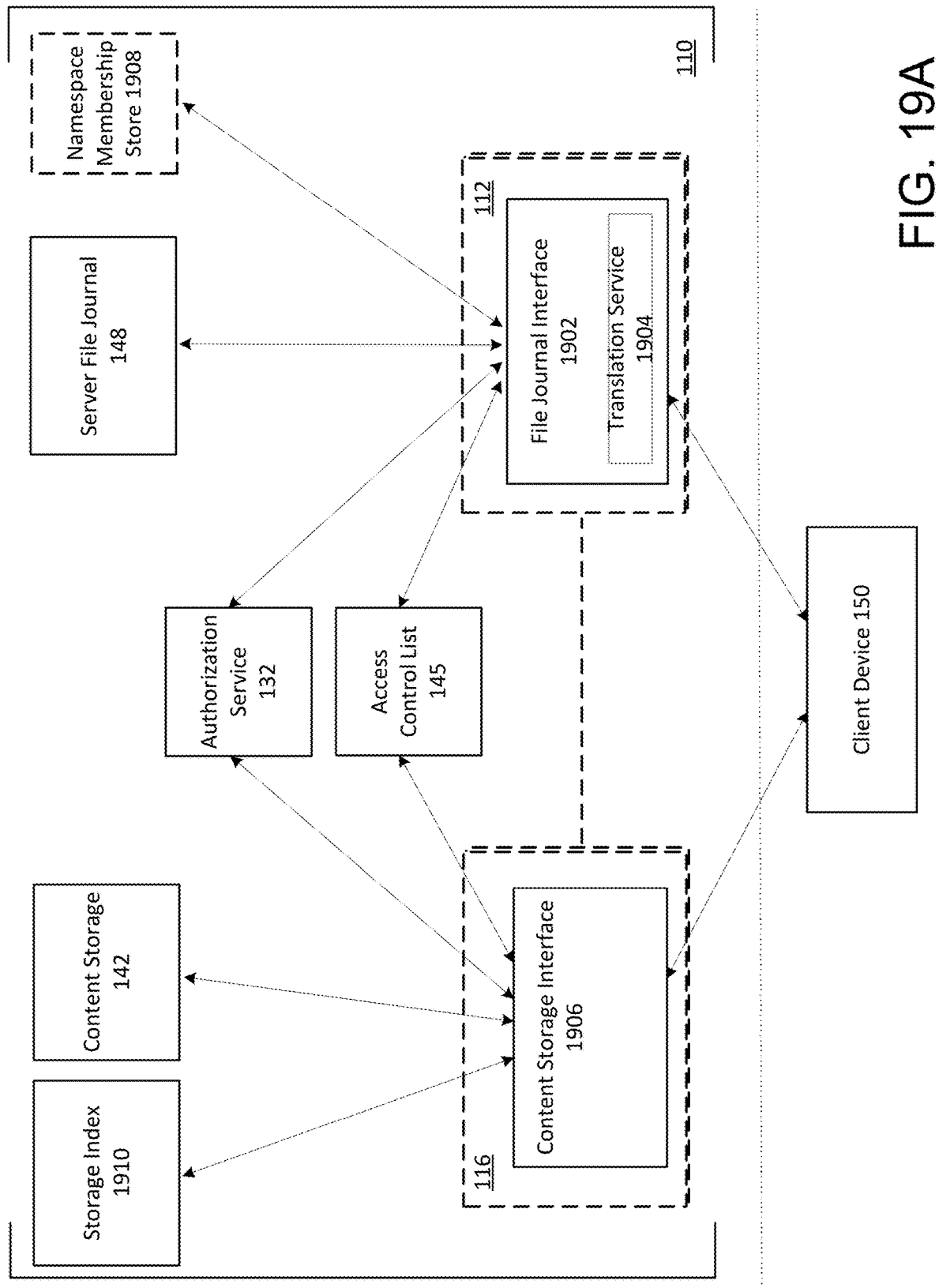
FIG. 19A shows a schematic diagram of an example architecture for synchronizing content between the content management system and client devices, in accordance with various embodiments of the subject technology.

Turning our focus to content management system 110, FIG. 19A illustrates a schematic diagram of an example architecture for synchronizing content between content management system 110 and client device 150 in system configuration 100. In this example, client device 150 interacts with content storage 142 and server file journal 148 respectively via content storage interface 1906 and file journal interface 1902. Content storage interface 1906 can be provided or managed by content storage service 116, and file journal interface 1902 can be provided or managed by server synchronization service 112. For example, content storage interface 1906 can be a subcomponent or subservice of content storage service 116, and file journal interface 1902 can be a subcomponent or subservice of server synchronization service 112.

Content storage interface 1906 can manage communications, such as content requests or interactions, between client device 150 and content storage 142. Content storage interface 1906 can process requests from client device 150 to upload and download content to and from content storage 142. Content storage interface 1906 can receive content requests (e.g., downloads, uploads, etc.) from client device 150, verify permissions in access control list 145, communicate with authorization service 132 to determine if client device 150 (and/or the request from client device 150) is authorized to upload or download the content to or from content storage 142, and interact with content storage 142 to download or upload the content in content storage 142 to client device 150. If the request from client device 150 is a request to download a content item, content storage interface 1906 can retrieve the content item from content storage 142 and provide the content item to client device 150. If the request from client device 150 is a request to upload a content item, content storage interface 1906 can obtain the content item from client device 150 and upload the content item to content storage 142 for storage.

Figure 19B:
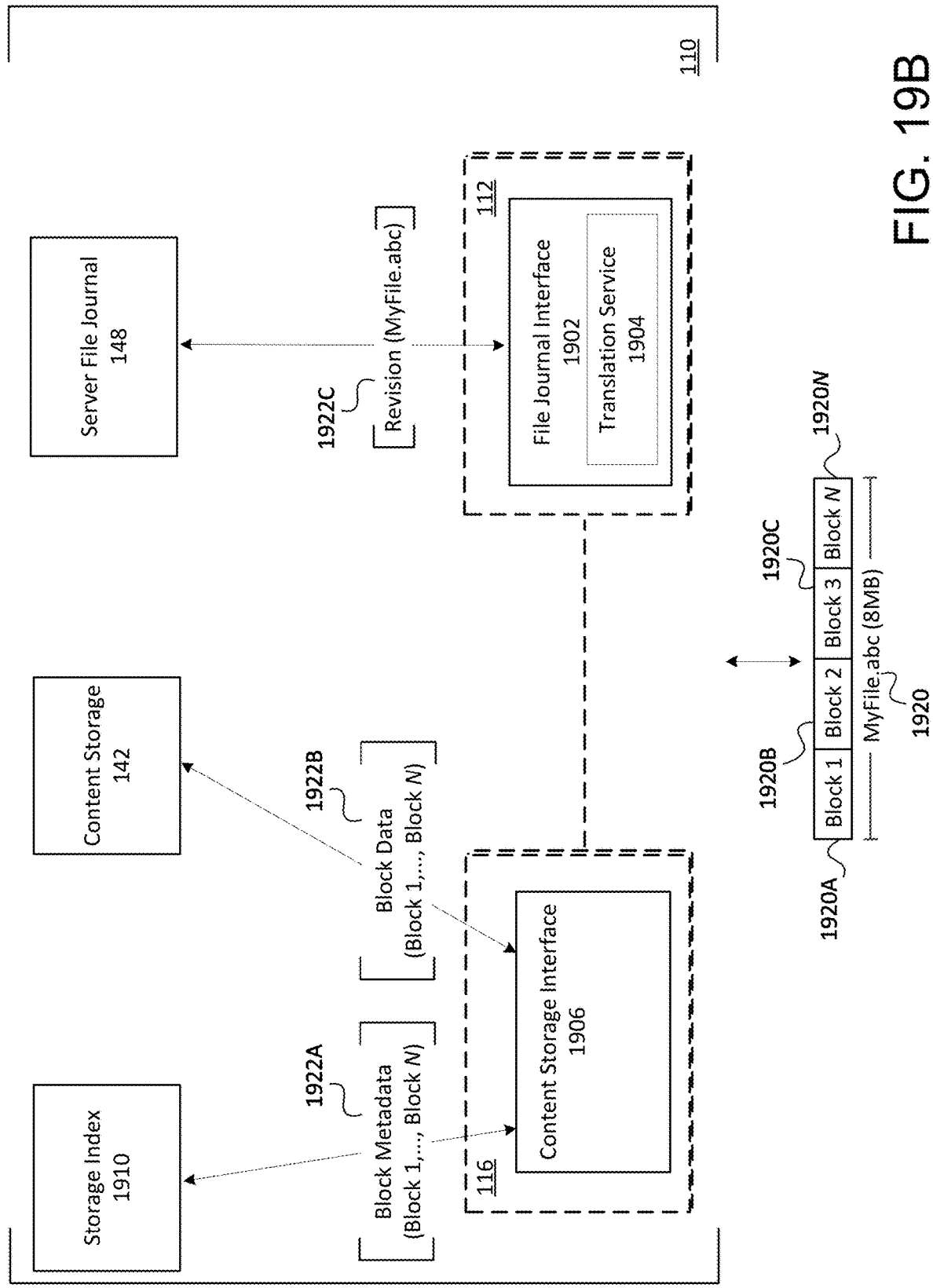
FIG. 19B shows an example configuration for storing and tracking blocks of content items in the example architecture for synchronizing content between the content management system and client devices, in accordance with various embodiments of the subject technology.

When processing content requests from client device 150, content storage interface 1906 can communicate with storage index 1910 to check the availability and/or storage location of the requested content in content storage 142, and track content items in content storage 142. Storage index 1910 can maintain an index of content items on content storage 142 which identifies the content items on content storage 142 and can also identify a respective location of the content items within content storage 142. Thus, storage index 1910 can track content items on content storage 142 as well as storage locations of the content items. Storage index 1910 can track entire content items, such as files, and/or portions of the content items, such as blocks or chunks. In some cases, content items can be split into blocks or chunks which can be stored at content storage 142 and tracked in storage index 1910. For example, content storage 142 can store a content item as blocks or chunks of data which include respective data portions of the content item. Storage index 1910 can track the blocks or chunks of the content item stored in content storage 142. FIG. 19B described below illustrates an example configuration for storing and tracking blocks of content items.

File journal interface 1902 can manage communications, such as metadata requests and content synchronizations and operations, between client device 150 and server file journal 148. For example, file journal interface 1902 can translate, validate, authenticate, and/or process operations, configurations, and state information between client device 150 and server file journal 148. File journal interface 1902 can verify permissions from an FSAuth token in a cursor or through authorization service 132 to authorize, or verify authorization of, requests sent by client device 150 to server file journal 148. When processing requests or operations from client device 150, file journal interface 1902 can access namespace membership store 1908 to determine or verify namespace ownership information for any namespaces associated with the requests or operations from client device 150, and retrieve permissions information from access control list 145 to verify permissions of content associated with the requests or operations from client device 150.

Translation service 1904 in file journal interface 1902 can perform linearization and translation operations for communications between client device 150 and server file journal 148. For example, translation service 1904 can translate communications from client device 150 to a different format consistent with the structure and format of data in server file journal 148, and vice versa. To illustrate, in some cases, client device 150 can process content item information (e.g., state, changes, versions, etc.) at client device 150 as operations, while server file journal 148 can process the same information as content item revisions reflected by rows in a data structure such as a database table. To enable synchronization of content item information between client device 150 and server file journal 148, translation service 1904 can translate operations from client device 150 into revisions suitable for server file journal 148, and can translate revisions reflected in rows of data on server file journal 148 to operations suitable for client device 150.

In some cases, authorization service 132 can generate a token that verifies or indicates that client device 150 is authorized to access, update, download, or upload a requested content item. The token can include a device identifier associated with client device 150, an account identifier associated with a user account authenticated or authorized at client device 150, a session identifier associated with an authorized session at client device 150, a view context, and access permissions to identified collections. The token can be included in a cryptographically signed data object called a cursor, which will be described in greater detail below. Content management system 110 and/or authorization service 132 can send the token(s) to client device 150, and client device 150 can provide the token to content management system 110 when requesting content item revisions and/or updates to server file journal 148 as further described below. Client device 150 can also provide the token to content storage interface 1906 to validate any content requests (e.g., downloads, uploads, etc.). Content storage interface 1906 can use the token to authorize queries to storage index 1910 and upload or download content items to or from content storage 142.

For example, client device 150 can send to content storage interface 1906 a request to upload a content item to content storage 142. The request can include the token and the content item to be uploaded. Content storage interface 1906 can use the token to authorize a query to storage index 1910 to check if the content item already exists on content storage 142, and authorize the upload of the content item to content storage 142. Client device 150 can also provide the token to file journal interface 1902 to authorize a request to store metadata on server file journal 148 to track the upload and revision of the content item.

FIG. 19B illustrates an example block storage and synchronization configuration. In this example, content storage 142 can store blocks of data, which can be opaque chunks of content items (e.g., files) up to a particular size (e.g., 4 MB). Content items can be split into blocks and the blocks can be stored at content storage 142 for access. Storage index 1910 can track blocks stored at content storage 142, as well as the respective locations of the blocks stored at content storage 142. File journal interface 1902 can interact with server file journal 148 to track revisions to the content items and/or blocks stored at content storage 142.

For example, content item 1920 (e.g., MyFile.abc) can be split into blocks 1920A, 1920B, 1920C, 1920N. Content storage interface 1906 can receive blocks 1920A, 1920B, 1920C, 1920N and send block data 1922B to content storage 142 for storage at content storage 142. Block data 1922B can include blocks 1920A, 1920B, 1920C, 1920N associated with content item 1920.

Blocks 1920A, 1920B, 1920C, 1920N can be stored on one or more storage devices or volumes at content storage 142 and/or aggregated within one or more logical storage containers (e.g., buckets) or data clusters. In some cases, blocks 1920A, 1920B, 1920C, 1920N can be stored together on a same location (e.g., storage device, volume, container, and/or cluster). In other cases, some or all of blocks 1920A, 1920B, 1920C, 1920N can be stored on two or more different locations (e.g., two or more different storage devices, volumes, containers, and/or clusters).

Content storage interface 1906 can also store block metadata 1922A at storage index 1910. Block metadata 1922A can identify blocks 1920A, 1920B, 1920C, 1920N, and allow storage index 1910 to track blocks 1920A, 1920B, 1920C, 1920N at content storage 142. Block metadata 1922A can include an identifier for each block 1920A, 1920B, 1920C, 1920N. The identifier for a block can be a name or key, such as a hash of the block, which identifies the block.

Block metadata 1922A can also include location information for blocks 1920A, 1920B, 1920C, 1920N, which indicates the respective storage location of blocks 1920A, 1920B, 1920C, 1920N. The location information of a block can identify the storage device or volume where the block is stored and/or a logical storage container or data cluster where the block is contained. The location information can be used to access or retrieve the associated block.

Content storage interface 1906 can store block metadata 1922A at storage index 1910 before or after storing blocks 1920A, 1920B, 1920C, 1920N at content storage 142. For example, content storage interface 1906 can store blocks 1920A, 1920B, 1920C, 1920N at content storage 142 and subsequently store block metadata 1922A at storage index 1910 to indicate that blocks 1920A, 1920B, 1920C, 1920N have been stored at content storage 142.

In some cases, content storage interface 1906 can query storage index 1910 prior to storing blocks 1920A, 1920B, 1920C, 1920N at content storage 142, to determine if (or where) blocks 1920A, 1920B, 1920C, 1920N are stored at content storage 142. For example, content storage interface 1906 can query storage index 1910 based on block metadata 1922A to check if blocks 1920A, 1920B, 1920C, 1920N are stored at content storage 142. Storage index 1910 can compare block identifiers in block metadata 1922A with block identifiers at storage index 1910 to check for any matches. A match between block identifiers indicates that an associated block is stored at content storage 142.

As previously mentioned, server file journal 148 tracks content item revisions, including content item adds, edits, moves or renames, deletes, etc. Accordingly, file journal interface 1902 can store revision 1922C at server file journal 148 to indicate that content item 1920 and/or blocks 1920A, 1920B, 1920C, 1920N were added to content storage 142. Revision 1922C can represent a revision of content item 1920 within a journal of content item revisions at server file journal 148.

Revision 1922C can identify content item 1920 and an operation associated with content item 1920, such as an add operation (e.g., upload), edit operation, move or rename operation, delete operation, etc. Revision 1922C can also identify a namespace in content management system 110 where content item 1920 is stored, and a row in a journal of content item revisions at server file journal 148 for storing revision 1922C. The row within the journal of content item revisions can represent a revision number associated with revision 1922C for content item 1920.

File Journal Interface

Figure 19C:
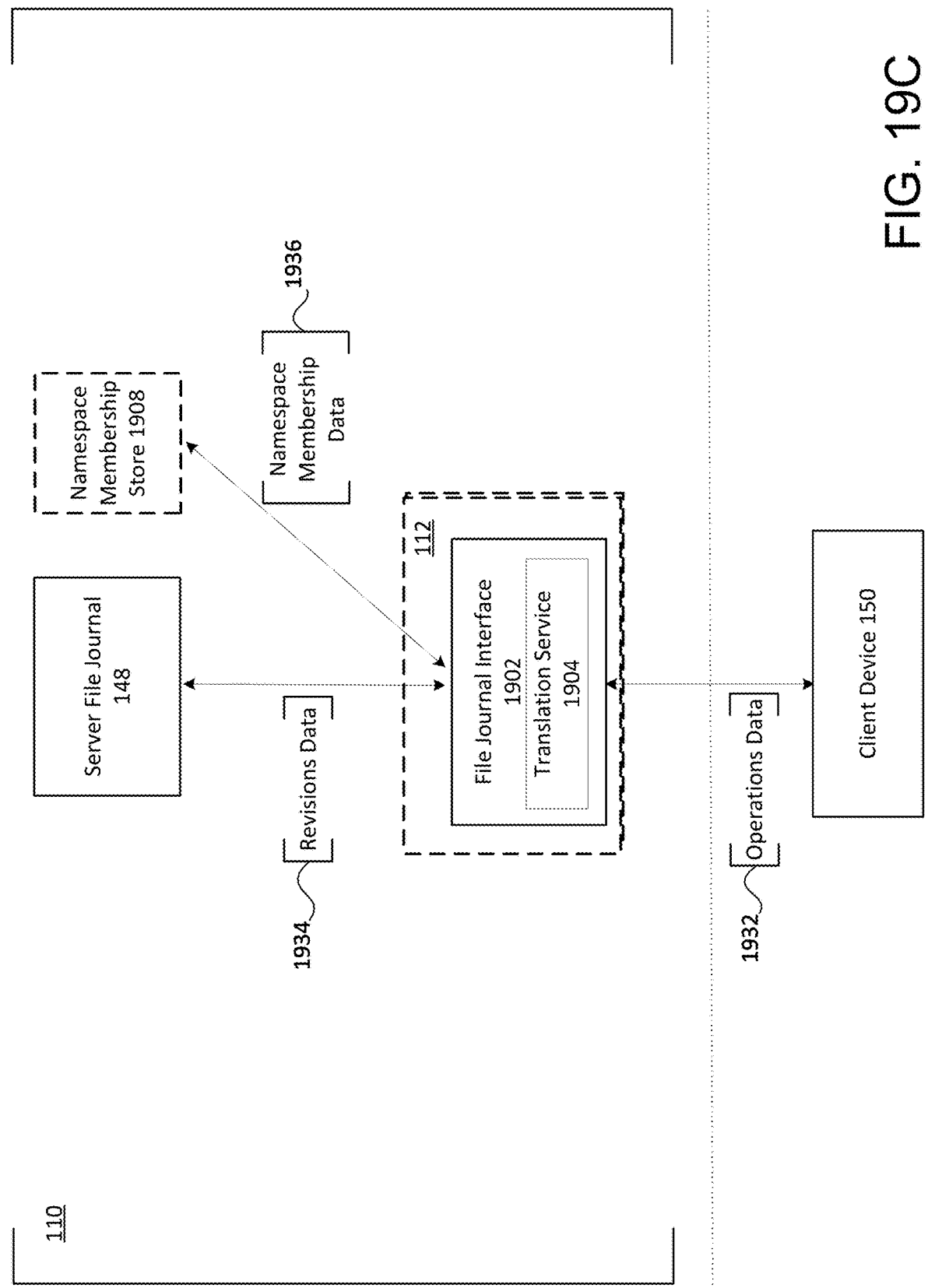
FIG. 19C shows a diagram of example communications processed by a file journal interface between a client device and a server file journal on a content management system, in accordance with various embodiments of the subject technology.

FIG. 19C illustrates a diagram of communications processed by file journal interface 1902 between client device 150 and server file journal 148. Server file journal 148 tracks content item state and changes (e.g., revisions) as values in rows and fields in server file journal 148. For example, server file journal 148 can maintain one or more journals of revisions to content items in content storage 142. The one or more journals can track revisions of each content item on each namespace. A row of values in a journal on server file journal 148 can identify a content item in a namespace and reflects a state of the content item in the namespace. A subsequent row in the journal corresponding to the same content item in the namespace can reflect a subsequent revision to the content item in the namespace. Thus, rows in server file journal 148 associated with a content item can identify the current state of the content item and any revisions to the content item from creation to the current state.

To synchronize content item information (e.g., state, changes or revisions, etc.) with client device 150, server file journal 148 can send or receive revisions data 1934 to or from file journal interface 1902, which represent revisions tracked or stored in server file journal 148 for one or more content items. Revisions data 1934 can include, for example, a log of content item revisions corresponding to rows in server file journal 148. Server file journal 148 can send revisions data 1934 to file journal interface 1904, which can translate revisions data 1934 into operations data 1932 for client device 150, as further described below.

Client device 150 can perform content operations to update or modify content items at client device 150. To synchronize content item information with server file journal 148, client device 150 can send or receive operations data 1932 to or from file journal interface 1902. Client device 150 can send operations data 1932 to file journal interface 1902 to report changes at client device 150 to content items, and receive operations data 1932 from file journal interface 1902 to obtain the latest state of content items from server file journal 148 (e.g., revisions data 1934).

For example, client device 150 can edit content item A at client device 150 and report to file journal interface 1902 an edit operation indicating the edit to content item A. The edit operation can be included in operations data 1932 communicated with file journal interface 1902 to indicate the revision to content item A. File journal interface 1902 can receive operations data 1932 including the edit operation and generate a revision for storage at server file journal 148, tracking the edit to content item A. File journal interface 1902 can include the revision associated with the edit operation in revisions data 1934 to server file journal 148, in order to update server file journal 148 to store the revision representing the edited state of content item A.

As further described below, operations data 1932 can include a cursor, which identifies the latest state or revision obtained by client device 150 for each namespace associated with client device 150. For example, the cursor can identify the latest revision in server file journal 148 obtained by client device 150 for each namespace associated with client device 150. The information in the cursor allows file journal interface 1902 to determine whether an operation in operations data 1932 from client device 150 reflects the latest state or revisions in server file journal 148 for the namespace(s) associated with the operation. This can help file journal interface 1902 ensure that operations in operations data 1932 from client device 150 that correspond to older revisions in server file journal 148 are not written to server file journal 148, which can create a conflict between existing revisions in server file journal 148 and revisions translated from operations data 1932.

To enable synchronization of content item information between client device 150 and server file journal 148, file journal interface 1902 can translate (e.g., via translation service 1904) operations data 1932 to revisions data 1934, and vice versa. When receiving operations data 1932 from client device 150, file journal interface 1902 can convert operations data 1932 to revisions data 1934, which includes content item revisions interpreted from operations in operations data 1932. When receiving revisions data 1934 from server file journal 148, file journal interface 1902 can convert revisions data 1934 to operations data 1932, which include operations for implementing revisions in revisions data 1934 at client device 150. Revisions data 1934 includes data in server file journal 148 describing what happened to one or more content items (i.e., revisions to the one or more content items), and operations data 1932 includes operations that have been executed or should be executed at client device 150 to modify the one or more content items. Thus, file journal interface 1902 can translate data describing revisions to one or more content items from server file journal 148 (e.g., operations data 1934) to operations that have or should be executed at client device 150 to modify the one or more content items at client device 150.

As previously noted, in addition to translating operations data 1932 from client device 150 to revisions data 1934 for server file journal 148, file journal interface 1902 can convert revisions data 1934 from server file journal 148 to operations data 1932 for client device 150. File journal interface 1902 can obtain revisions data 1934 from server file journal 148 and translate revisions in revisions data 1934 to operations for execution at client device 150 to revise one or more content items at client device 150 according to such revisions. The operations generated from the revisions in revisions data 1934 are included in operations data 1932 provided by file journal interface 1902 to client device 150. This translation between operations data 1932 and revisions data 1934 allows client device 150 and server file journal 148 to synchronize content item information with each other as necessary.

Prior to writing to server file journal 148 any revision data 1934 generated from operations data 1932 provided by client device 150, file journal interface 1902 can check a cursor in operations data 1932 and/or query server file journal 148 to ensure any revisions in revisions data 1934 do not create a conflict in server file journal 148. For example, file journal interface 1902 can query server file journal 148 to check whether the version of a content item associated with a revision in revisions data 1934 is the same version of the content item at server file journal 148, or whether the version of the content item at server file journal 148 is an updated or different version as the content item to which the revision in revisions data 1934 pertains. If server file journal 148 shows that the latest version of the content item is a different version than the version to which revision data 1934 pertains, the two versions are in conflict.

File journal interface 1902 can update server file journal 148 to store new revisions included in revisions data 1934 derived from operations data 1932. When querying and/or updating revisions in server file journal 148, file journal interface 1902 can query namespace membership store 1908 to retrieve namespace ownership information associated with any namespaces affected by the revisions in revisions data 1934. The namespace ownership information can indicate which user account(s) own or are members of a particular namespace, and thus are able to access the particular namespace. Thus, file journal interface 1902 can analyze the namespace ownership information to ensure server file journal 148 is not updated to include a revision to a namespace from a user account that is not a member of the namespace.

Figure 19D:
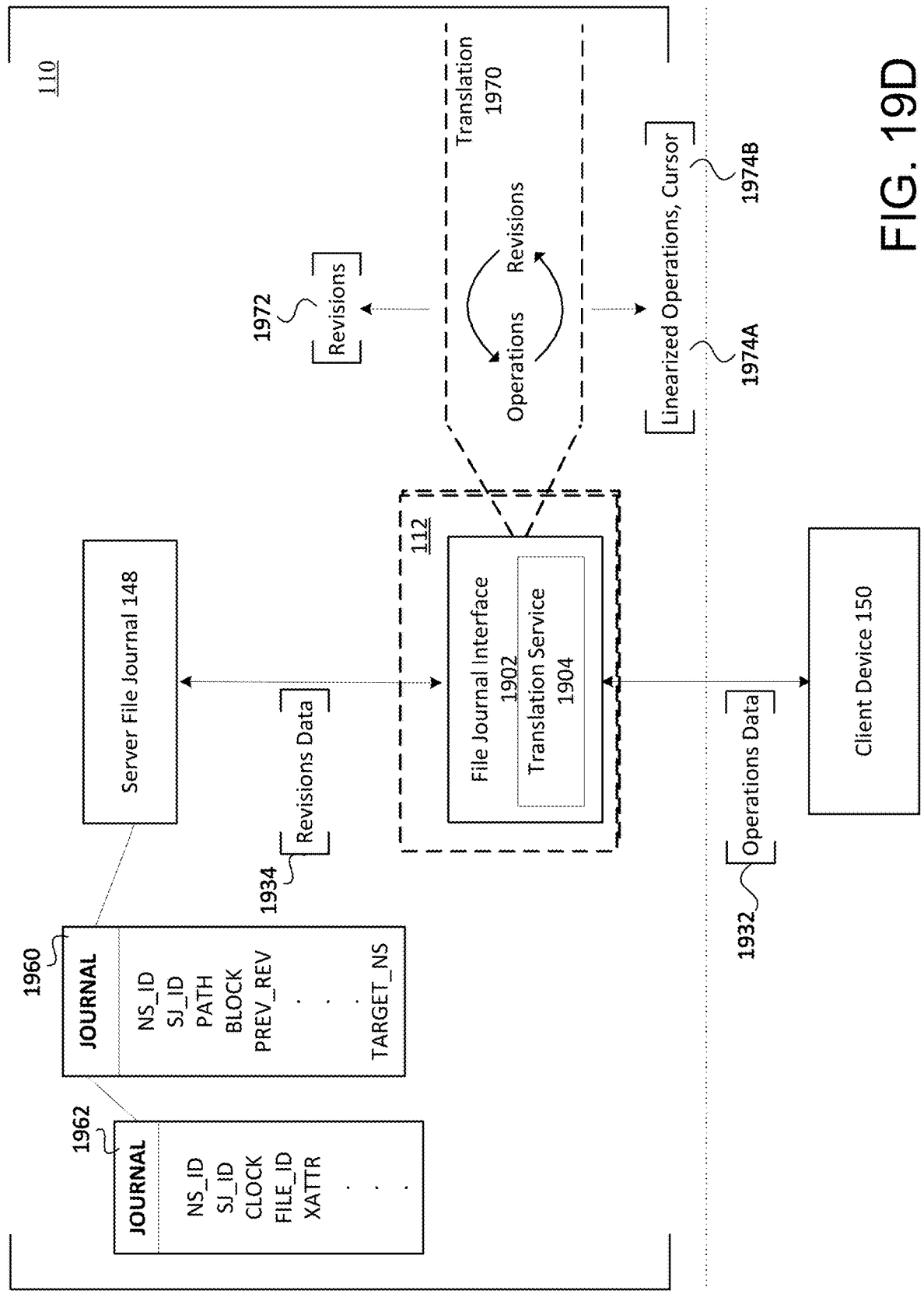
FIG. 19D shows a diagram of an example process for translating communications between a client device and a server file journal on a content management system, in accordance with various embodiments of the subject technology.

With reference to FIG. 19D, server file journal 148 can store journals 1960, 1962 to track and identify content item revisions and state. In this example, journal 1960 includes records containing a namespace identifier (NS_ID), server journal identifier (SJ_ID), path, block, previous revision (Prev_Rev), and target namespace (Target_NS). NS_ID can include one or more values for uniquely identifying a namespace in server file journal 148. SJ_ID can include monotonically increasing values which map to a row in a given journal for the namespace and provide an ordering of operations or revisions within that namespace. The path can be a namespace-relative path that identifies an associated content item. Prev_Rev identifies the SJ_ID of the row which corresponds to the previous state of the content item associated with the path. Target_NS identifies the NS_ID of the target namespace for a mount point of a mounted namespace. The Target_NS field is not set for rows (e.g., revisions) which do not correspond to mount points.

Journal 1962 includes records containing an NS_ID, SJ_ID, clock (e.g., timestamp), file identifier (File_ID), extended attribute(s) (xattr), etc. The xattr can store metadata associated with content items or operations.

In some cases, journal 1960 can include other fields such as a size field, which represents the size of an associated content item; a directory field (e.g., Is Dir), which can be set to indicate when a content item is a directory; a file identifier, which uniquely identifies the associated file; a clock or timestamp field; etc.

File journal interface 1902 can perform translation 1970 based on operations data 1932 and revisions data 1934 as previously mentioned. When performing translation 1970, translation service 1904 can transform operations data 1932 into revisions 1972, which include linearized revisions for storage at server file journal 148. Translation service 1904 can also transform revisions data 1934 into linearized operations 1974A, included in operations data 1932 sent to client device 150, which can be applied by client device 150 to update content item information (e.g., state, changes, etc.) at client device 150. Translation service 1904 can also generate or update cursor 1974B and provide cursor 1974B in operations data 1932 to client device 150. Cursor 1974B identifies a respective revision or row in server file journal 148 corresponding to each namespace and/or content item associated with linearized operations 1974B.

For example, cursor 1974B can identify a namespace (e.g., NS_ID) and row in server file journal 148 for that namespace (e.g., SJ_ID), which indicate the latest revision in server file journal 148 for that namespace. The namespace and row in cursor 1974B can be associated with an operation in linearized operations 1974A. Cursor 1974B can identify a specific position on a log of revisions in server file journal 148 for the particular namespace, indicating the revision or state of the namespace in server file journal 148 after and/or before linearized operations 1974A are applied at client device 150. Thus, cursor 1974B can indicate the state of a namespace and/or content item in server file journal 148 before or after linearized operations 1974A, which can help avoid revision conflicts and track the order of revisions before and after linearized operations 1974A are applied.

Figure 20A:
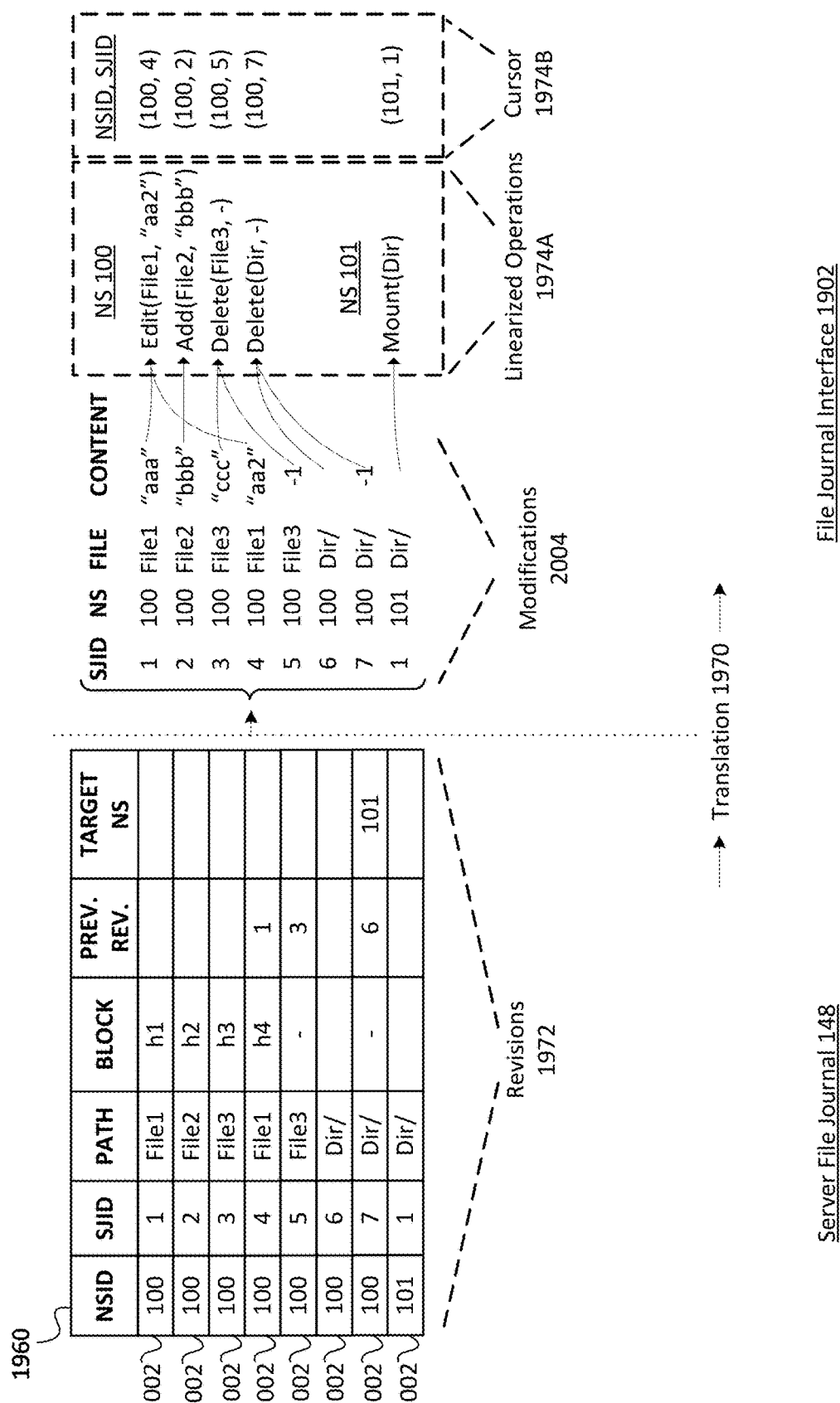
FIG. 20A shows a diagram of an example translation and linearization process for translating server file journal data to linearized operations, in accordance with various embodiments of the subject technology.

FIG. 20A illustrates a diagram of an example translation and linearization process for translating server file journal data to linearized operations. In this example, journal 1960 in server file journal 148 includes rows 2002 with revisions 1972 tracked by server file journal 148. Revisions 1972 in journal 1960 are associated with namespaces 100 and 101 (i.e., NS_IDs 100 and 101). In some cases, server file journal 148 can store namespace-specific journals that track revisions specific to respective namespaces. The rows (e.g., 2002) in a namespace-specific journal include data specific to that namespace, and each row reflects a revision specific to that namespace.

Each row (2002) in journal 1960 includes a namespace identifier field (NS_ID) for uniquely identifying a namespace associated with that row, a server journal identifier field (SJ_ID) that includes monotonically increasing values which map to a row in a given namespace and provides an ordering of operations or revisions within that namespace. Journal 1960 also includes a path field (Path) for identifying a namespace-relative path of a content item, a block field (Block) for identifying a block or blocklist associated with the content item, a previous revision field (Prev_Rev) for identifying the row (i.e., SJ_ID) in journal 1960 that represents the previous state or revision of the content item, and a target namespace field (Target_NS) for identifying a target namespace for a mount point of a mounted namespace (if the row corresponds to a mount). There is no data for the Target_NS field for rows (e.g., revisions) which do not correspond to mount points.

The first of rows 2002 in journal 1960 identifies the first revision (SJ_ID 1) for "File1" (Path field value File1) in namespace "100" (NS_ID 100), which corresponds to block "h1" and has no previous revisions (Prev_Rev) or target namespaces (Target_NS). Since the row does not include a previous revision or a target namespace, the revision represented by the row corresponds to an addition at namespace "100" of "File1" associated with block "h1". The row in journal 1960 containing SJ_ID "4" represents the last revision in journal 1960 for "File1" on namespace "100", since this row is the last row or SJ_ID in journal 1960 corresponding to "File1" on namespace "100". This row containing SJ_ID "4" indicates that "File1" on namespace "100" was edited after being added in SJ_ID "1", and the edit corresponds to block "h4".

Modifications 2004 depict an example of modifications representing revisions 1972. In this example, each of modifications 2004 illustrates a content revision from a corresponding row (2002) in journal 1960. Each modification corresponds to an SJID and NSID in journal 1960, and a file associated with the corresponding SJID and NSID in journal 1960. In this example, the content associated with modifications 2004 represents example content values of the blocks (e.g., "h1", "h2", "h3", "h4") in journal 1960. The content values in modifications 2004 are provided for illustration purposes to depict example modifications to content associated with each revision.

For example, the first modification in modifications 2004 represents SJID "1" and NSID "100" in journal 1960, and depicts "File1" in namespace "100" being added. Content "aaa" represents a value of "h1" for "File1" at SJID "1" of NSID "100". Modifications 2004 also depict an edit of "File1" in namespace "100" representing SJID "4" and NSID "100" in journal 1960, which illustrates the content "aaa" (e.g., "h1") associated with "File1" in namespace "100" being modified to "aa2" (e.g., "h4").

In translation 1970, revisions 1972 from rows 2002 in journal 1960 are converted to linearized operations 1974A. Linearized operations 1974A are generated from revisions 1972 in journal 1960 and represent modifications 2004 after linearization. As illustrated by linearized operations 1974A, an operation in linearized operations 1974A can be based on multiple revisions (1972) and/or modifications (2004), or a single revision (1972) and/or modification (2004).

For example, modifications 2004 depict a revision adding "File1" to namespace "100", which corresponds to SJID "1" and NSID "100" in journal 1960, and a revision editing "File1" in namespace "100", which corresponds to SJID "4" and NSID "100" in journal 1960. The add revision can be inferred from the content value "aaa" (e.g., "h1") associated with "File1" and NSID "100" and the lack of any previous revisions for "File1" and NSID "100". In other words, the content "aaa" indicates that content (e.g., "h1") was either added or edited, and the lack of a previous revision for "File1" and NSID "100" suggests that the content "aaa" represents content (e.g., "h1") being added as opposed to edited. The edit revision can be inferred from the content value "aa2" (e.g., "h4") associated with "File1" and NSID "100" and the previous revision (SJID "1" and NSID "100") associated with "File1" and NSID "100". In other words, the change from content "aaa" to "aa2" associated with "File1" and NSID "100" suggests that the content "aa2" represents an edit.

In linearized operations 1974A, the add and edit modifications (2004) corresponding to SJID "1" and SJID "4" for NSID "100" can be converted into a single linearized operation (Edit operation) that edits the content value associated with "File1" from "aaa" (e.g., "h1") to "aa2" (e.g., "h4"). The single linearized operation editing content (e.g., "h1") of "File1" to "aa2" (e.g., "h4") reflects the modification adding "File1" associated with content "aaa" (e.g., "h1") to namespace "100", as well as the modification editing content "aaa" (e.g., "h1") associated with "File1" in namespace "100" to "aa2" (e.g., "h4"). Accordingly, this linearized operation is based on two modifications 2004 and two corresponding revisions in revisions 1972.

The modification in modifications 2004 corresponding to SJID "2" and NSID "100" in journal 1960 represents a revision adding "File2" associated with content "bbb" (e.g., "h2") to namespace "100". This modification represents the only revision 1972 from journal 1960 corresponding to "File2" on namespace "100". Accordingly, linearized operations 1974A include a single operation for "File2" on namespace "100", which adds "File2" associated with content "bbb" (e.g., "h2") to namespace "100" and is based on a single modification 2004 (add of "File2" on namespace "100") and revision 1972.

Modifications 2004 in this example also include a modification adding "File3" associated with content "ccc" (e.g., "h3") to namespace "100", which corresponds to SJID "3" and NSID "100" in journal 1960, and a delete (represented as "−1") of "File3" from namespace "100", which corresponds to SJID "5" and NSID "100" in journal 1960. Thus, revisions 1972 include two modifications 2004 associated with "File3" on namespace "100". Since the last revision in journal 1960 associated with "File3" and namespace "100" corresponds to the delete modification representing SJID "5" and NSID "100" in journal 1960, the add and delete modifications 2004 associated with "File3" and namespace "100" from revisions 1972 can be linearized to a single operation deleting "File3" from namespace "100". Accordingly, linearized operations 1974A include a single operation for "File3" and namespace "100", which is the single operation deleting "File3" from namespace "100".

SJIDs "6" and "7" for NSID "100" and SJID "1" for NSID "101" in journal 1960 represent "Dir" being added to namespace "100" and later moved from namespace "100" to namespace "101". For example, SJID "6" and NSID "100" identifies "Dir" and namespace "100" and does not include a previous revision, which indicates "Dir" was added to namespace "100" at SJID "6". SJID "7" identifies "Dir" being moved from namespace "100" to namespace "101", as reflected by the block field ("-"), the previous revision field (SJID "6"), and the target namespace field ("101"). SJID "1" for NSID "101" then identifies "Dir" being added to namespace "101", as indicated by the lack of prior rows or revisions for "Dir" and namespace "101". The add and move revisions in SJIDs "6" and "7" in NSID "100" and SJID "1" in NSID "8" are depicted by three modifications 2004: an add of "Dir" to namespace "100," which corresponds to SJID "6" and NSID "100"; a delete of "Dir" from namespace "100," which corresponds to SJID "7" and NSID "100"; and an add of "Dir" to namespace "101," which corresponds to SJID "1" and NSID "101".

The add and delete modifications 2004 of "Dir" and namespace "100", which respectively correspond to SJIDs "6" and "7" of NSID "100" in journal 1960, are linearized to a single operation deleting "Dir" from namespace "100, since the last revision in journal 1960 corresponding to "Dir" and namespace "100" is a delete of "Dir" from namespace "100" at SJID "7" and NSID "100". The add of "Dir" to namespace "101", which corresponds to SJID "1" and NSID "101" in journal 1960, is the only modification 2004 and revision 1972 corresponding to "Dir" and namespace "101". Accordingly, the add is provided in linearized operations 1974A as a single mount operation for "Dir" and namespace "101". Therefore, the three modifications 2004 from revisions 1972 corresponding to SJIDs "6" and "7" in NSID "100" and SJID "1" in NSID "101" (i.e., the add and delete of "Dir" on namespace "100", and the add of "Dir" on namespace "101"), are linearized to two operations in linearized operations 1974A: a delete operation for "Dir" in namespace "100" and a mount operation for "Dir" in namespace "101".

As illustrated above, linearized operations 1974A include an edit operation for "File1" and namespace "100", an add operation for "File2" and namespace "100", a delete operation of "File3" in namespace "100", a delete operation for "Dir" in namespace "100", and a mount operation for adding "Dir" to namespace "101". These operations in linearized operations 1974A are generated from revisions 1972 and reflect the latest state of each content item in journal 1960. File journal interface 1902 can generate linearized operations 1974A and send linearized operations 1974A to client device 150 to ensure client device 150 contains the latest state from revisions 1972 in journal 1960.

When providing linearized operations 1974A to client device 150, file journal interface 1902 can include cursor 1974B along with linearized operations 1974A to client device 150. Cursor 1974B can identify the last revision (SJID) for each namespace (NSID) in journal 1960. In some embodiments, cursor 1974B can also include an FSAuth token including the user ID, and the last observed access permissions to the NS_ID provided in the cursor. The last revision for each namespace can indicate a position in journal 1960 corresponding to the latest revisions sent to client device 150 for each namespace.

In some cases, cursor 1974B can also map each operation in linearized operations 1974A to a namespace (NSID) and row (SJID) in journal 1960. The namespace and row associated with an operation can indicate the position in journal 1960 corresponding to the operation. In other words, the namespace and row associated with an operation can indicate the revision number in journal 1960 represented by that operation. The namespaces and rows in cursor 1974B correspond to the latest state in journal 1960 for each namespace and content item associated with linearized operations 1974A. Cursor 1974B can be provided to client device 150 as a tool for client device 150 to identify to file journal interface 1902 the latest state or revisions obtained by client device 150 for one or more namespaces and/or content items when attempting to apply changes (e.g., via operations data 1932) from client device 150 to the one or more namespaces and/or content items. When file journal interface 1902 receives cursor 1974B from client device 150, it can use cursor 1974B to identify the position of client device 150 at journal 1960 (e.g., the latest revisions from journal 1960 obtained by client device 150) and detect or avoid conflicts caused by operations from client device 150.

For example, if file journal interface 1902 receives an operation from client device 150 modifying "File1" in namespace "100", file journal interface 1902 can use cursor 1974B, which it receives from client device 150 along with the operation, to check whether journal 1960 has any newer revisions for "File1" in namespace "100" than the revision identified in cursor 1974B from client device 150. If the revision in cursor 1974B is the most current revision in journal 1960, file journal interface 1902 can commit the edit operation as a new revision in journal 1960 (e.g., SJID "8" in NSID "100") for "File1" in namespace "100".

Alternatively, if the revision in cursor 1974B is not the most current revision in journal 1960 for "File1" in namespace "100", file journal interface 1902 can determine that the edit operation from client device 150 is not based on the most current version in journal 1960 for "File1" in namespace "100". For example, if cursor 1974B identifies SJID "4" and NSID "100" in journal 1960 and file journal interface 1902 determines that journal 1960 includes a revision at SJID "12" and NSID "100" for "File1" in namespace "100", file journal interface 1902 can determine that the edit operation from client device 150 pertains to an older version of "File1" on namespace "100" (e.g., SJID "4" and NSID "100"), and the edit operation can create a conflict as it edits a file that has since been modified. File journal interface 1902 can detect this conflict created by the edit operation and reject the edit operation, attempt to reconcile the conflict, or provide the latest revisions to client device 150 and allow client device 150 to reconcile the conflict.

Each time file journal interface 1902 sends linearized operations to client device 150, it can include a cursor as described here which identifies a respective position in journal 1960 for each namespace and/or content item. Similarly, any time client device 150 sends an operation to file journal interface 1902, it can include its latest cursor, which file journal interface 1902 can use to map the state at client device 150 with the state at journal 1960.

Journal 1960 in this example depicts a journal with multiple namespaces. As previously noted, in some examples, server file journal 148 can maintain namespace-specific journals. Cursor 1974B may include an SJID and NSID for each namespace, to indicate the latest revision for each namespace. Based on cursor 1974B, file journal interface 200 can query multiple journals, in embodiments where multiple journals are maintained, and/or retrieve revisions from multiple journals, as further explained herein.

Figure 20B:
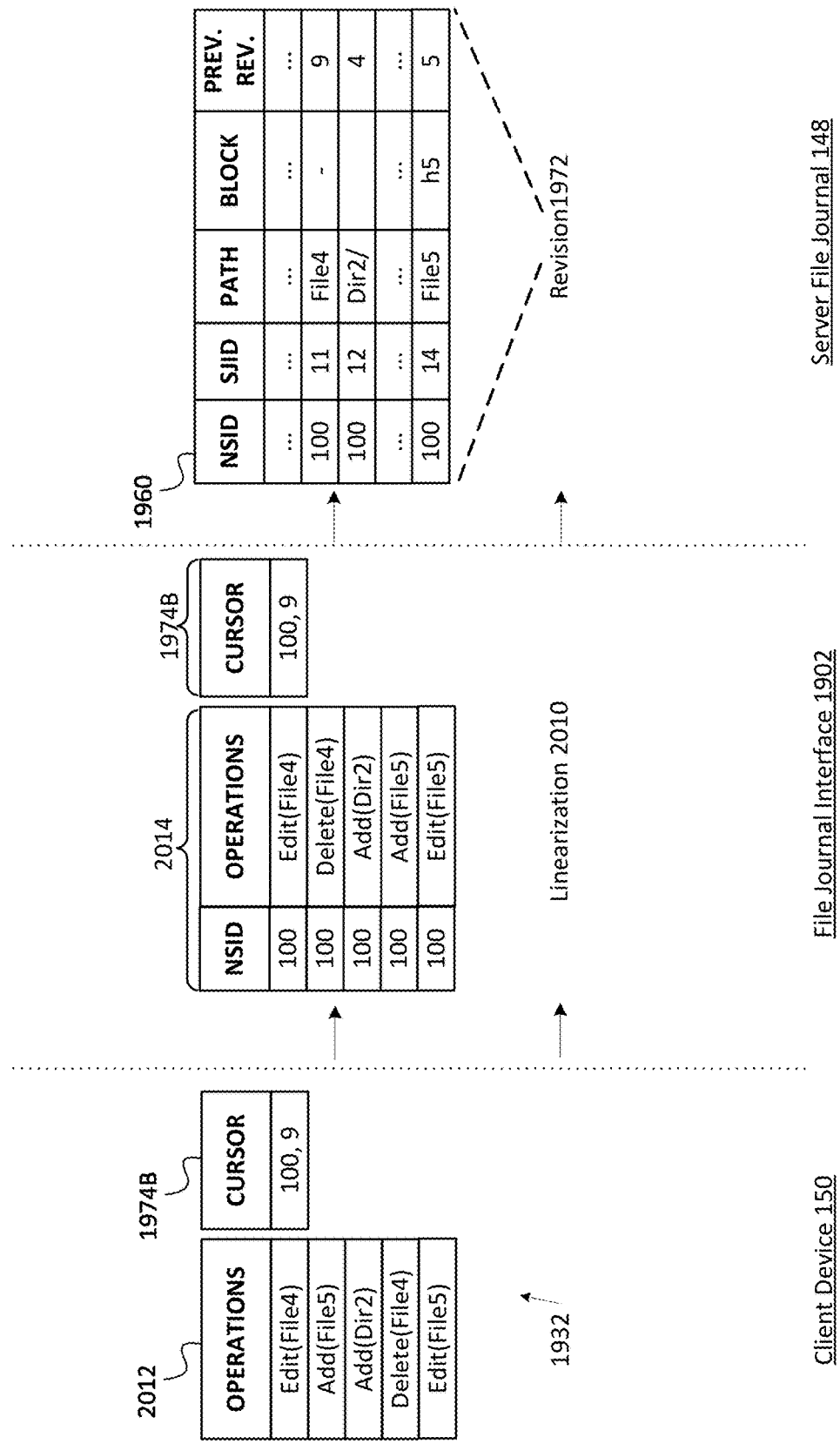
FIG. 20B shows a diagram of an example translation and linearization process for translating operations from a client device to revisions for a server file journal, in accordance with various embodiments of the subject technology.

FIG. 20B illustrates a diagram of an example process for linearization 2010 to convert operations data 1932 from client device 150 to revisions 1972 for journal 1960 at server file journal 148. Client device 150 can provide operations data 1932 to file journal interface 1902. Operations data 1932 in this example includes operations 2012 at client device 150, such as content item edit, add, rename, move, mount, or delete operations. In some cases, operations 2012 can include multiple operations to a same content item. For example, operations 2012 can include an operation editing "File4" on namespace "100" and an operation deleting "File4" from namespace "100".

Operations data 1932 also includes cursor 1974B previously received by client device 150 from file journal interface 1902. Cursor 1974B can identify the state (e.g., NSID and SJID) or latest revisions in journal 1960 for one or more namespaces and/or content items. Client device 150 can provide cursor 1974B to file journal interface 1902 as a reference point for operations 2012. In this example, cursor 1974B provides the latest state for namespace "100", which is represented by SJID "9".

In some cases, the cursor is cryptographically signed by content management system 110, which allows file journal interface 1902 to determine that the cursor has not been tampered with. Further, since client device 150 commits revisions to server file journal 148 when it has received the most recent revisions from server file journal 148 for the namespace, file journal interface 1902 can accept that the last observed access permissions to the NS_ID are still valid, and therefore client device 150 has access to the namespace.

File journal interface 1902 can receive operations 2012 and cursor 1974B and perform linearization 2010, to linearize and transform operations 2012 from client device 150 to revisions 1972 for journal 1960. Based on operations 2012, file journal interface 1902 can generate log 2014 of operations. Log 2014 can include a list of operations from operations 2012 mapped to respective namespace(s) in journal 1960. In some cases, log 2014 can include linearized operations generated from operations 2012 as previously explained.

File journal interface 1902 can use cursor 1974B to verify that operations 2012 reflect the latest state or revisions in journal 1960 before updating journal 1960 to reflect the operations in log 2014. If file journal interface 1902 confirms that cursor 1974B reflects the latest state or revisions in journal 1960 for the namespaces and/or content items associated with log 2014, file journal interface 1902 can add revisions 1972 to journal 1960 based on log 2014. Revisions 1972 can include the latest state or revision of each content item and/or namespace associated with the operations in log 2014.

The operations in log 2014 include an add and edit operation for "File5". Accordingly, revisions 1972 include the edit of "File5", which file journal interface 1902 can write to journal 1960 as the latest state of "File5" (i.e., the state after the add and edit operations are applied to "File5" in a linearized fashion). The operations in log 2014 also include an add operation for "Dir2" as well as edit and delete operations for "File4" on namespace "100". Revisions 1972 can thus include an operation adding "Dir2" to namespace "100" and an operation deleting "File4" from namespace "100" as the latest state of "Dir2" and "File4" respectively.

In FIG. 20B, the revisions (1972) depicted in journal 1960 reflect the latest state of each content item ("File4", "File5", "Dir2") associated with operations 2012. However, it should be noted that, in some cases, file journal interface 1902 can write every revision represented by log 2014 to journal 1960 in order to reflect not only the latest state revision of each namespace and/or content item resulting from log 2014, but also any previous states or revisions leading up to the latest state or revision. For example, file journal interface 1902 can write a revision in journal 1960 for the edit of "File4" and a subsequent revision for the delete of "File4", as opposed to only writing the edit of "File4" reflecting the latest state from operations 2012, to indicate in journal 1960 the full sequence of revisions of "File4" from operations 2012.

File journal interface 1902 can transform operations in log 2014 to revisions 1972 and update journal 1960 to include revisions 1972. File journal interface 1902 can write revisions 1972 to journal 1960 at respective rows in journal 1960. File journal interface 1902 can add revisions 1972 to the next available rows (e.g., SJIDs) in journal 1960. In some cases, file journal interface 1902 can add revisions 1972 based on a relative order which can be determined based on linearization 2010 and/or respective timestamps or clocks.

As shown in FIG. 20B, the delete operation of "File4" in namespace "100" is included in row "11" or SJID "11" for namespace "100". The revision in SJID "11" of journal 1960 indicates that "File4" in namespace "100" has been deleted, as reflected by the minus symbol in the block field, and identifies SJID "9" as the previous revision in journal 1960 for "File4" in namespace "100". The addition of "Dir2" and edit of "File5" are included respectively in rows or SJIDs 12 and 14.

Journal 1960 in FIG. 20B has been updated to include revisions 1972 based on log 2014 and cursor 1974B, to reflect the state of each content item modified in log 2014. The path field at each row in journal 1960 identifies a content item within the associated namespace (e.g., namespace "100"). The path field of a row is based on the file and namespace from a corresponding operation in log 2014. The block field in journal 1960 represents the content item. In some cases, the block field can include a hash of a respective content item or data block. The block field can be empty if the content item has been deleted and/or is a directory, folder, mount, etc.

When updating journal 1960 to include revisions 1972 based on log 2014 and cursor 1974B, translation service 1904 can identify the path of each content item to include in the path field of journal 1960. In some cases, translation service 1904 can translate an identifier of a content item (e.g., File ID) to a path of the content item (e.g., /directory/filename). For example, client device 150 can use identifiers to identify content items (e.g., content items in operations data 1932) without having to track or calculate respective paths for the content items. Journal 1960 may instead use a content item's path to identify the content item. Translation service 1904 can use the identifiers of content items from client device 150 to calculate the paths of the content items for journal 1960, and update journal 1960 using the paths calculated for the content items. Translation service 1904 can also perform a reverse translation to obtain a content item's identifier based on the content item's path, and use the content item's identifier when referencing the content item in communications with client device 150.

For example, translation service 1904 can use the path in journal 1960, NSID in journal 1960, and/or a directory field in journal 1960 (or elsewhere in server file journal 148) to identify a content item and obtain an identifier (e.g., File ID) of that content item. If file journal interface 1902 sends an update or information to client device 150 pertaining to that content item, file journal interface 1902 can provide the identifier of the content item to client device 150, which client device 150 can use to identify the content item with or without the path of the content item.

As previously mentioned, before writing revisions 1972 to journal 1960 from operations 2012, file journal interface 1902 can check if cursor 1974B reflects the latest state or revision in journal 1960 for each namespace and/or content item associated with operations 2012. In some cases, after confirming that cursor 1974B reflects the latest state or revisions in journal 1960, file journal interface 1902 can also perform a second check to ensure that a revision generated from operations 2012 will not conflict with an existing revision in journal 1960. For example, if SJID "5" in namespace "100" at journal 1960 represents a delete operation of "File5", the edit revision 1972 of "File5" depicted in SJID "14" emitted from operations 2012 received by file journal interface 1902 from client device 150 would create a conflict by attempting to edit "File5" even though "File5" was deleted at SJID "5". Thus, file journal interface 1902 can reject the edit operation and revision in this example, and communicate to client device 150 that the edit operation is invalid. File journal interface 1902 can update cursor 1974B and provide the updated cursor to client device 150 to inform client device 150 of the latest state or revision in journal 1960 for "File5" (and any other content item) as necessary.

When new revisions are added to journal 1960 and/or server file journal 148, file journal interface 1902 can send an updated cursor to client device 150 to report the new revisions and synchronize the new revisions with client device 150. Client device 150 can also request an update to the cursor at client device 150. Client device 150 can store a copy of the last cursor received from file journal interface 1902 as a reflection of the state of content items on client device 150 and/or a position of client device 150 in journal 1960 indicating the last revision(s) obtained by client device 150.

Figure 20C:
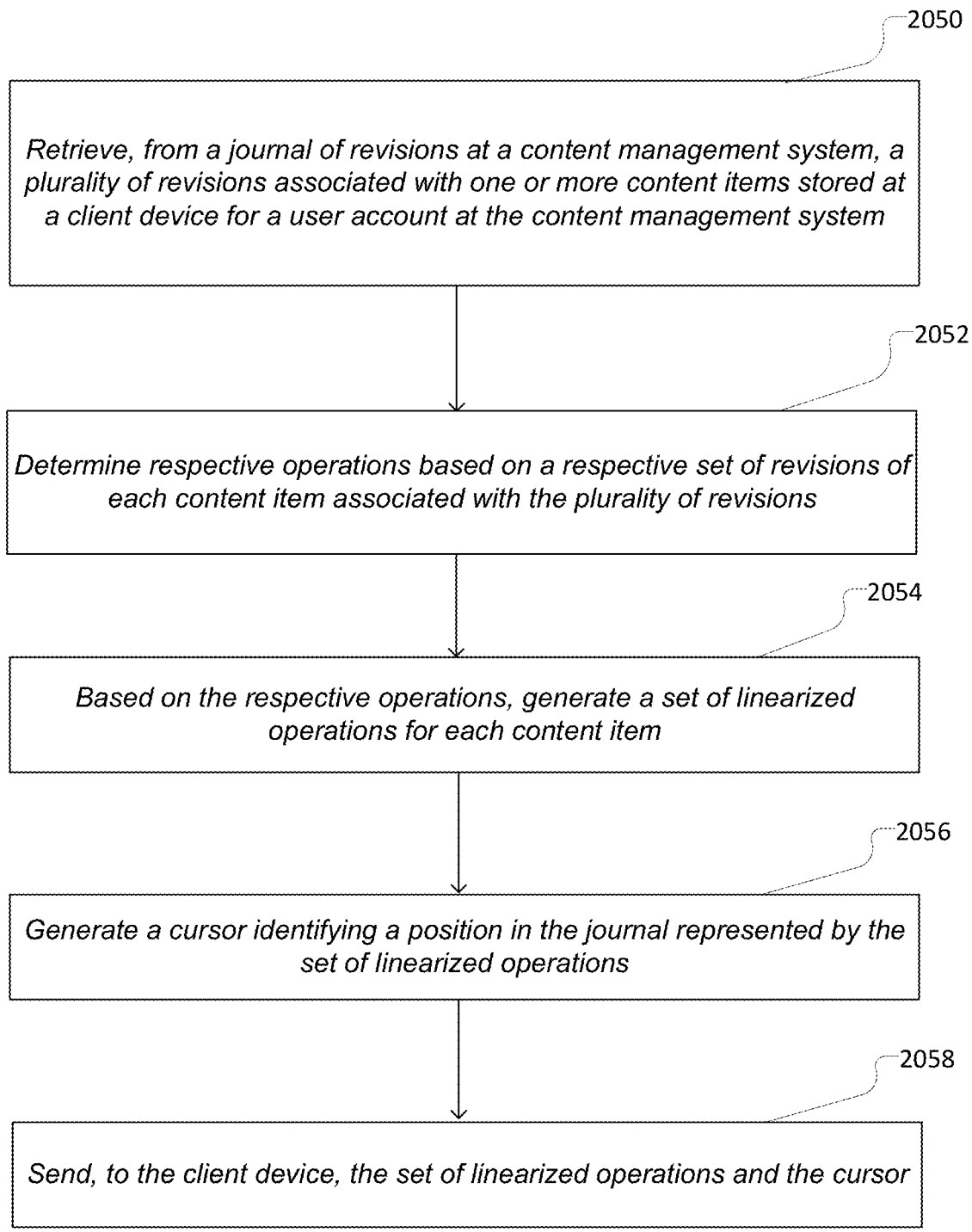
FIG. 20C shows an example method for translating revisions from a server file journal on a content management system to operations for a client device.

FIG. 20C illustrates an example method for converting revisions from server file journal 148 to operations for client device 150. At step 2050, file journal interface 1902 retrieves, from journal 1960 of revisions at server file journal 148, a plurality of revisions (e.g., 1972) associated with one or more content items stored at client device 150 for a user account registered at content management system 110. Each revision can modify a namespace, folder, file, or any content item. Moreover, each revision can be associated with a namespace and a journal identifier (SJID) for that namespace.

In some cases, file journal interface 1902 can retrieve the plurality of revisions from journal 1960 based on a determination that journal 1960 has been updated to include revisions that are not available at client device 150. For example, file journal interface 1902 can track new revisions added to journal 1960 and/or compare revisions at journal 1960 with the cursor at client device 150. In some cases, file journal interface 1902 can query journal 1960 to retrieve the plurality of revisions and/or check revisions available at journal 1960.

At step 2052, file journal interface 1902 determines respective operations based on a respective set of revisions of each content item associated with the plurality of revisions. For example, file journal interface 1902 can linearize any revisions of a content item and translate the revisions to one or more respective operations for that content item. In some cases, file journal interface 1902 can also transform multiple operations for that content item into a single operation defining or reflecting the state or modification of the content item when the multiple operations are executed in linear fashion.

In some cases, when calculating the respective operations for of the plurality of revisions, file journal interface 1902 can make inferences or calculations based on the number of revisions associated with a particular content item and/or the type of content item associated with such revisions. For example, if the plurality of revisions includes a single revision for a content item, file journal interface 1902 can infer from the single revision (e.g., revisions 1972) and/or a block or content associated with the revision (e.g., block or content in rows 2002 of journal 1960) a type of modification (e.g., 2004) of the content item represented by that revision, and calculate the respective operation for that content item based on the type of modification represented by the revision.

To illustrate, as shown in FIG. 4A, modifications 2004 depict a modification for "Dir" at namespace "101" corresponding to SJID "1" and NSID "100". This modification is the only modification (2004) and revision (1972) for namespace "101". Thus, file journal interface 1902 can infer that the modification depicting "Dir" in namespace "101" is and add or mount of "Dir", as it represents the first instance of namespace "101" being modified or revised to include "Dir". Since "Dir" is a directory or folder, as illustrated by the block field in journal 1960, the modification can be an add or mount of the directory or folder. If "Dir" was a namespace, the modification would represent a mount of namespace "Dir" at namespace "101". On the other hand, if "Dir" was a file associated with a particular content or block, which could be determined based on the block field in journal 1960, then the modification for "Dir" would be an add of the file "Dir" to namespace "101". For example, if SJID "1" and NSID "101" instead depicted "File1" associated with "h1", the corresponding modification would be an add of "File1" to namespace "101".

Thus, unless the content or block field associated with a revision (1972) in journal 1960 depicts a deletion (e.g., a minus symbol in the block or content field), the respective operation for a first or only revision of a content item can represent a mount or add operation depending on whether the content item is a namespace or another type of content item. This is based on the assumption that other operations, such as an edit, unmount, or delete operation, would be expected to include a previous revision for mounting or adding the associated content item. If a content item does not have a previous revision associated with it, file journal interface 1902 can infer that a revision associated with the content item is likely not an edit, unmount, or delete operation, but rather an add or mount operation.

In some cases, file journal interface 1902 can calculate an operation for a content item based on multiple revisions (1972) for that content item and associated namespace. For example, file journal interface 1902 may infer a delete, edit, or unmount operation from a revision representing an add or mount of the content item and a subsequent revision representing the delete, edit, or unmount. To illustrate, as shown in FIG. 20A, file journal interface 1902 calculates an edit operation for "File1" in namespace "100" based on multiple modifications (2004) and revisions (1972) corresponding to SJIDs "1" and "4" for namespace "100" in journal 1960. Since SJIDs "1" and "4" include blocks "h1" and "h4", representing content values "aaa" and "aa2" in modifications 2004, file journal interface 1902 can determine that SJID "1" represents an add operation and SJID "4" represents an edit operation, with a resulting state being based on the edit operation at SJID "4".

Based on the respective operations, at step 2054, file journal interface 1902 generates a set of linearized operations (e.g., 1972) for each content item. The set of linearized operations can reflect modifications 2004 of each content item based on the plurality of revisions in journal 1960. File journal interface 1902 can convert the plurality of revisions (1972) to the set of linearized operations (324A) by linearizing the respective operations calculated for each content item based on relative clocks and/or causality.

At step 2056, file journal interface 1902 generates a cursor (e.g., 324B) identifying a position in journal 1960 represented by the set of linearized operations. At step 2058, file journal interface 1902 sends the set of linearized operations and cursor to client device 150. The cursor can include a respective namespace identifier (NSID) and journal identifier (SJID) for each namespace and/or operation. The combination of an NSID and SJID in the cursor can indicate a revision number in journal 1960 for a particular namespace. Client device 150 can use the cursor to identify revisions obtained by client device 150 and a position of client device 150 in journal 1960 corresponding to the revisions that have been obtained by client device 150. Client device 150 can also provide its latest cursor to file journal interface 1902 to report to file journal interface 1902 the current position of client device 150 in journal 1960. For example, client device 150 can provide the cursor to file journal interface 1902 to determine if client device 150 needs new revisions.

Client device 150 can also provide its cursor to file journal interface 1902 when reporting operations at client device 150 to file journal interface 1902. The cursor maps the operations to specific revisions in journal 1960 and/or a position in journal 1960. This allows file journal interface 1902 to determine if the operations from client device 150 are based on the latest revisions to the content items being modified by the operations.

Client device 150 can receive the cursor and set of linearized operations and update the content items at client device 150 based on the operations. This way, client device 150 can synchronize content items between client device 150 and content management system 110. Client device 150 can store the cursor to provide its position in journal 1960 to file journal interface 1902.

Figure 21:
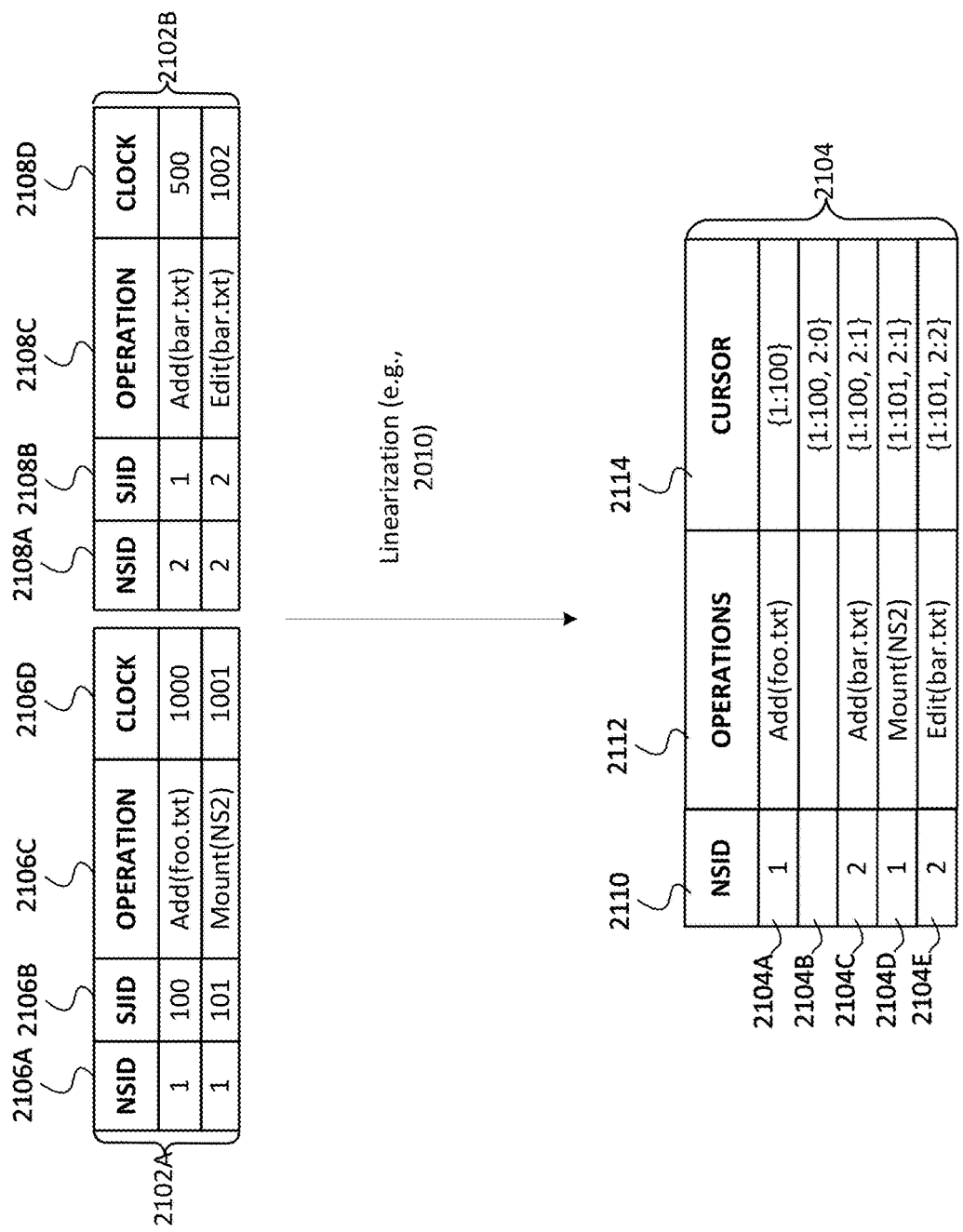
FIG. 21 shows an example linearization of cross-namespace operations, in accordance with various embodiments of the subject technology.

FIG. 21 illustrates a diagram of an example linearization of cross-namespace operations. Cross-namespace linearization and cross-shard or cross-namespace listing can be performed via clock ordering. Tables 2102A, 2102B (collectively "2102") illustrate a batch of cross-namespace operations for linearization. Tables 2102A, 2102B respectively include columns 2106A, 2108A, which are namespace (NSID) fields for identifying a namespace for the records in tables 2102A, 2102B, columns 2106B, 2108B are SJID fields for identifying rows or SJIDs in tables 2102A, 2102B for respective namespaces in columns 2106A, 2108A, columns 2106C, 2108C are operations fields for identifying operations associated with each SJID, and columns 2106D, 2108D are clock fields for identifying a timestamp associated with the operations in columns 2106C, 2108C.

In this example, table 2102A depicts SJIDs "100" and "101" for NSID "1". SJID "100" is associated with an operation adding "foo.txt" to namespace "1" at timestamp "1000", and SJID "101" is associated with an operation mounting namespace "2" at timestamp "1001". Table 2102B depicts SJIDs "1" and "2" for NSID "2". SJID "1" is associated with an operation adding "bar.txt" to namespace "2" at timestamp "2100", and SJID "2" is associated with an operation editing "bar.txt" at timestamp "1002".

A linearizer (e.g., translation service 1904) can obtain the batch of operations in tables 2102A and 2102B (together 2102) and emit a single stream of operations (2112) with a cursor (2114). The linearizer can identify all namespaces having at least one operation in tables 2102 and linearize the operations for all namespaces based on the respective timestamps, NSIDs, SJIDs. In this example, the batch of operations in tables 2102 linearize to the stream of operations shown in table 2104.

Table 2104 includes NSID column 2110 which includes NSID fields for identifying the namespace of each operation, operations column 2112 which includes operation fields for identifying the operations in table 2104, and cursor column 2114 which includes cursor fields for identifying a cursor state for each operation. Row 2104A in table 2104 includes the add operation from SJID "100" of namespace "1" in table 2102A. The cursor state in cursor column 2114 for row 2104A is namespace "1" and SJID "100", which indicates the add operation corresponds to SJID "100" in namespace "1" shown in table 2102A. Row 2104B in table 2104 does not include a value in NSID column 2110 or operations column 2112, but updates the cursor state in cursor column 2114 to include a cross-namespace cursor state, which in this example adds SJID "0" for namespace "2".

Row 2104C in table 2104 includes the add operation from SJID "1" in namespace "2" shown in table 2102A. The cursor state in cursor column 2114 for row 2104C includes the respective SJIDs "100" and "1" for namespaces "1" and "2" associated with the add operation in row 2104C. As shown, the cursor state indicates the cursor is at SJID "100" in namespace "1" and SJID "1" in namespace "2". In other words, the row or SJID in namespace "1" has not increased as the add operation does not affect the state of namespace "1", but the row or SJID in namespace "2" has increased by one as the add operation represents a revision in namespace "2" and affects the state of namespace "2". Thus, the cursor state in row 2104C tracks the respective SJIDs for namespace "1" and namespace "2" after the add operation at SJID "1" in namespace "2".

Row 2104D in table 2104 includes the mount operation at SJID "101" and namespace "1" at table 2102A. The mount operation mounts namespace "2" at namespace "1". The mount operation increases the SJID in namespace "1" from "100" to "101", but does not increase the SJID in namespace "2". Accordingly, the cursor state in cursor column 2114 for row 2104D includes SJID "101" for namespace "1" and remains SJID "1" for namespace "2". This cursor state reflects the state and/or order at namespaces "1" and "2".

Row 2104E in table 2104 includes the edit operation at SJID "2" and namespace "2" in table 2102A, which according to the respective timestamps of the mount and edit operations, is after the mount operation at SJID "101" in namespace "1". The cursor state in cursor column 2114 of row 2104E maintains the cursor state for namespace "1" at SJID "101" but increases the cursor state for namespace "2" to SJID "2".

As illustrated in table 2104, operations 2112 are listed as a stream of operations linearized based on causality and timestamps across namespaces "1" and "2". Once operations 2112 are linearized in table 2104 to reflect cross-namespace causality and sequencing, operations 2112 can be converted to revisions in server file journal 148 (e.g., revisions 1972 in journal 1960) and written to server file journal 148.

For example, a journal for namespace "1" in server file journal 148 can be updated to include a revision at SJID "100" representing the add operation adding "foo.txt" to namespace "1", and a revision at SJID "101" representing the mount operation mounting namespace "2" on namespace "1". Moreover, a journal for namespace "2" in server file journal 148 can be updated to include a revision at SJID "1" representing the add operation adding "bar.txt" to namespace "2", and a revision at SJID "2" representing the edit operation editing "bar.txt" on namespace "2".

Lamport Clocks

Figure 22:
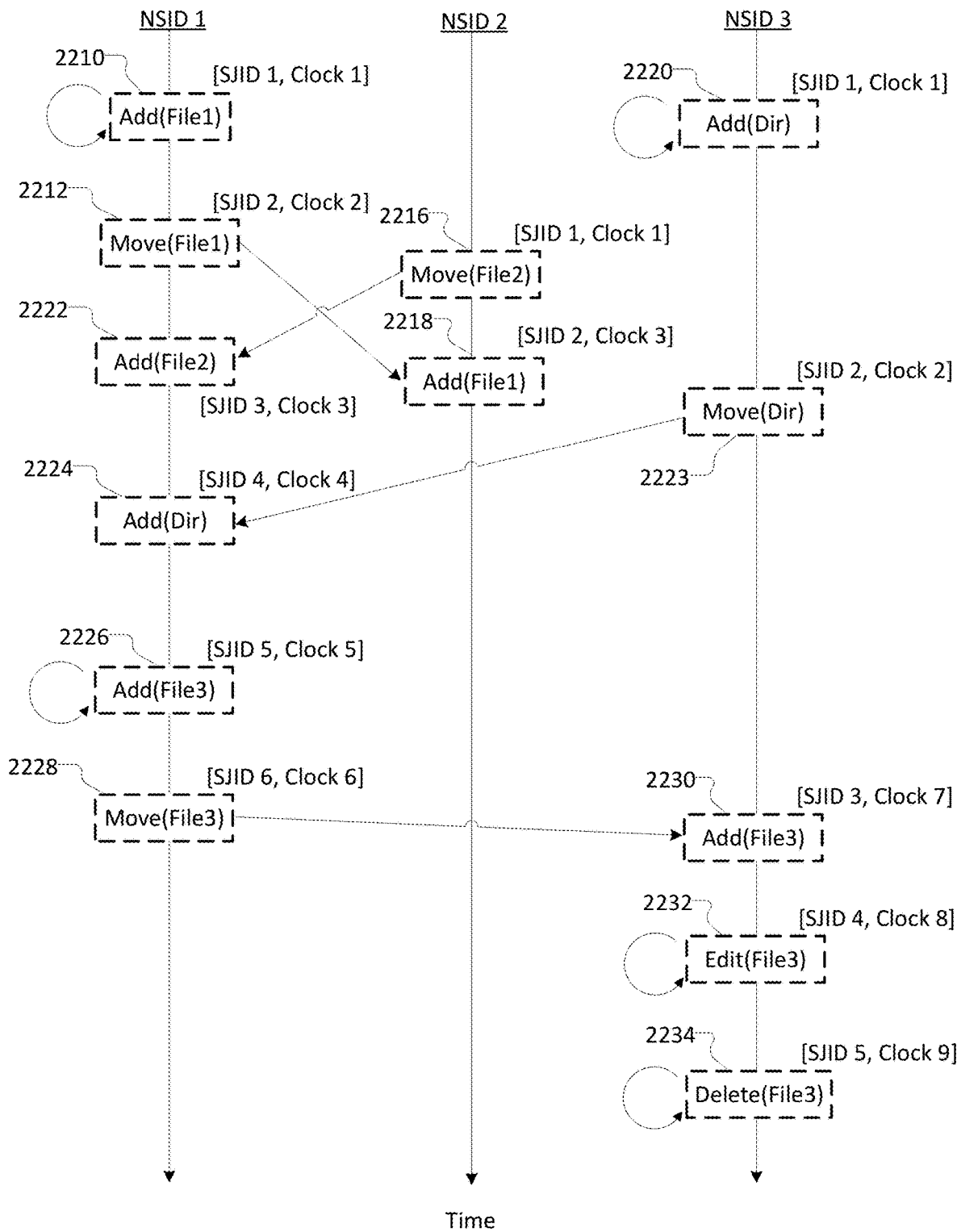
FIG. 22 illustrates a diagram of events across namespaces ordered according to Lamport clocks calculated for the events, in accordance with various embodiments of the subject technology.

FIG. 22 illustrates a diagram of events across namespaces ordered according to Lamport clocks calculated for the events. In this example, various operations have been executed across namespaces NSID 1, NSID 2, and NSID 3. Each namespace maintains an SJID for every operation at that namespace in order to determine the ordering of operations within the namespace. However, the SJID of a namespace does not identify ordering and causality of operations across namespaces. Accordingly, Lamport clocks are calculated for the operations in the namespaces NSID 1, 2, 3 to determine causality and obtain a cross-namespace ordering of operations.

At NSID 1, operation 2210 has SJID 1 and clock 1. At NSID 2, operation 2216 has SJID 1 and clock 1. At NSID, operation 2220 has SJID 1 and clock 1. Operations 2210, 2216, 2220 span multiple namespaces and do not have causal relationships. Accordingly, operations 2210, 2216, 2220 do not affect each other's clocks.

Ordering of operations within the namespace can be determined based on the SJID at the namespace. Clocks for operations within the same namespace can simply be incremented by 1. Thus, at SJID 2 in NSID 1, the clock for operation 2212 is incremented to 2.

Operation 2212 in NSID 1 is a move of File1 to NSID 2. Accordingly, operation 2212 triggers operation 2218 at NSID 2, which is the add of File1 at NSID 2. Since operation 2218 at NSID 2 is causally dependent on another operation from a different namespace, namely operation 2212 from NSID 1, the clock for operation 2218 is calculated based on the clock at NSID 1 and the clock at NSID 2. The algorithm can be expressed as: TargetNS_clock$_{t1}$=max(Source_NS$_{clock}$, TargetNS_clock$_{t0}$)+1. Thus, in this example, the clock for operation 2218 at NSID 2 is 3 (e.g., max(2, 1)+1). Accordingly, operation 2218 at NSID 2 has SJID 2 and clock 3.

Similarly, operation 2216 at NSID is a move of File2 from NSID 2 to NSID 1. Operation 2216 thus triggers operation 2222 at NSID 1, for adding File2 at NSID 1. The clock for operation 2222 is calculated based on the clock algorithm, which equals 3. Thus, operation 2222 has SJID 3 at NSID 1 and clock 3.

Operation 2223 at NSID 3 is causally dependent on an operation in the same namespace, namely operation 2220 at NSID 3. Thus, the clock for operation 2223 can be calculated by incrementing the clock of operation 2220 at NSID 3. In this example, the clock for operation 2223 is therefore 2. Operation 2223 at NSID 3 has SJID 2 and clock 2. Since operation 2223 is a move operation for moving Dir to NSID 1, operation 2223 triggers operation 2224 at NSID 1, adding Dir to NSID 1.

Since operation 2224 is triggered by operation 2222 in a different namespace (NSID 3), the clock for operation 2224 is calculated based on the clock at NSID 1 and the clock for operation 2222. Accordingly, the clock for operation 2224 is set to 4 (e.g., max(2, 3+1). Operation 2224 thus has SJID 4 at NSID 1 and clock 4.

Operation 2226 at NSID 1 adds File3 to NSID 1, and is not a cross-namespace operation. Accordingly, the clock for operation 2226 is calculated by incrementing the clock at NSID 1. The clock for operation 2226 is thus set to 5.

Operation 2228 is causally dependent on operation 2226 also within NSID 1. The clock for operation 2228 is thus set to 6 by incrementing the clock of operation 2226 at NSID 1. Operation 2228 has SJID 6 at NSID 1 and clock 6.

Operation 2228 is a move operation which moves File3 to NSID 3. Operation 2228 thus triggers operation 2230 at NSID 3. Since operation 2230 is based on an operation from a different namespace, its clock is calculated using the clock algorithm based on the clock at NSID 3 and the clock of operation 2228. In this case, the clock for operation 2230 is set to 7. Operation 2230 thus has SJID 3 at NSID 3 and clock 7.

Operations 2232, 2234 are not cross-namespace operations and are causally related to operation 2230 at NSID 3. Thus, the clock for operations 2232, 2234 can be calculated by incrementing the clock of operation 2230. In this example, the clocks for operations 2232, 2234 are set to 8 and 9 respectively.

Figure 23:
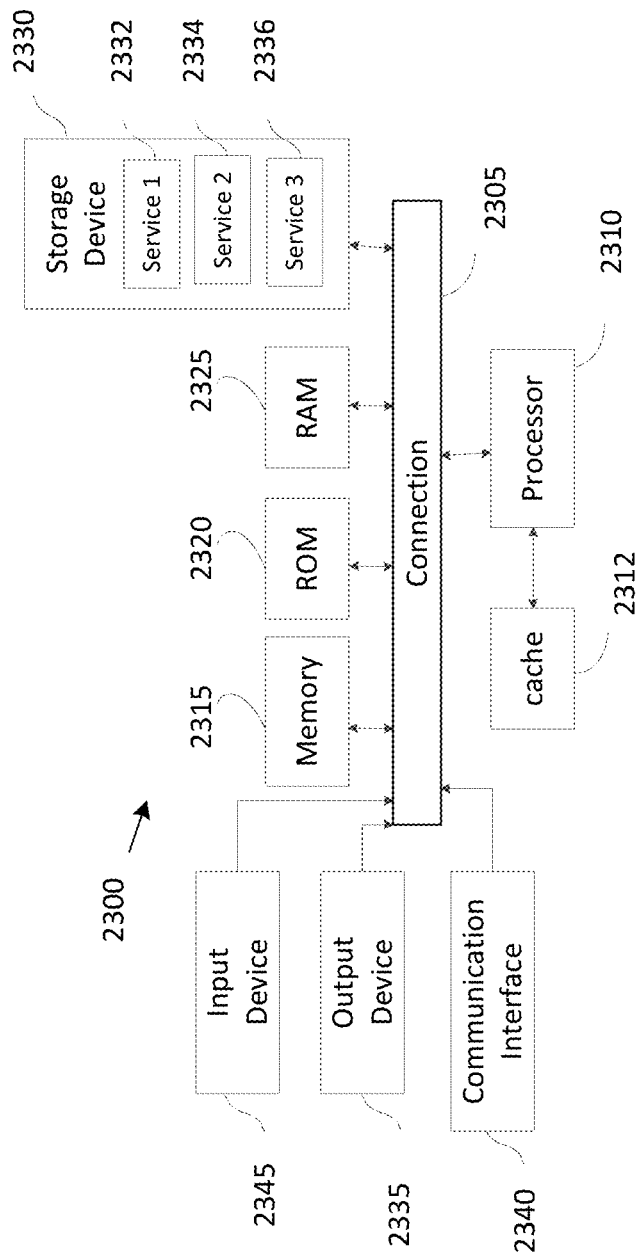
FIG. 23 shows an example of a system for implementing certain aspects of the present technology.

FIG. 23 shows an example of computing system 2300, which can be for example any computing device making up client device 150, content management system 110 or any component thereof in which the components of the system are in communication with each other using connection 2305. Connection 2305 can be a physical connection via a bus, or a direct connection into processor 2310, such as in a chipset architecture. Connection 2305 can also be a virtual connection, networked connection, or logical connection.

In some embodiments computing system 2300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 2300 includes at least one processing unit (CPU or processor) 2310 and connection 2305 that couples various system components including system memory 2315, such as read only memory (ROM) 2320 and random access memory (RAM) 2325 to processor 2310. Computing system 2300 can include a cache of high-speed memory 2312 connected directly with, in close proximity to, or integrated as part of processor 2310.

Processor 2310 can include any general purpose processor and a hardware service or software service, such as services 2332, 2334, and 2336 stored in storage device 2330, configured to control processor 2310 as well as a special-purpose processor where software instructions are incorporated into the actual processor design. Processor 2310 may essentially be a completely self-contained computing system, containing multiple cores or processors, a bus, memory controller, cache, etc. A multi-core processor may be symmetric or asymmetric.

To enable user interaction, computing system 2300 includes an input device 2345, which can represent any number of input mechanisms, such as a microphone for speech, a touch-sensitive screen for gesture or graphical input, keyboard, mouse, motion input, speech, etc. Computing system 2300 can also include output device 2335, which can be one or more of a number of output mechanisms known to those of skill in the art. In some instances, multimodal systems can enable a user to provide multiple types of input/output to communicate with computing system 2300. Computing system 2300 can include communications interface 2340, which can generally govern and manage the user input and system output. There is no restriction on operating on any particular hardware arrangement and therefore the basic features here may easily be substituted for improved hardware or firmware arrangements as they are developed.

Storage device 2330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 2330 can include software services, servers, services, etc., that when the code that defines such software is executed by the processor 2310, it causes the system to perform a function. In some embodiments, a hardware service that performs a particular function can include the software component stored in a computer-readable medium in connection with the necessary hardware components, such as processor 2310, connection 2305, output device 2335, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving, at a client device, a mount notification for mounting a target namespace within an existing namespace represented in a remote tree, wherein the remote tree represents a server state for content items stored on a content management system, and wherein content items of the target namespace are unknown upon receiving the mount notification;
preventing a mounting of the target namespace before a determination of the content items of the target namespace;
receiving, from the content management system, an incoming prefix of a log of operations for the target namespace, wherein the log of operations provides operations data with respect to the content items of the target namespace;

building a subtree for the target namespace, triggered by the receiving of the incoming prefix, by incrementally processing a current state after each operation of the log of operations and determining the content items of the target namespace;

after building the subtree by completing the incremental processing of the current state after each operation of the log of operations, validating the subtree does not violate a set of tree constraints associated with the remote tree; and mounting the subtree for the target namespace at a mount location of the remote tree.

2. The computer-implemented method of claim 1, wherein the incoming prefix is bounded by a start of the log of operations to a cursor value for a mount operation detected by the client device.

3. The computer-implemented method of claim 1, further comprising:

receiving, from the content management system, a mount operation for the target namespace, wherein the mount operation is associated with the existing namespace and specifies the mount location in the existing namespace, wherein the target namespace is mounted at the mount location in response to the mount operation.

4. The computer-implemented method of claim 1, further comprising:

receiving a second mount notification for mounting a nested namespace within the target namespace;

receiving, from the content management system, a second incoming prefix of a second log of operations for the nested namespace;

building a second subtree for the nested namespace based on the second incoming prefix of the second log of operations; and mounting the second subtree for the nested namespace within the subtree for the target namespace.

5. The computer-implemented method of claim 1, further comprising:

receiving the operations data from the content management system, wherein the operations data comprises linearized operations across multiple namespaces;

executing the linearized operations; and updating, based on the execution of the linearized operations, the remote tree.

6. The computer-implemented method of claim 1, further comprising:

determining that the server state and a file system state are out of sync, wherein the determining is based on a difference between the remote tree and a sync tree representing a known synced state between the server state and the file system state;

generating, based on the difference, a set of operations configured to converge the server state and the file system state; and managing execution of the set of operations.

7. The computer-implemented method of claim 6, wherein the remote tree and the sync tree are stored at the client device.

8. The computer-implemented method of claim 6, wherein the server state and the file system state being out of sync indicates that an action performed on the content items stored by the content management system is not reflected in the content items stored on the client device.

9. A non-transitory computer readable medium comprising instructions, the instructions, when executed by a computing system, cause the computing system to:

prevent a mounting of a target namespace within an existing namespace, represented in a remote tree, before a determination of content items of the target namespace, wherein the remote tree represents a server state for content items stored on a content management system;

receive, from the content management system, an initial portion of a log of operations for the target namespace, wherein the log of operations serves as operations data with respect to the content items of the target namespace;

build a subtree for the target namespace based on the initial portion of the log of operations by incrementally processing a current state after each operation in the log of operations and determining the content items of the target namespace;

after building the subtree by completing the incremental processing of the current state after each operation in the initial portion of the log of operations, validate the subtree does not violate a set of tree constraints associated with the remote tree; and mount the subtree for the target namespace at a mount location of the remote tree representing the server state for content items stored on the content management system.

10. The non-transitory computer readable medium of claim 9, wherein the instructions further cause the computing system to:

receive, before the preventing the mounting, from the content management system, a mount operation for the target namespace, wherein the mount operation is associated with the existing namespace and specifies the mount location in the existing namespace, wherein the target namespace is mounted at the mount location in response to the mount operation, and content items of the target namespace are unknown upon receiving the mount operation.

11. The non-transitory computer readable medium of claim 9, wherein the instructions further cause the computing system to:

receive the operations data from the content management system, wherein the operations data comprises linearized operations across multiple namespaces;

execute the linearized operations; and update, based on execution of the linearized operations, the remote tree.

12. The non-transitory computer readable medium of claim 9, wherein the instructions further cause the computing system to:

determine that the server state and a file system state are out of sync based on a difference between the remote tree and a sync tree representing a known synced state between the server state and the file system state;

generate, based on the difference, a set of operations configured to converge the server state and the file system state; and manage execution of the set of operations.

13. A system comprising:

one or more processors; and a non-transitory computer-readable medium storing instructions that, when executed by the one or more processors, cause the one or more processors to:

receive, at a client device, a mount notification for mounting a target namespace within an existing namespace represented in a remote tree, wherein the remote tree represents a server state for content items stored on a content management system, and wherein content items of the target namespace are unknown upon receiving the mount notification;

prevent a mounting of the target namespace before a determination of the content items of the target namespace;

receive, from the content management system, an incoming prefix and a subsequent log of operations for the target namespace, wherein the log of operations serves as operations data with respect to content items of the target namespace;

build a subtree for the target namespace, triggered by the receiving of the incoming prefix, by incrementally processing a current state after each operation in the log of operations, and determine the content items of the target namespace; and after building the subtree by incrementally processing the current state after each operation in the incoming prefix of the log of operations, validate the subtree does not violate a set of tree constraints with the remote tree; and mount the subtree for the target namespace at a mount location of the remote tree representing the server state for the content items stored on the content management system.

14. The system of claim 13, wherein the incoming prefix of the log of operations is bounded by a start of the log of operations to a cursor value for a mount operation detected by the content management system.

15. The system of claim 13, wherein the instructions further cause the one or more processors to:

receive, from the content management system, a mount operation for the target namespace, wherein the mount operation is associated with the existing namespace and specifies the mount location in the existing namespace, wherein the target namespace is mounted at the mount location in response to the mount operation.

16. The system of claim 13, wherein the instructions further cause the one or more processors to:

receive the operations data from the content management system, wherein the operations data comprises linearized operations across multiple namespaces;

execute the linearized operations; and update, based on execution of the linearized operations, the remote tree.

17. The system of claim 13, wherein the instructions further cause the one or more processors to:

determine that the server state and a file system state are out of sync based on a difference between the remote tree and a sync tree representing a known synced state between the server state and the file system state;

generate, based on the difference, a set of operations configured to converge the server state and the file system state; and manage execution of the set of operations.

18. The computer-implemented method of claim 1, wherein processing the current state includes:

determining that one or more operations will not be reflected in a final version of the subtree based on a final state resulting from incrementally processing of the current state after each operation in the log of operations; and based on the one or more operations not being reflected in the final version of the subtree, removing the one or more operations from the final version of the subtree.

19. The computer-implemented method of claim 1, wherein the mounting the subtree for the target namespace within the existing namespace introduces a dependency between operation logs of the target namespace and operation logs of the existing namespace.

* * * * *